US012758068B2

(12) United States Patent
Hamilton

(10) Patent No.: US 12,758,068 B2
(45) **Date of Patent: *Oct. 13, 2026**

(54) ROBOT VACUUM SYSTEM WITH OBSTRUCTION CONTROL

(71) Applicant: Clutterbot, Inc., Claymont, DE (US)

(72) Inventor: Justin David Hamilton, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/591,342

(22) Filed: Feb. 29, 2024

(65) Prior Publication Data

US 2024/0292990 A1 Sep. 5, 2024

Related U.S. Application Data

(63) Continuation-in-part of application No. 18/590,153, filed on Feb. 28, 2024.

(Continued)

(51) Int. Cl.
*A47L 9/28* (2006.01)
*A47L 7/00* (2006.01)
(Continued)

(52) U.S. Cl.
CPC ............. *A47L 9/2836* (2013.01); *A47L 7/009* (2013.01); *A47L 9/0063* (2013.01); *A47L 9/009* (2013.01);
(Continued)

(58) Field of Classification Search
CPC ...... A47L 9/2836; A47L 7/009; A47L 9/0063; A47L 9/009; A47L 9/0466; A47L 9/12;
(Continued)

(56) References Cited

U.S. PATENT DOCUMENTS 6,338,013 B1 * 1/2002 Ruffner .................. B60L 3/106 180/443
6,810,305 B2 * 10/2004 Kirkpatrick, Jr. ....... A47L 9/009 701/25

(Continued)

FOREIGN PATENT DOCUMENTS

AU 2015218522 A1 9/2015
AU 2020101865 A4 * 10/2020 ............. G06V 20/10

(Continued)

OTHER PUBLICATIONS

WO 2020/071669 (Year: 2020), Apr. 2020.*

(Continued)

*Primary Examiner* — Alexander Markoff
(74) *Attorney, Agent, or Firm* — Carnelian Law, LLC

(57) ABSTRACT

A tidying robot system is disclosed that includes a robot capable of moving aside or picking up and redepositing objects that obstruct areas the robot intends to vacuum. The robot includes a chassis, a robot vacuum system with a vacuum generating assembly and a dirt collector, a scoop, pusher pad arms with pusher pads, a robot charge connector, mobility system, a battery, a processor, and a memory storing instructions that, when executed by the processor, allow operation and control of the robot. The tidying robot system also includes a base station with a base station charge connector configured to couple with the robot charge connector. The tidying robot system also includes a robotic control system in at least one of the robot and a cloud server. The tidying robot system also includes logic to implement the operations and methods disclosed.

20 Claims, 57 Drawing Sheets

Related U.S. Application Data

(60) Provisional application No. 63/558,818, filed on Feb. 28, 2024, provisional application No. 63/487,752, filed on Mar. 1, 2023.

(51) Int. Cl.

| | |
|---|---|
| ***A47L 9/00*** | (2006.01) |
| ***A47L 9/04*** | (2006.01) |
| ***A47L 9/12*** | (2006.01) |
| ***A47L 9/14*** | (2006.01) |
| ***B25J 11/00*** | (2006.01) |

(52) U.S. Cl.
CPC ............... *A47L 9/0466* (2013.01); *A47L 9/12* (2013.01); *A47L 9/149* (2013.01); *A47L 9/2826* (2013.01); *A47L 9/2873* (2013.01); *B25J 11/0085* (2013.01); *A47L 2201/022* (2013.01); *A47L 2201/024* (2013.01); *A47L 2201/04* (2013.01); *A47L 2201/06* (2013.01)

(58) Field of Classification Search
CPC ...... A47L 9/149; A47L 9/2826; A47L 9/2873; A47L 2201/022; A47L 2201/024; A47L 2201/04; A47L 2201/06; A47L 9/2852; A47L 9/2857; A47L 9/2884; A47L 9/2894; B25J 11/0085
See application file for complete search history.

(56) References Cited

U.S. PATENT DOCUMENTS

| | | | |
|---|---|---|---|
| 9,089,969 | B1 | 7/2015 | Theobald |
| 9,827,677 | B1 | 11/2017 | Gilbertson et al. |
| 9,827,678 | B1 | 11/2017 | Gilbertson et al. |
| 10,207,408 | B1 | 2/2019 | Ebrahimi Afrouzi |
| 11,020,858 | B2 | 6/2021 | Amacker et al. |
| 11,407,118 | B1 * | 8/2022 | Augenbraun .......... B25J 9/1612 |
| 11,409,296 | B1 | 8/2022 | Kim et al. |
| 11,720,117 | B1 | 8/2023 | Kim et al. |
| 11,789,457 | B1 | 10/2023 | Woo et al. |
| 12,064,880 | B2 * | 8/2024 | Hamilton ............. G05D 1/0274 |
| 12,287,639 | B1 | 4/2025 | Queiroz et al. |
| 12,310,545 | B1 * | 5/2025 | Hamilton ............... G05D 1/622 |
| 2002/0116089 | A1 * | 8/2002 | Kirkpatrick, Jr. .... G05D 1/0227 700/245 |
| 2006/0116973 | A1 | 6/2006 | Okamoto et al. |
| 2007/0239315 | A1 | 10/2007 | Sato et al. |
| 2009/0137348 | A1 | 5/2009 | Tsai |
| 2016/0260161 | A1 | 9/2016 | Atchley et al. |
| 2017/0329333 | A1 * | 11/2017 | Passot ................. A47L 11/4011 |
| 2018/0104815 | A1 | 4/2018 | Yang |
| 2018/0284792 | A1 * | 10/2018 | Kleiner .................. G05D 1/225 |
| 2018/0312095 | A1 | 11/2018 | Eletrabi |
| 2018/0329425 | A1 | 11/2018 | Watts |
| 2019/0217476 | A1 | 7/2019 | Jiang et al. |
| 2020/0026301 | A1 | 1/2020 | Taylor |
| 2020/0086182 | A1 | 3/2020 | New et al. |
| 2020/0156246 | A1 | 5/2020 | Srivastav |
| 2020/0279436 | A1 | 9/2020 | Bleyer et al. |
| 2020/0376675 | A1 | 12/2020 | Bai et al. |
| 2021/0038950 | A1 | 2/2021 | Sullivan |
| 2021/0069904 | A1 | 3/2021 | Duan et al. |
| 2021/0128989 | A1 | 5/2021 | Legg et al. |
| 2021/0132213 | A1 | 5/2021 | Advani et al. |
| 2021/0138311 | A1 | 5/2021 | Wang et al. |
| 2021/0339393 | A1 | 11/2021 | Dan |
| 2021/0373560 | A1 | 12/2021 | Koga et al. |
| 2022/0168893 | A1 * | 6/2022 | Hamilton ............. G05D 1/0246 |
| 2022/0171907 | A1 | 6/2022 | Chang et al. |
| 2022/0253056 | A1 * | 8/2022 | Ranjan .................. A47L 11/405 |
| 2022/0398775 | A1 | 12/2022 | Streem et al. |
| 2023/0015751 | A1 | 1/2023 | Serackis et al. |
| 2023/0116896 | A1 | 4/2023 | Hamilton et al. |
| 2023/0206755 | A1 | 6/2023 | Jha et al. |
| 2023/0401837 | A1 | 12/2023 | Yan et al. |
| 2024/0142994 | A1 | 5/2024 | Ebrahimi Afrouzi |
| 2024/0192690 | A1 | 6/2024 | Ebrahimi Afrouzi et al. |
| 2024/0218863 | A1 | 7/2024 | Eletrabi et al. |
| 2024/0292990 | A1 * | 9/2024 | Hamilton .............. A47L 9/2857 |
| 2024/0424355 | A1 | 12/2024 | Zhang et al. |
| 2024/0428560 | A1 | 12/2024 | Buerkle et al. |

FOREIGN PATENT DOCUMENTS

| | | | |
|---|---|---|---|
| AU | 2022360549 | A1 | 5/2024 |
| CN | 202526850 | U | 11/2012 |
| CN | 107137890 | A | 9/2017 |
| CN | 107378958 | A | 11/2017 |
| CN | 107650147 | A | 2/2018 |
| CN | 108217183 | A | 6/2018 |
| CN | 108786065 | A | 11/2018 |
| CN | 110558900 | A | 12/2019 |
| CN | 210616549 | U | 5/2020 |
| CN | 111633627 | A | 9/2020 |
| CN | 112828847 | A | 5/2021 |
| CN | 114468859 | A | 5/2022 |
| CN | 218552245 | U | 3/2023 |
| CN | 116616642 | A | 8/2023 |
| CN | 116709962 | A | 9/2023 |
| CN | 117442132 | A | 1/2024 |
| DE | 102017112740 | A1 | 12/2018 |
| EP | 1942223 | B1 | 7/2008 |
| EP | 3766591 | A1 | 1/2021 |
| JP | 2019092999 | A | 6/2019 |
| JP | 2020138046 | A | 9/2020 |
| JP | 2023052271 | A | 4/2023 |
| KR | 1020190130941 | | 11/2019 |
| KR | 20200126036 | A | 11/2020 |
| KR | 20230139407 | A | 10/2023 |
| KR | 20240133919 | A | 9/2024 |
| WO | 2012103525 | A2 | 8/2012 |
| WO | 2016105702 | A1 | 6/2016 |
| WO | 2019126332 | A1 | 6/2019 |
| WO | 2020190272 | A1 | 9/2020 |
| WO | 2022029730 | A1 | 2/2022 |
| WO | 2022115761 | A1 | 6/2022 |
| WO | 2023031620 | A1 | 3/2023 |
| WO | 2023060285 | A1 | 4/2023 |
| WO | 2023110103 | A1 | 6/2023 |
| WO | 2025184405 | A1 | 9/2025 |

OTHER PUBLICATIONS

Bahl, Laavanye et al. "Cu Bi: Room De cluttering Robot". May 2019. Retrieved from the Internet (Year: 2019) Carnegie Mellon University pp. 1-29.

PCT/US2022/077917 International Search Report dated Jan. 25, 2023.

PCT/US2022/077917 Written Opinion of the ISA Date of Mailing Jan. 25, 2023.

Official Action Translation from Japanese Patent Office dated Apr. 2, 2024 for application JP 2023-533262 100107766.

PCT/US2021/061143 International Search Report Feb. 8, 2022.

PCT/US2021/061143 Written Opinion of the International Searching Authority Feb. 6, 2022.

Canberk Alper et al: "Cloth Funnels: Canonicalized-Alignment for Multi-Purpose Garment Manipulation", 2023 IEEE International Conference on Robotics and Automation (ICRA), IEEE, May 29, 2023 (May 29, 2023), pp. 5872-5879.

Guanqi Chen et al: "Language-Augmented Symbolic Planner for Open-world Task Planning", arxiv.org, Cornell University Library, Jul. 13, 2024.

PCT/US25/43792, International Search Report, Dec. 10, 2025.

PCT/US25/43792, Written Opinion, Dec. 10, 2025.

PCT/US25/43802, International Search Report, Dec. 16, 2025.

PCT/US25/43802, Written Opinion, Dec. 16, 2025.

PCT/US25/43805, International Search Report, Dec. 16, 2025.

PCT/US25/43805, Written Opinion, Dec. 16, 2025.

PCT/US25/44087, International Search Report, Jan. 8, 2026.

(56) References Cited

OTHER PUBLICATIONS

PCT/US25/44087, Written Opinion, Jan. 8, 2026.
PCT/US25/44271, International Search Report, Jan. 5, 2026.
PCT/US25/44271, Written Opinion, Jan. 5, 2026.
PCT/US25/44310, International Search Report, Nov. 27, 2025.
PCT/US25/44310, Written Opinion, Nov. 27, 2025.
PCT/US25/44316, International Search Report, Jan. 8, 2026.
PCT/US25/44316, Written Opinion, Jan. 8, 2026.
PCT/US25/44322 International Search Report Dec. 11, 2025.
PCT/US25/44322, Written Opinion, Dec. 11, 2025.
PCT/US25/44326, International Search Report, Dec. 15, 2025.
PCT/US25/44326, Written Opinion, Dec. 15, 2025.
Tsurumine Yoshihisa et al: "Variationally Autoencoded Dynamic Policy Programming for Robotic Cloth Manipulation Planning based on Raw Images", 2022 IEEE/SICE International Symposium on System Integration (SII), IEEE, Jan. 9, 2022, pp. 416-421.
Gonzalez et al., Multi-Li DAR Mapping for Scene Segmentation in Indoor Environments for Mobile Robots, May 2022, MDPI, pp. 1-19. (Year: 2022).
China National Intellectual Property Administration Application No. 202180080246.2 filing date May 30, 2023 First Office Action, entire document dated Nov. 3, 2025.
China National Intellectual Property Administration Application No. 202180080246.2 filing date May 30, 2023 First Office Action, entire document dated Nov. 3, 2025 translation.
Changsheng Shen (Bobby), "CMU MRSD 2020: Team D—Cu Bi—A Decluttering Robot," YouTube, Dec. 10, 2019. https://www.youtube.com/watch?v=IA-MaF _m8QA (accessed Jan. 19, 2026). (Year: 2019).

* cited by examiner

ROBOT VACUUM SYSTEM WITH OBSTRUCTION CONTROL

CROSS-REFERENCE TO RELATED APPLICATIONS

This application claims the benefit of U.S. provisional patent application Ser. No. 63/487,752, filed on Mar. 1, 2023, benefit and priority to Foreign National provisional application serial no. 202341040880, filed in India on Jun. 15, 2023, titled CLUTTER TIDYING ROBOT UTILIZING FLOOR SEGMENTATION FOR MAPPING AND NAVIGATION SYSTEM, benefit and priority to U.S. provisional patent application Ser. No. 63/558,818, filed on Feb. 28, 2024, and is a continuation-in-part of U.S. non-provisional application Ser. No. 18/590,153, filed on Feb. 28, 2024, each of which is incorporated herein by reference in its entirety.

BACKGROUND

Objects underfoot represent not only a nuisance but a safety hazard. They may also limit the effectiveness of robotic vacuum cleaning devices. A floor cluttered with loose objects may represent a danger, but many people have limited time in which to address the clutter in their homes. Automated cleaning or tidying robots may represent an effective solution.

Consumers who rely on robotic vacuum cleaners to help keep their houses clean may have to maintain a constant level of tidiness that significantly impacts the time savings such robots offer. There is, therefore, a need for a robotic vacuum system capable of dealing with obstacles it encounters while traversing an area to be vacuumed.

BRIEF SUMMARY

A tidying robot system is disclosed herein that includes a robot including a chassis, a robot vacuum system with a vacuum generating assembly and a dirt collector, a scoop, pusher pad arms with pusher pads, a robot charge connector, at least one wheel or one track for mobility of the robot, a battery, a processor, and a memory storing instructions that, when executed by the processor, allow operation and control of the robot. The tidying robot system also includes a base station with a base station charge connector configured to couple with the robot charge connector. The tidying robot system also includes a robotic control system in at least one of the robot and a cloud server. The tidying robot system also includes logic to implement the operations and methods disclosed herein.

A method is disclosed herein including receiving a starting location, a target cleaning area, attributes of the target cleaning area, and obstructions in a path of the robot navigating in the target cleaning area and determining a tidying strategy including a vacuuming strategy and an obstruction handling strategy. The method also includes executing the tidying strategy to at least one of vacuum the target cleaning area, move an obstruction, and avoid the obstruction, where the obstruction includes at least one of a tidyable object and a moveable object. The method also includes, on condition the obstruction can be picked up determining a pickup strategy and executing the pickup strategy, capturing the obstruction with the pusher pads, and placing the obstruction in the scoop. The method also includes, on condition the obstruction can be relocated but cannot be picked up, pushing the obstruction to a different location using at least one of the pusher pads, the scoop, and the chassis. The method also includes, on condition the obstruction cannot be relocated and cannot be picked up, avoiding the obstruction by altering the path of the robot around the obstruction. The method also includes determining if the dirt collector is full. On condition the dirt collector is full, the method includes navigating to the base station. On condition the dirt collector is not full, the method includes continuing to execute the tidying strategy.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
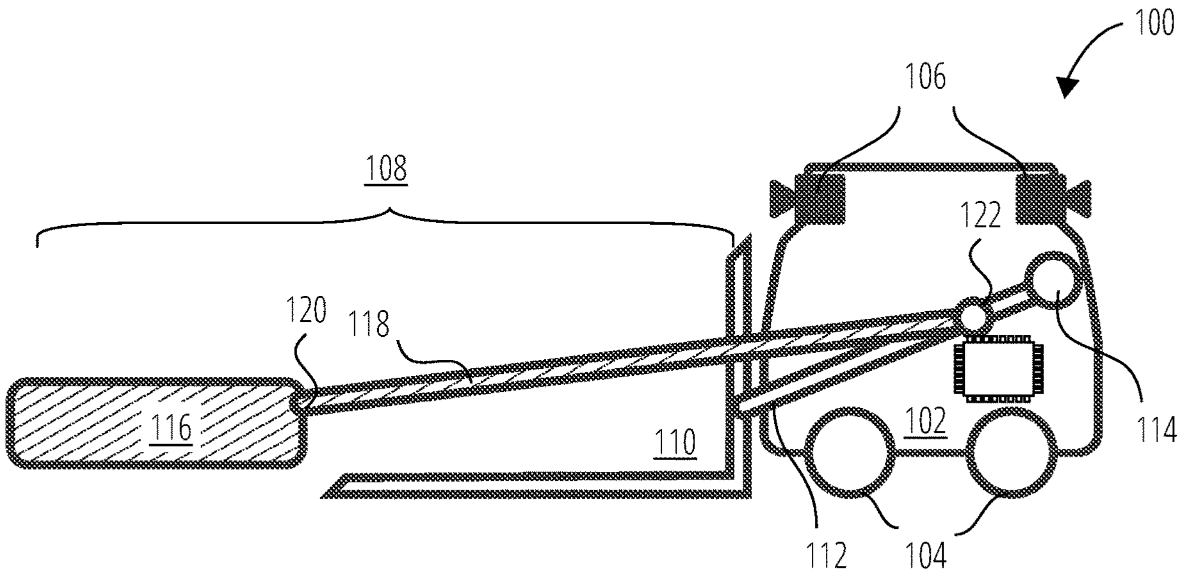
FIG. 1A-FIG. 1D illustrate aspects of a robot 100 in accordance with one embodiment.

The disclosed solution comprises a tidying robot capable of vacuuming a floor as well as avoiding static objects and movable objects and manipulating (picking up and/or relocating) tidyable objects encountered while vacuuming, or detected before vacuuming begins.

The term "Static object" in this disclosure refers to elements of a scene that are not expected to change over time, typically because they are rigid and immovable. Some composite objects may be split into a movable part and a static part. Examples include door frames, bookshelves, walls, countertops, floors, couches, dining tables, etc.

The term "Movable object" in this disclosure refers to elements of the scene that are not desired to be moved by the robot (e.g., because they are decorative, too large, or attached to something), but that may be moved or deformed in the scene due to human influence. Some composite objects may be split into a movable part and a static part. Examples include doors, windows, blankets, rugs, chairs, laundry baskets, storage bins, etc.

The term "Tidyable object" in this disclosure refers to elements of the scene that may be moved by the robot and put away in a home location. These objects may be of a type and size such that the robot may autonomously put them away, such as toys, clothing, books, stuffed animals, soccer balls, garbage, remote controls, keys, cellphones, etc.

Embodiments of a robotic system are disclosed that operate a robot to navigate an environment using cameras to map the type, size, and location of toys, clothing, obstacles, and other objects. The robot comprises a neural network to determine the type, size, and location of objects based on input from a sensing system, such as images from a forward camera, a rear camera, forward and rear left/right stereo cameras, or other camera configurations, as well as data from inertial measurement unit (IMU), lidar, odometry, and actuator force feedback sensors. The robot chooses a specific object to pick up, performs path planning, and navigates to a point adjacent to and facing the target object. Actuated pusher pad arms move other objects out of the way and maneuver pusher pads to move the target object onto a scoop to be carried. The scoop tilts up slightly and, if needed, pusher pads may close in front to keep objects in place, while the robot navigates to the next location in the planned path, such as the deposition destination.

In some embodiments, the system may include a robotic arm to reach and grasp elevated objects and move them down to the scoop. A companion "portable elevator" robot may also be utilized in some embodiments to lift the main robot up onto countertops, tables, or other elevated surfaces, and then lower it back down onto the floor. Some embodiments may utilize an up/down vertical lift (e.g., a scissor lift) to change the height of the scoop when dropping items into a container, shelf, or other tall or elevated location.

Some embodiments may also utilize one or more of the following components:

Left/right rotating brushes on actuator arms that push objects onto the scoop An actuated gripper that grabs objects and moves them onto the scoop A rotating wheel with flaps that push objects onto the scoop from above One servo or other actuator to lift the front scoop up into the air and another separate actuator that tilts the scoop forward and down to drop objects into a container A variation on a scissor lift that lifts the scoop up and gradually tilts it backward as it gains height Ramps on the container with the front scoop on a hinge so that the robot just pushes items up the ramp such that the objects drop into the container with gravity at the top of the ramp A storage bin on the robot for additional carrying capacity such that target objects are pushed up a ramp into the storage bin instead of using a front scoop and the storage bin tilts up and back like a dump truck to drop items into a container The robotic system may be utilized for automatic organization of surfaces where items left on the surface are binned automatically into containers on a regular schedule. In one specific embodiment, the system may be utilized to automatically neaten a children's play area (e.g., in a home, school, or business) where toys and/or other items are automatically returned to containers specific to different types of objects after the children are done playing. In other specific embodiments, the system may be utilized to automatically pick clothing up off the floor and organize the clothing into laundry basket(s) for washing, or to automatically pick up garbage off the floor and place it into a garbage bin or recycling bin(s), e.g., by type (plastic, cardboard, glass). Generally, the system may be deployed to efficiently pick up a wide variety of different objects from surfaces and may learn to pick up new types of objects.

Figure 1B:
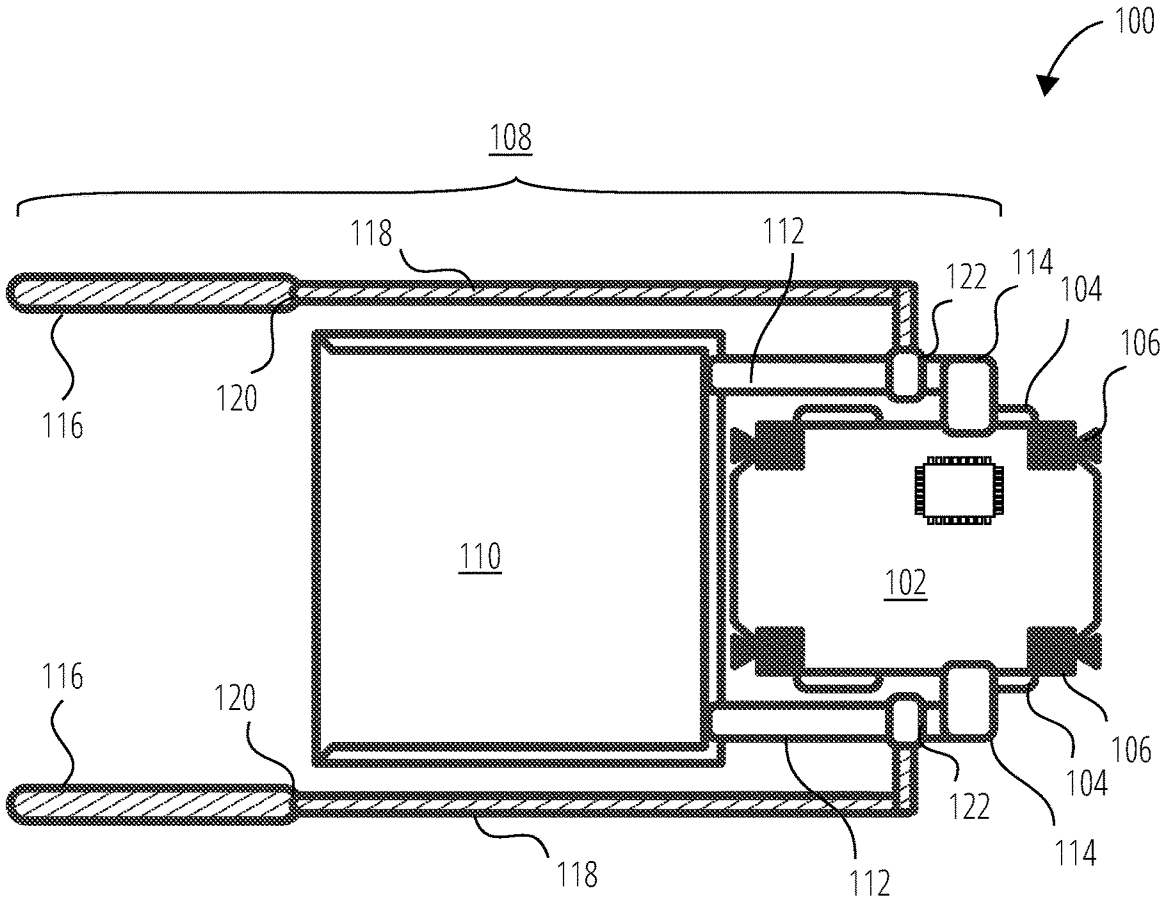

FIG. 1A through FIG. 1D illustrate a robot 100 in accordance with one embodiment. FIG. 1A illustrates a side view of the robot 100, and FIG. 1B illustrates a top view. The robot 100 may comprise a chassis 102, a mobility system 104, a sensing system 106, a capture and containment system 108, and a robotic control system 1100. The capture and containment system 108 may further comprise a scoop 110, a scoop arm 112, a scoop arm pivot point 114, two pusher pads 116, two pusher pad arms 118, and two pad arm pivot points 122.

The chassis 102 may support and contain the other components of the robot 100. The mobility system 104 may comprise wheels as indicated, as well as caterpillar tracks, conveyor belts, etc., as is well understood in the art. The mobility system 104 may further comprise motors, servos, or other sources of rotational or kinetic energy to impel the robot 100 along its desired paths. Mobility system 104 components may be mounted on the chassis 102 for the purpose of moving the entire robot without impeding or inhibiting the range of motion needed by the capture and containment system 108. Elements of a sensing system 106, such as cameras, lidar sensors, or other components, may be mounted on the chassis 102 in positions giving the robot 100 clear lines of sight around its environment in at least some configurations of the chassis 102, scoop 110, pusher pad 116, and pusher pad arm 118 with respect to each other.

The chassis 102 may house and protect all or portions of the robotic control system 1100, (portions of which may also be accessed via connection to a cloud server) comprising in some embodiments a processor, memory, and connections to the mobility system 104, sensing system 106, and capture and containment system 108. The chassis 102 may contain other electronic components such as batteries, wireless communication devices, etc., as is well understood in the art of robotics. The robotic control system 1100 may function as described in greater detail with respect to FIG. 11. The mobility system 104 and or the robotic control system 1100 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 108 may comprise a scoop 110, a scoop arm 112, a scoop arm pivot point 114, a pusher pad 116, a pusher pad arm 118, a pad pivot point 120, and a pad arm pivot point 122. In some embodiments, the capture and containment system 108 may include two pusher pad arms 118, pusher pads 116, and their pivot points. In other embodiments, pusher pads 116 may attach directly to the scoop 110, without pusher pad arms 118. Such embodiments are illustrated later in this disclosure.

The geometry and of the scoop 110 and the disposition of the pusher pads 116 and pusher pad arms 118 with respect to the scoop 110 may describe a containment area, illustrated more clearly in FIG. 2A through FIG. 2E, in which objects may be securely carried. Servos, direct current (DC) motors, or other actuators at the scoop arm pivot point 114, pad pivot points 120, and pad arm pivot points 122 may be used to adjust the disposition of the scoop 110, pusher pads 116, and pusher pad arms 118 between fully lowered scoop and grabber positions and raised scoop and grabber positions, as illustrated with respect to FIG. 2A through FIG. 2C.

The point of connection shown between the scoop arms and pusher pad arms is an exemplary position and is not intended to limit the physical location of such points of connection. Such connections may be made in various locations as appropriate to the construction of the chassis and arms, and the applications of intended use.

In some embodiments, gripping surfaces may be configured on the sides of the pusher pads 116 facing inward toward objects to be lifted. These gripping surfaces may provide cushion, grit, elasticity, or some other feature that increases friction between the pusher pads 116 and objects to be captured and contained. In some embodiments, the pusher pad 116 may include suction cups in order to better grasp objects having smooth, flat surfaces. In some embodiments, the pusher pads 116 may be configured with sweeping bristles. These sweeping bristles may assist in moving small objects from the floor up onto the scoop 110. In some embodiments, the sweeping bristles may angle down and inward from the pusher pads 116, such that, when the pusher pads 116 sweep objects toward the scoop 110, the sweeping bristles form a ramp, allowing the foremost bristles to slide beneath the object, and direct the object upward toward the pusher pads 116, facilitating capture of the object within the scoop and reducing a tendency of the object to be pressed against the floor, increasing its friction and making it more difficult to move.

Figure 1C:
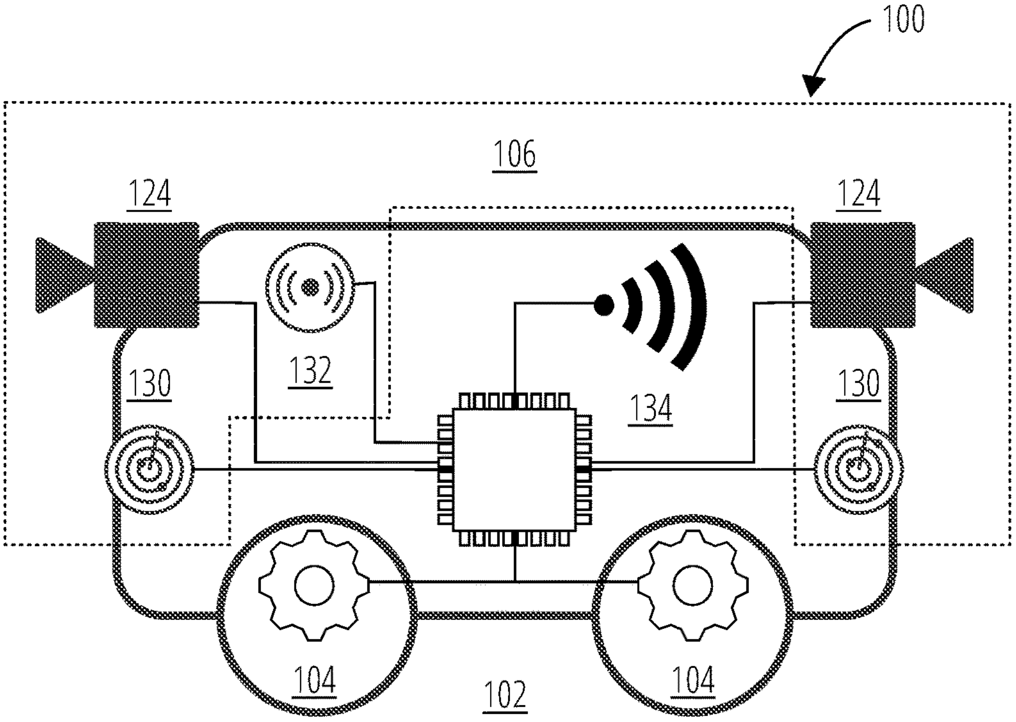
Figure 1D:
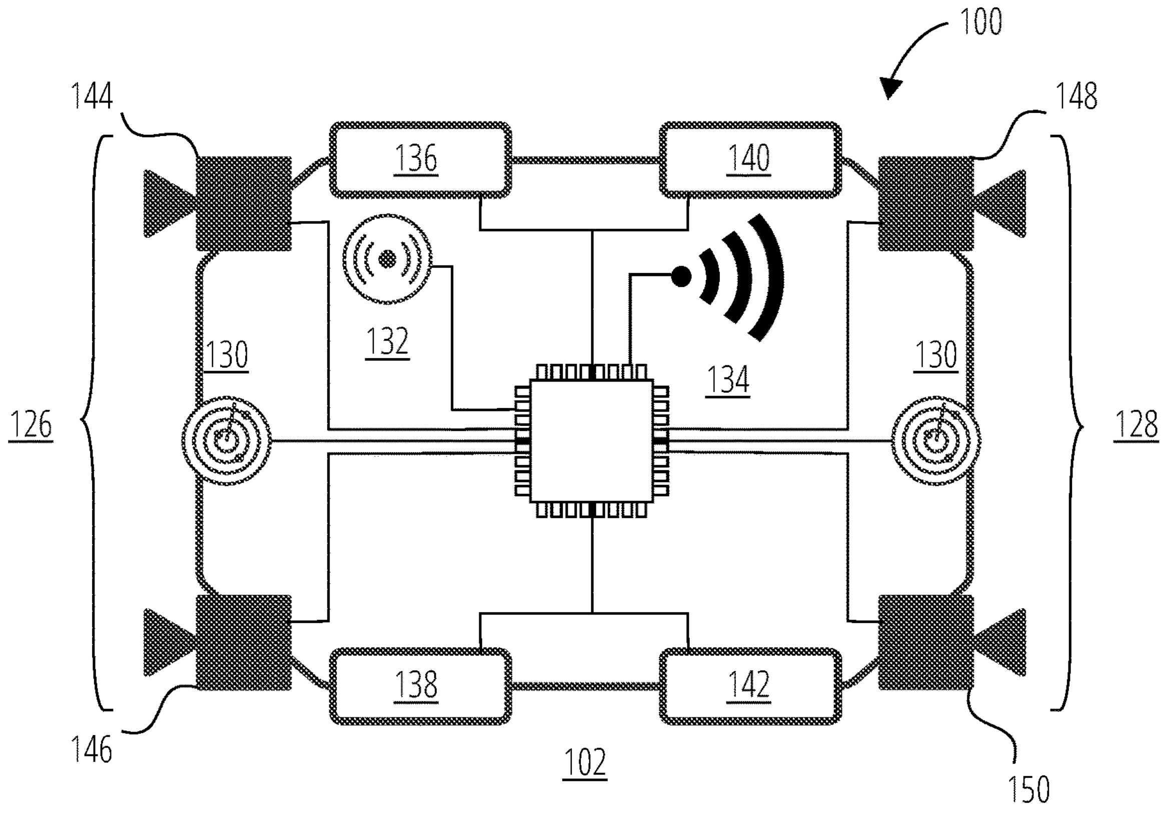

FIG. 1C and FIG. 1D illustrate a side view and top view of the chassis 102, respectively, along with the general connectivity of components of the mobility system 104, sensing system 106, and communications 134, in connection with the robotic control system 1100. In some embodiments, the communications 134 may include the network interface 1112 described in greater detail with respect to robotic control system 1100.

In one embodiment, the mobility system 104 may comprise a right front wheel 136, a left front wheel 138, a right rear wheel 140, and a left rear wheel 142. The robot 100 may have front-wheel drive, where right front wheel 136 and left front wheel 138 are actively driven by one or more actuators or motors, while the right rear wheel 140 and left rear wheel 142 spin on an axle passively while supporting the rear portion of the chassis 102. In another embodiment, the robot 100 may have rear-wheel drive, where the right rear wheel 140 and left rear wheel 142 are actuated and the front wheels turn passively. In another embodiment, each wheel may be actively actuated by separate motors or actuators.

The sensing system 106 may further comprise cameras 124 such as the front cameras 126 and rear cameras 128, light detecting and ranging (LIDAR) sensors such as lidar sensors 130, and inertial measurement unit (IMU) sensors, such as IMU sensors 132. In some embodiments, front camera 126 may include the front right camera 144 and front left camera 146. In some embodiments, rear camera 128 may include the rear left camera 148 and rear right camera 150.

Additional embodiments of the robot that may be used to perform the disclosed algorithms are illustrated in FIG. 2A through FIG. 2E, FIG. 3A through FIG. 3C, FIG. 4A through FIG. 4C, FIG. 5, FIG. 6A through FIG. 6D, and FIG. 8.

Figures 2A, 2B, 2C:
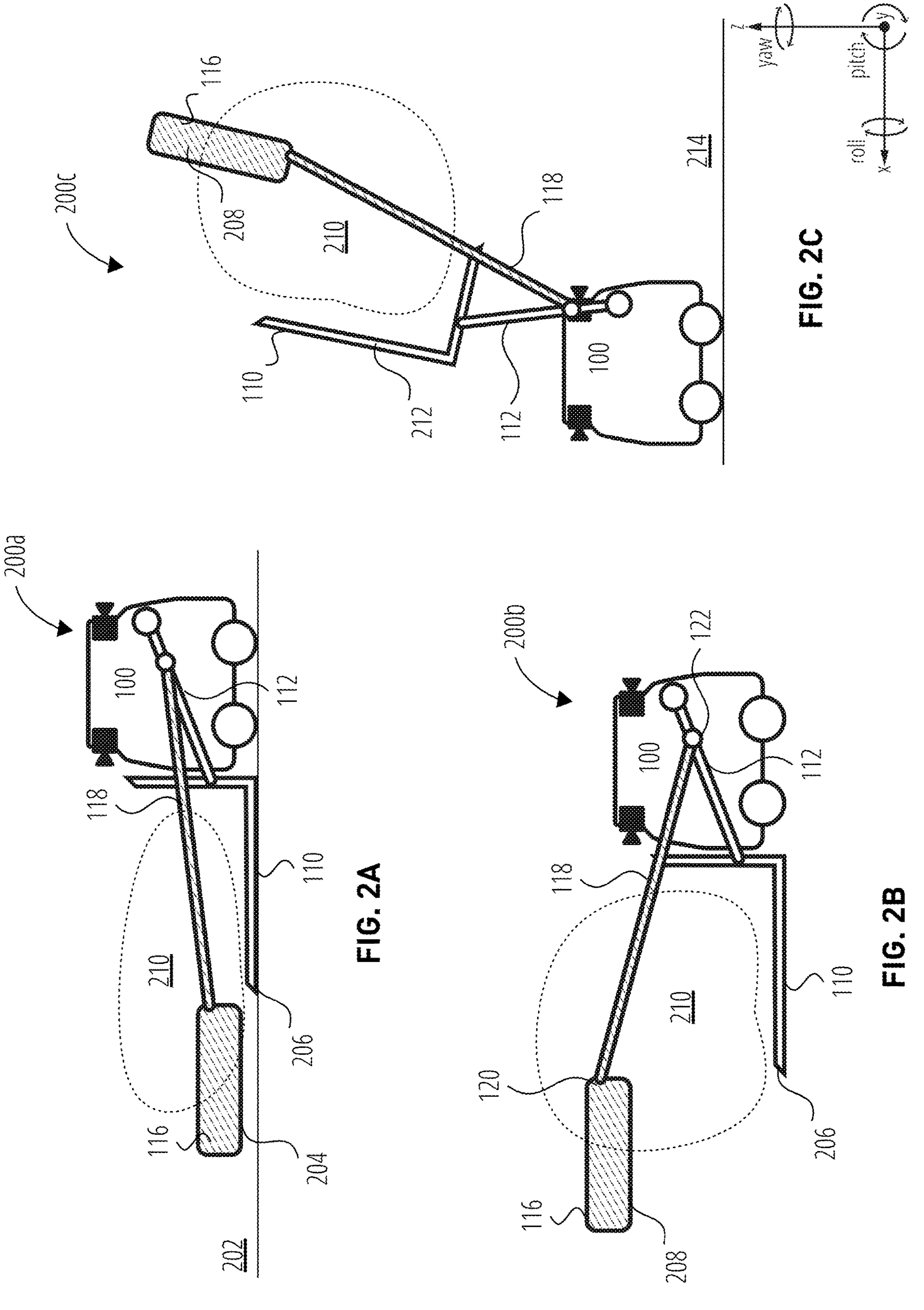
FIG. 2A illustrates a lowered scoop position and lowered pusher position 200*a* for the robot 100 in accordance with one embodiment.
FIG. 2B illustrates a lowered scoop position and raised pusher position 200*b* for the robot 100 in accordance with one embodiment.
FIG. 2C illustrates a raised scoop position and raised pusher position 200*c* for the robot 100 in accordance with one embodiment.

FIG. 2A illustrates a robot 100 such as that introduced with respect to FIG. 1A disposed in a lowered scoop position and lowered pusher position 200*a*. In this configuration, the pusher pads 116 and pusher pad arms 118 rest in a lowered pusher position 204, and the scoop 110 and scoop arm 112 rest in a lowered scoop position 206 at the front 202 of the robot 100. In this position, the scoop 110 and pusher pads 116 may roughly describe a containment area 210 as shown.

FIG. 2B illustrates a robot 100 with a lowered scoop position and raised pusher position 200*b*. Through the action of servos or other actuators at the pad pivot points 120 and pad arm pivot points 122, the pusher pads 116 and pusher pad arms 118 may be raised to a raised pusher position 208 while the scoop 110 and scoop arm 112 maintain a lowered scoop position 206. In this configuration, the pusher pads 116 and scoop 110 may roughly describe a containment area 210 as shown, in which an object taller than the scoop 110 height may rest within the scoop 110 and be held in place through pressure exerted by the pusher pads 116.

Figure 5:
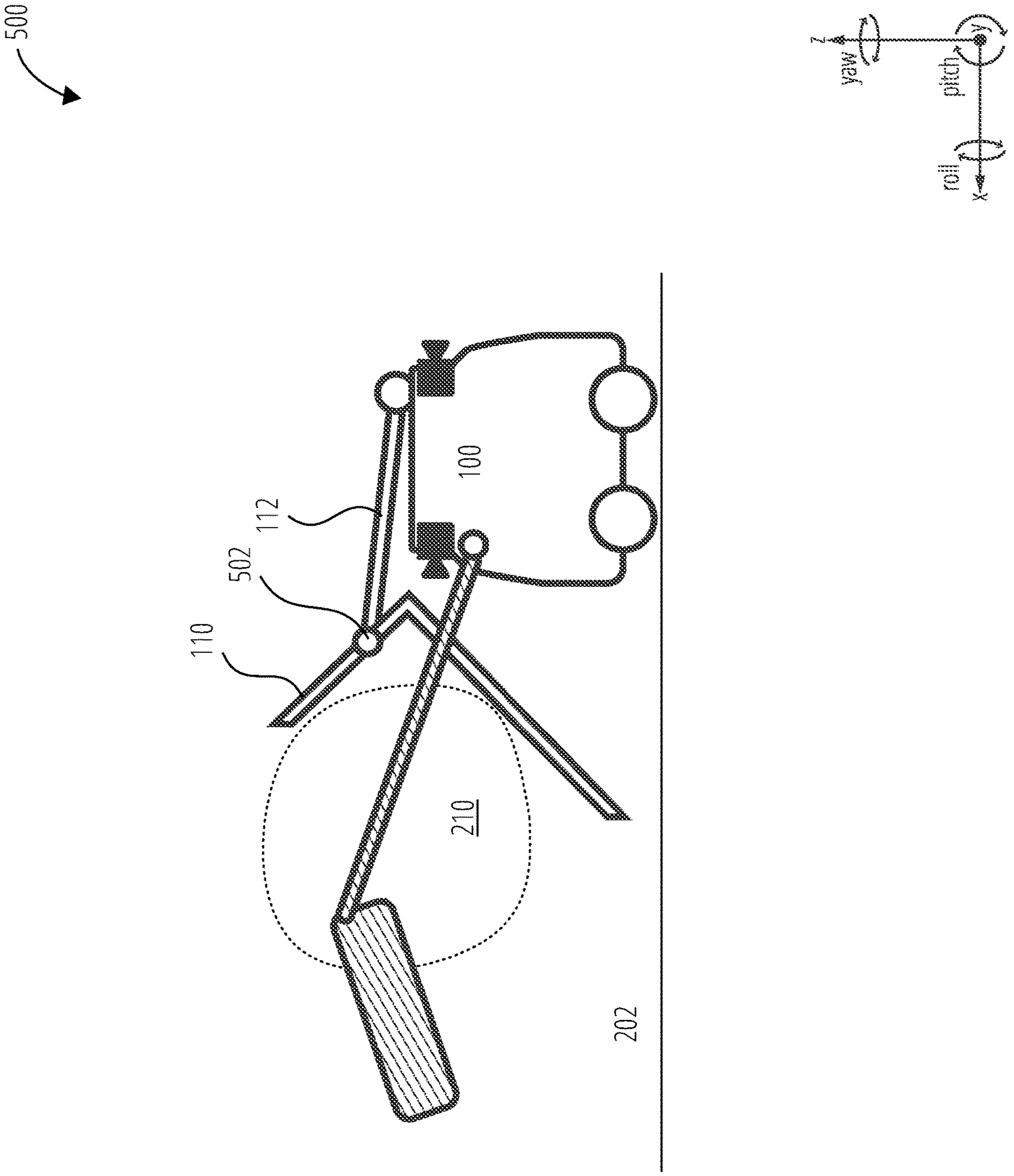
FIG. 5 illustrates a front drop position 500 for the robot 100 in accordance with one embodiment.

Pad arm pivot points 122, pad pivot points 120, scoop arm pivot points 114 and scoop pivot points 502 (as shown in FIG. 5) may provide the robot 100 a range of motion of these components beyond what is illustrated herein. The positions shown in the disclosed figures are illustrative and not meant to indicate the limits of the robot's component range of motion.

FIG. 2C illustrates a robot 100 with a raised scoop position and raised pusher position 200*c*. The pusher pads 116 and pusher pad arms 118 may be in a raised pusher position 208 while the scoop 110 and scoop arm 112 are in a raised scoop position 212. In this position, the robot 100 may be able to allow objects drop from the scoop 110 and pusher pad arms 118 to an area at the rear 214 of the robot 100.

The carrying position may involve the disposition of the pusher pads 116, pusher pad arms 118, scoop 110, and scoop arm 112, in relative configurations between the extremes of lowered scoop position and lowered pusher position 200*a* and raised scoop position and raised pusher position 200*c*.

Figure 2D:
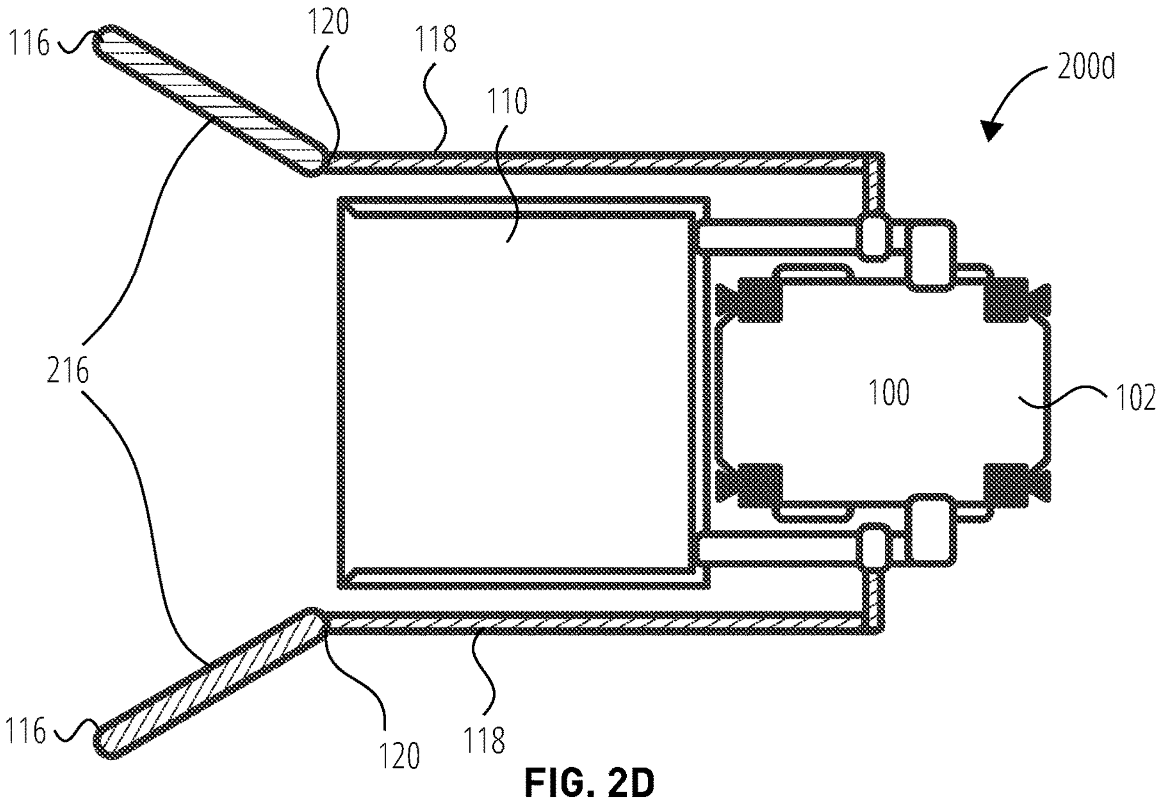
FIG. 2D illustrates a robot 100 with pusher pads extended 200*d* in accordance with one embodiment.

FIG. 2D illustrates a robot 100 with pusher pads extended 200*d*. By the action of servos or other actuators at the pad pivot points 120, the pusher pads 116 may be configured as extended pusher pads 216 to allow the robot 100 to approach objects as wide or wider than the robot chassis 102 and scoop 110. In some embodiments, the pusher pads 116 may be able to rotate through almost three hundred and sixty degrees, to rest parallel with and on the outside of their associated pusher pad arms 118 when fully extended.

Figure 2E:
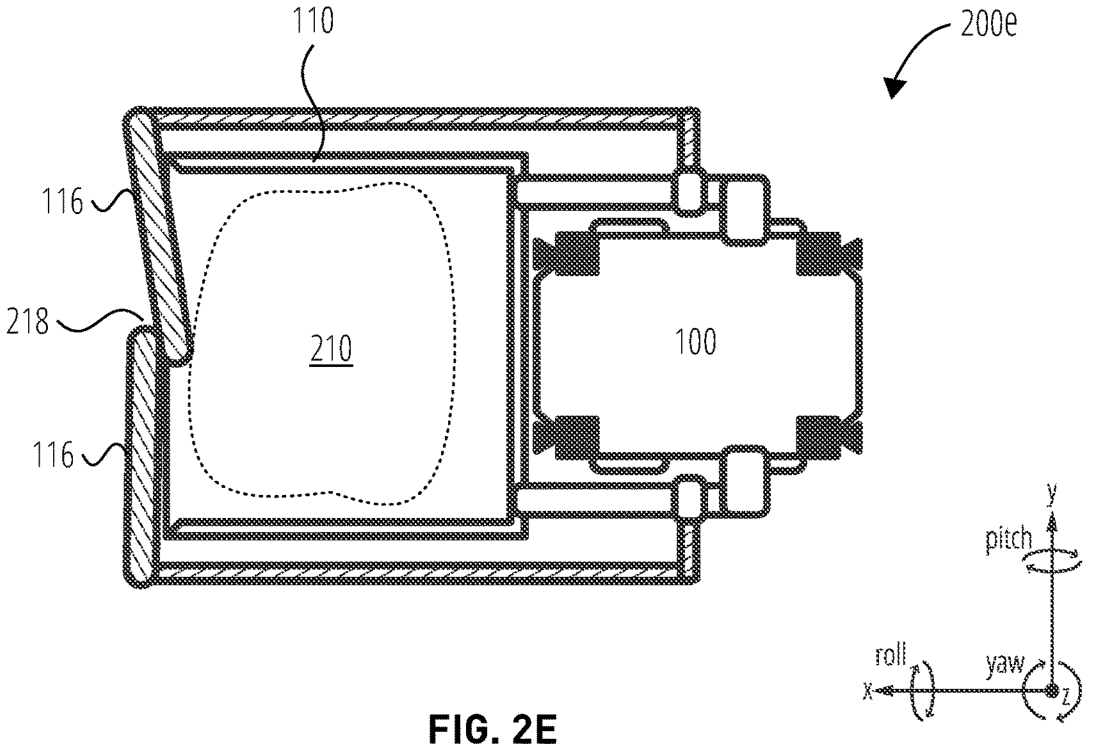
FIG. 2E illustrates a robot 100 with pusher pads retracted 200*e* in accordance with one embodiment.

FIG. 2E illustrates a robot 100 with pusher pads retracted 200*e*. The closed pusher pads 218 may roughly define a containment area 210 through their position with respect to the scoop 110. In some embodiments, the pusher pads 116 may be able to rotate farther than shown, through almost three hundred and sixty degrees, to rest parallel with and inside of the side walls of the scoop 110.

Figures 3A, 3B, 3C:
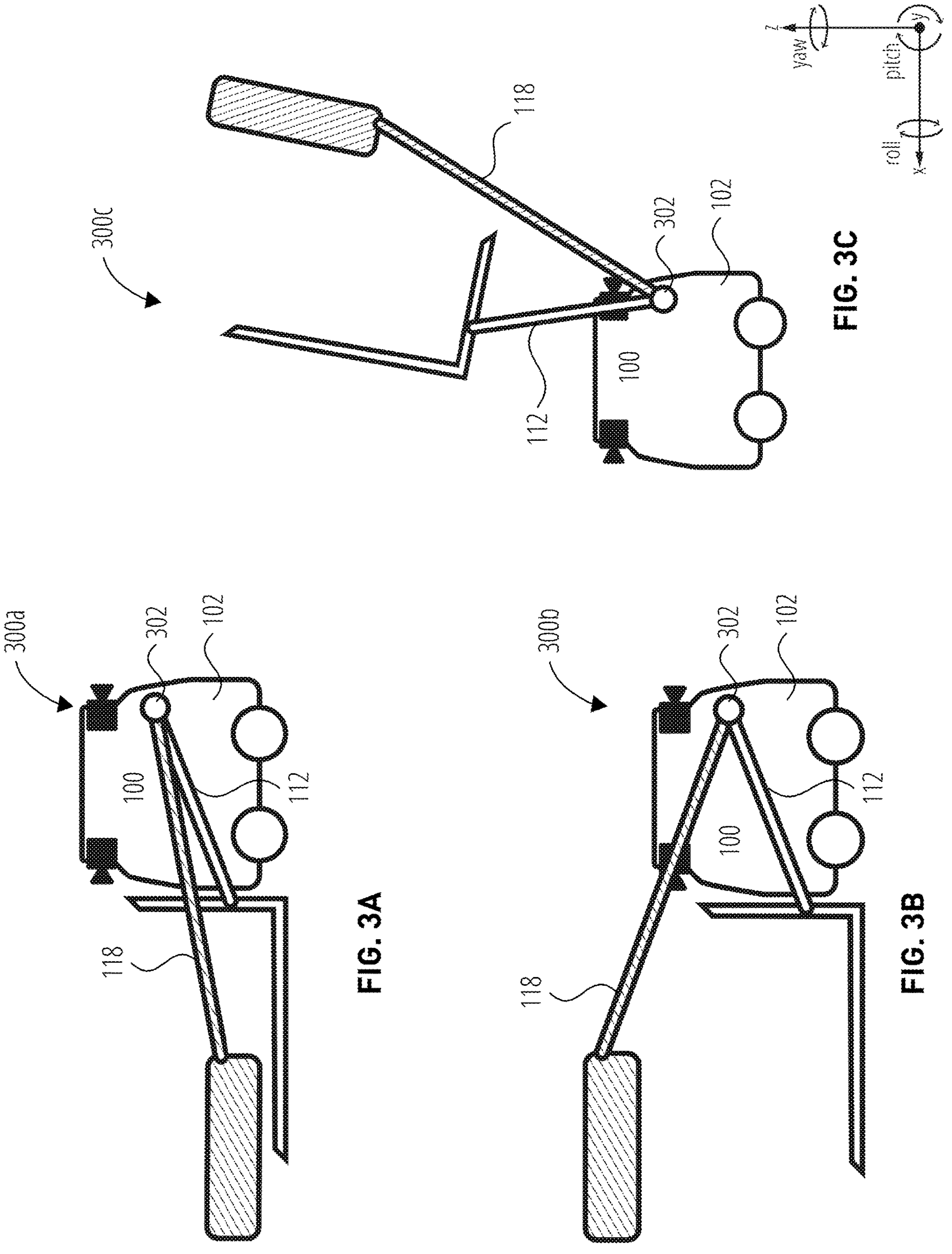
FIG. 3A illustrates a lowered scoop position and lowered pusher position 300*a* for the robot 100 in accordance with one embodiment.
FIG. 3B illustrates a lowered scoop position and raised pusher position 300*b* for the robot 100 in accordance with one embodiment.
FIG. 3C illustrates a raised scoop position and raised pusher position 300*c* for the robot 100 in accordance with one embodiment.

FIG. 3A through FIG. 3C illustrate a robot 100 such as that introduced with respect to FIG. 1A through FIG. 2E. In such an embodiment, the pusher pad arms 118 may be controlled by a servo or other actuator at the same point of connection 302 with the chassis 102 as the scoop arms 112. The robot 100 may be seen disposed in a lowered scoop position and lowered pusher position 300*a*, a lowered scoop position and raised pusher position 300*b*, and a raised scoop position and raised pusher position 300*c*. This robot 100 may be configured to perform the algorithms disclosed herein.

The point of connection shown between the scoop arms 112/pusher pad arms 118 and the chassis 102 is an exemplary position and is not intended to limit the physical location of this point of connection. Such connection may be made in various locations as appropriate to the construction of the chassis 102 and arms, and the applications of intended use.

Figure 4C:
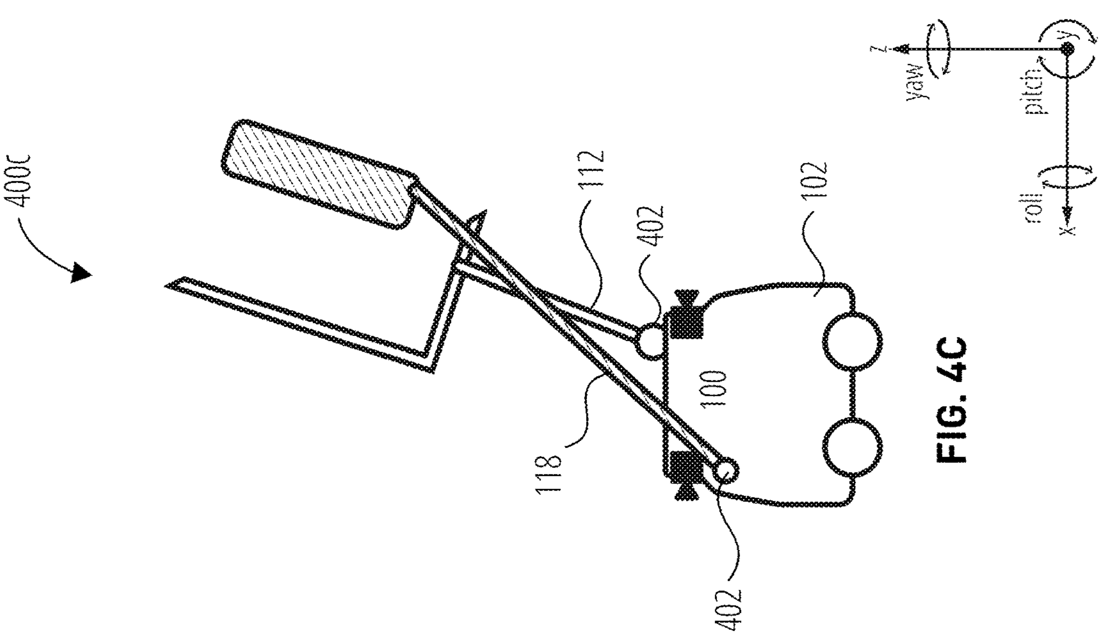
FIG. 4C illustrates a raised scoop position and raised pusher position 400*c* for the robot 100 in accordance with one embodiment.
Figure 4A:
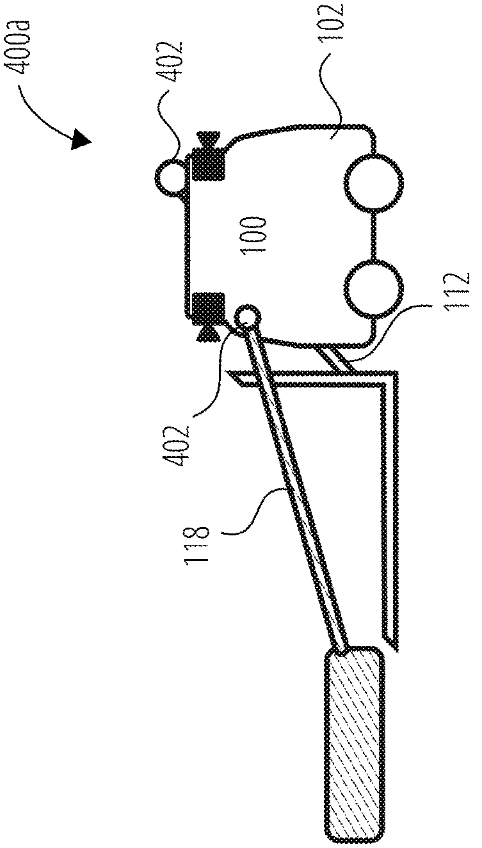
FIG. 4A illustrates a lowered scoop position and lowered pusher position 400*a* for the robot 100 in accordance with one embodiment.
Figure 4B:
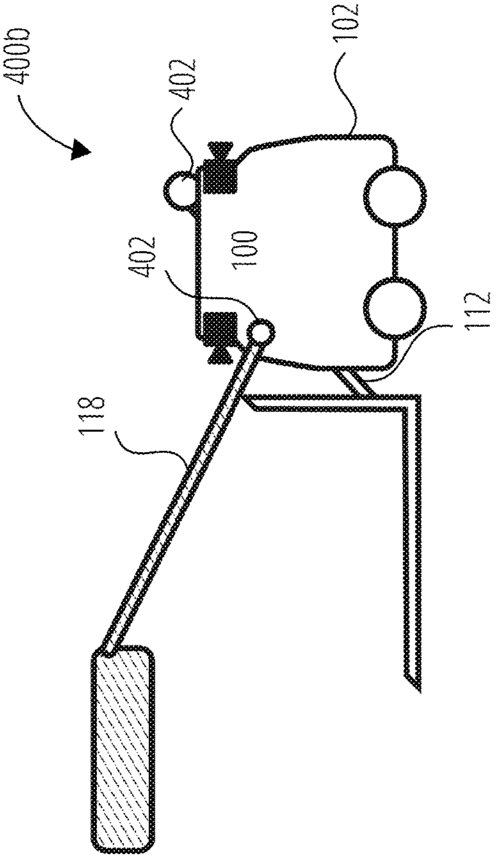
FIG. 4B illustrates a lowered scoop position and raised pusher position 400*b* for the robot 100 in accordance with one embodiment.

FIG. 4A through FIG. 4C illustrate a robot 100 such as that introduced with respect to FIG. 1A through FIG. 2E. In such an embodiment, the pusher pad arms 118 may be controlled by a servo or servos (or other actuators) at different points of connection 402 with the chassis 102 from those controlling the scoop arm 112. The robot 100 may be seen disposed in a lowered scoop position and lowered pusher position 400*a*, a lowered scoop position and raised pusher position 400*b*, and a raised scoop position and raised pusher position 400*c*. This robot 100 may be configured to perform the algorithms disclosed herein.

The different points of connection 402 between the scoop arm and chassis and the pusher pad arms and chassis shown are exemplary positions and not intended to limit the physical locations of these points of connection. Such connections may be made in various locations as appropriate to the construction of the chassis and arms, and the applications of intended use.

FIG. 5 illustrates a robot 100 such as was previously introduced in a front drop position 500. The arms of the robot 100 may be positioned to form a containment area 210 as previously described.

The robot 100 may be configured with a scoop pivot point 502 where the scoop 110 connects to the scoop arm 112. The scoop pivot point 502 may allow the scoop 110 to be tilted forward and down while the scoop arm 112 is raised, allowing objects in the containment area 210 to slide out and be deposited in an area to the front 202 of the robot 100.

Figure 6A:
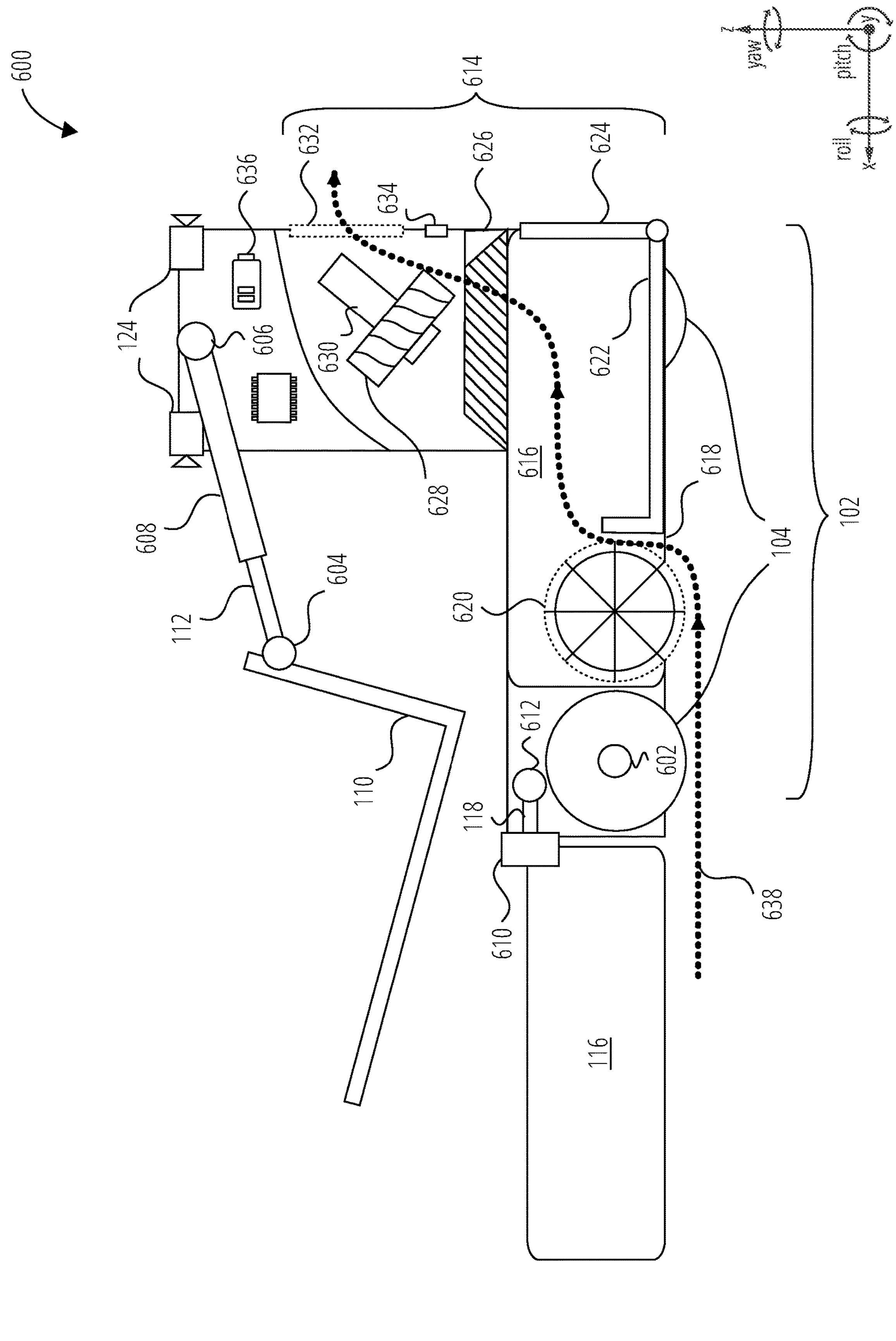
FIG. 6A illustrates a left side view of a tidying robot 600 in accordance with one embodiment.
Figure 6B:
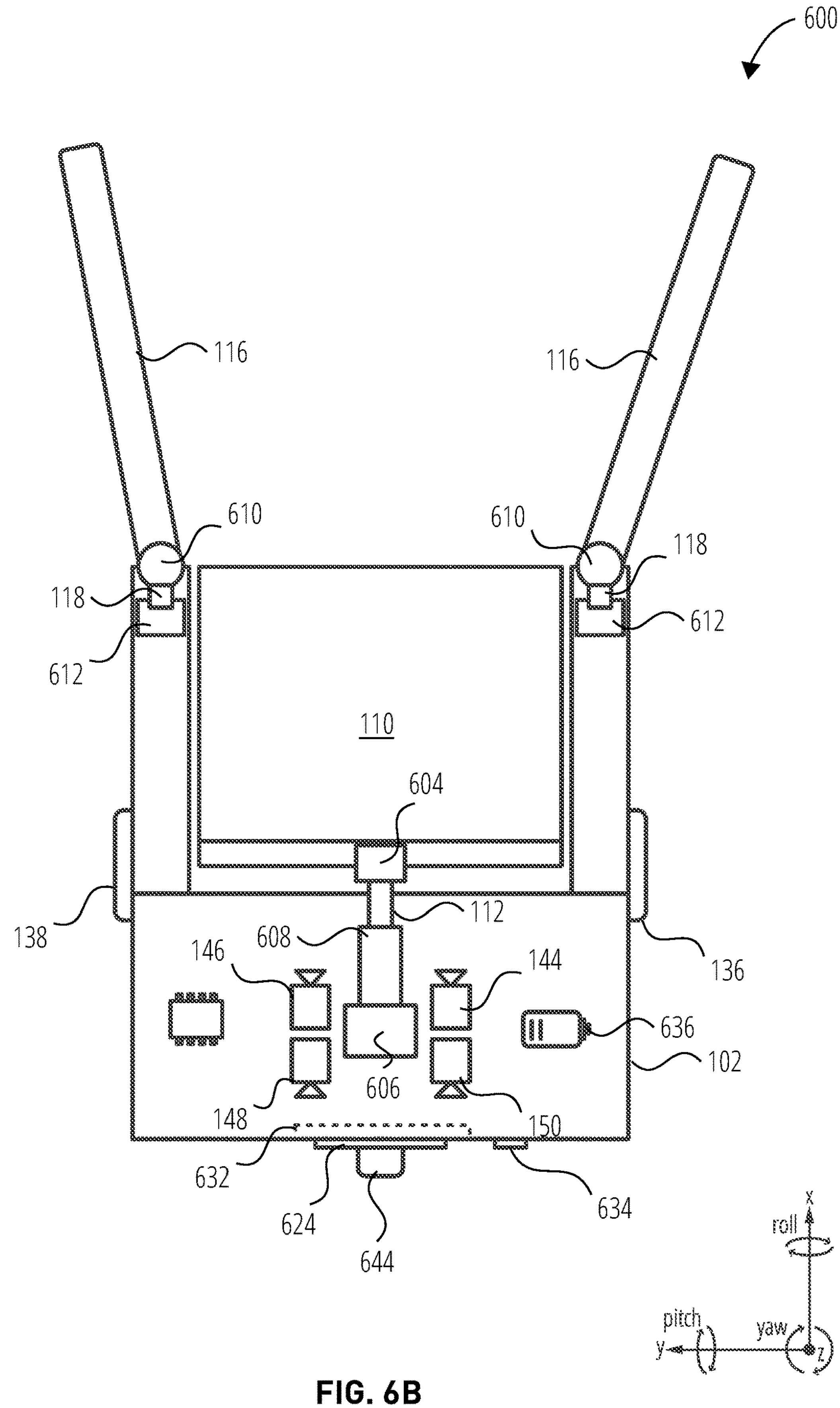
FIG. 6B illustrates a top view of a tidying robot 600 in accordance with one embodiment.
Figure 6C:
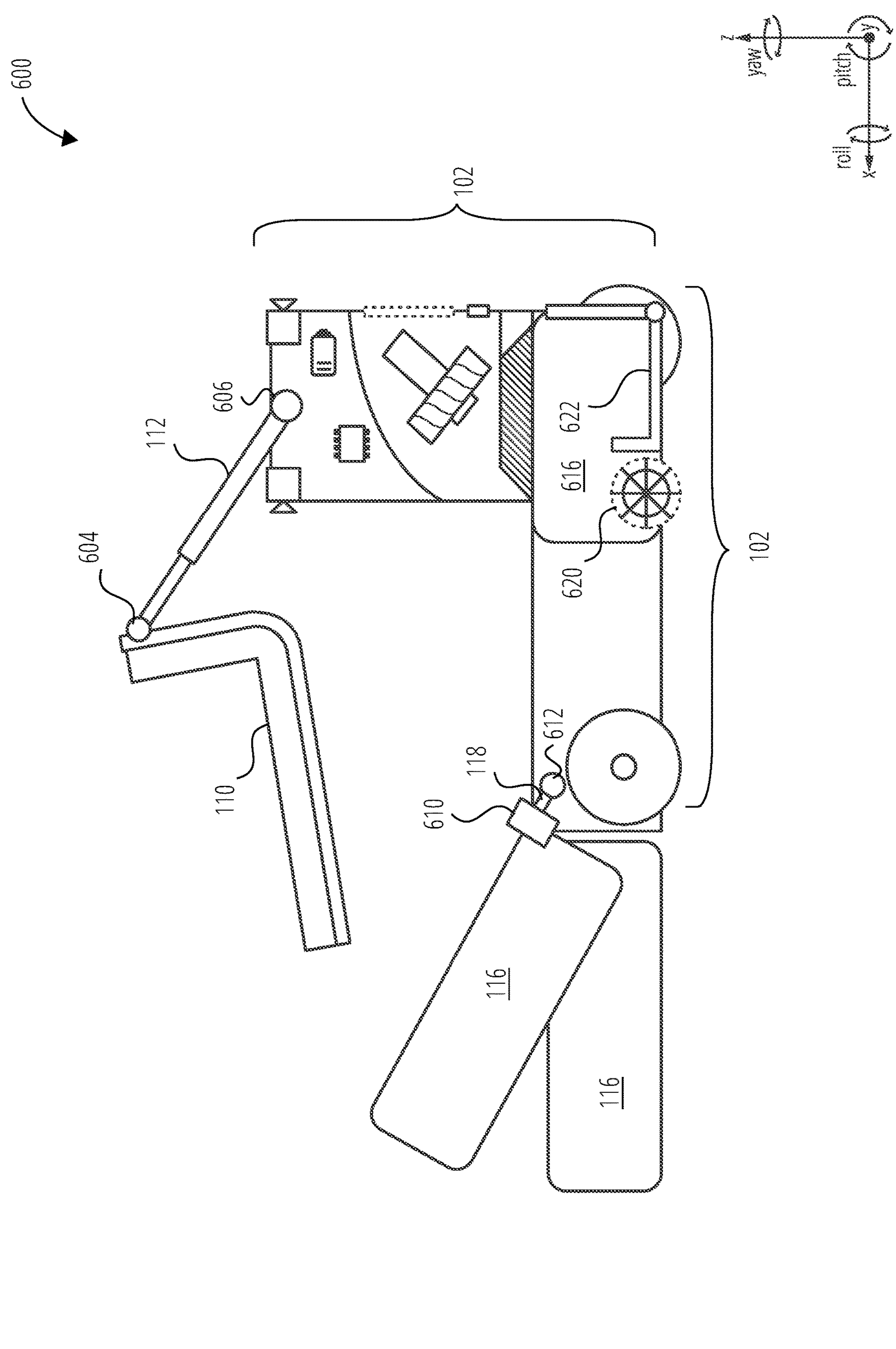
FIG. 6C illustrates a left side view of a tidying robot 600 in an alternative position in accordance with one embodiment.
Figure 6D:
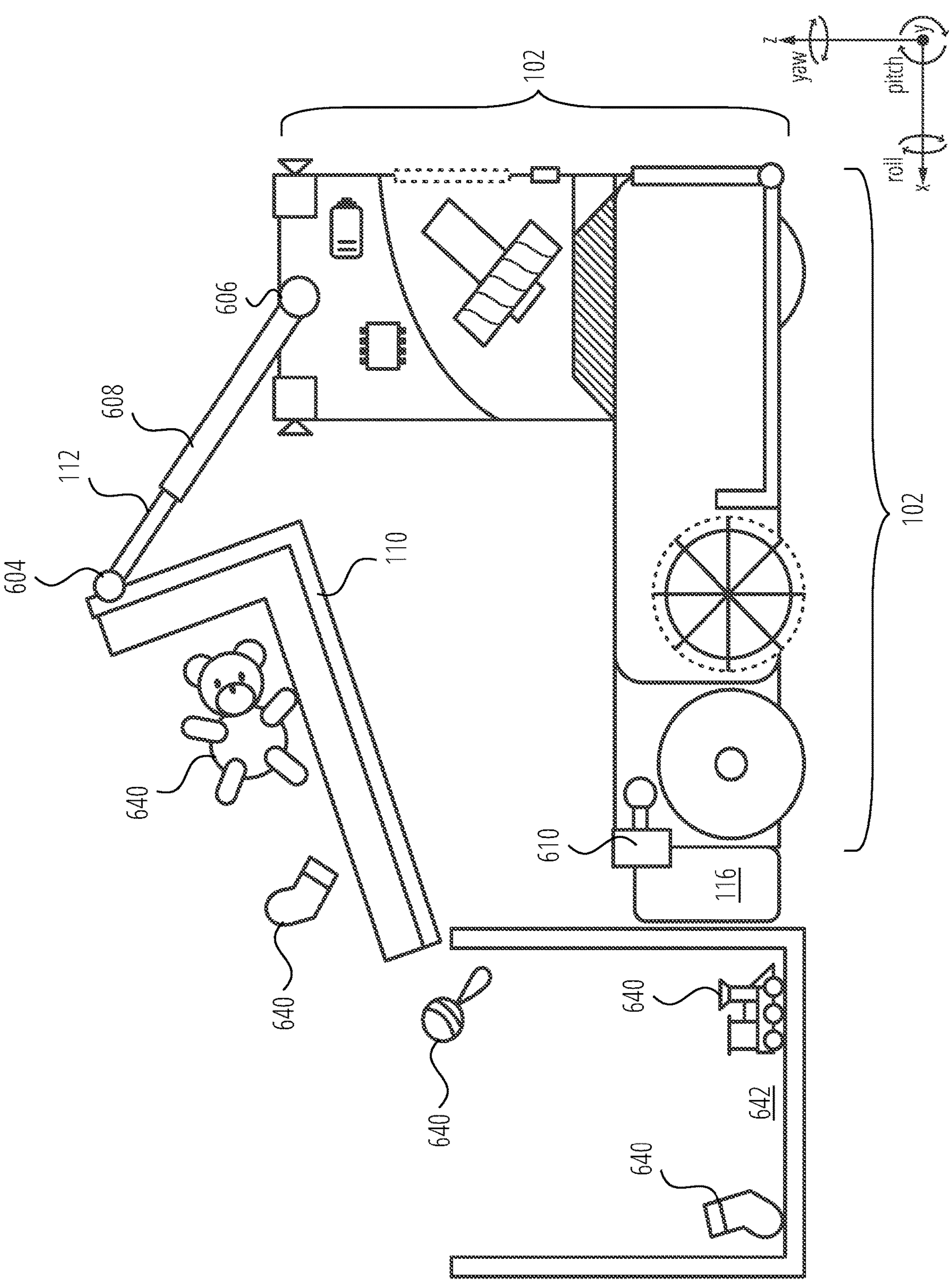
FIG. 6D illustrates a tidying robot 600 performing a front dump in accordance with one embodiment.

FIG. 6A-FIG. 6D illustrate a tidying robot 600 in accordance with one embodiment. FIG. 6A shows a left side view, FIG. 6B shows a top view, FIG. 6C shows a left side view of the tidying robot 600 in an alternative position, and FIG. 6D shows the tidying robot 600 performing a front dump action. The tidying robot 600 may comprise a chassis 102, a mobility system 104 and at least one motor 602 to actuate it; a scoop 110 and an associated motor 604 to rotate the scoop 110 into different positions; a scoop arm 112 and an associated motor 606 and linear actuator 608 to raise/lower and extend the scoop arm 112, respectively; pusher pads 116 and associated motors 610 to rotate the pusher pads 116 into different positions; pusher pad arms 118 and associated motors 612 to raise, lower, and extend the pusher pad arms 118; a vacuum compartment 616 having a vacuum compartment intake port 618, a rotating brush 620, a dirt collector 622, a dirt release latch 624, a vacuum compartment filter 626, a vacuum compartment fan 628 and a vacuum compartment motor 630 to actuate it, and a vacuum compartment exhaust port 632; a robot charge connector 634 to connect to the base station 700 described in greater detail with respect to FIG. 7A and FIG. 7B below; a battery 636; cameras 124; and a robotic control system 1100, as described in greater detail with respect to FIG. 11.

The tidying robot 600 may be configured, incorporate features of, and behave similarly to the robot 100 described with respect to the preceding figures. In addition to the features of the robot 100, the tidying robot 600 may incorporate a robot vacuum system 614. A vacuum compartment 616 may have a vacuum compartment intake port 618 allowing cleaning airflow 638 into the vacuum compartment 616. The vacuum compartment intake port 618 may be configured with a rotating brush 620 to impel dirt and dust into the vacuum compartment 616. Cleaning airflow 638 may be induced by a vacuum compartment fan 628 to flow through the vacuum compartment 616 from the vacuum compartment intake port 618 to a vacuum compartment exhaust port 632, exiting the vacuum compartment 616 at the vacuum compartment exhaust port 632. The vacuum compartment exhaust port 632 may be covered by a grating or other element permeable to cleaning airflow 638 but able to prevent the ingress of objects into the chassis 102 of the tidying robot 600.

Figure 7B:
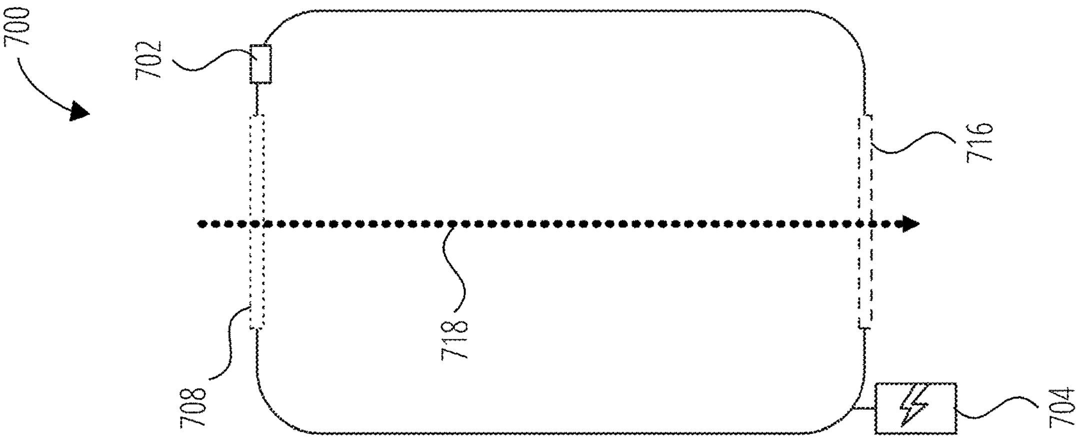
FIG. 7B illustrates a top view of a base station 700 in accordance with one embodiment.
Figure 7A:
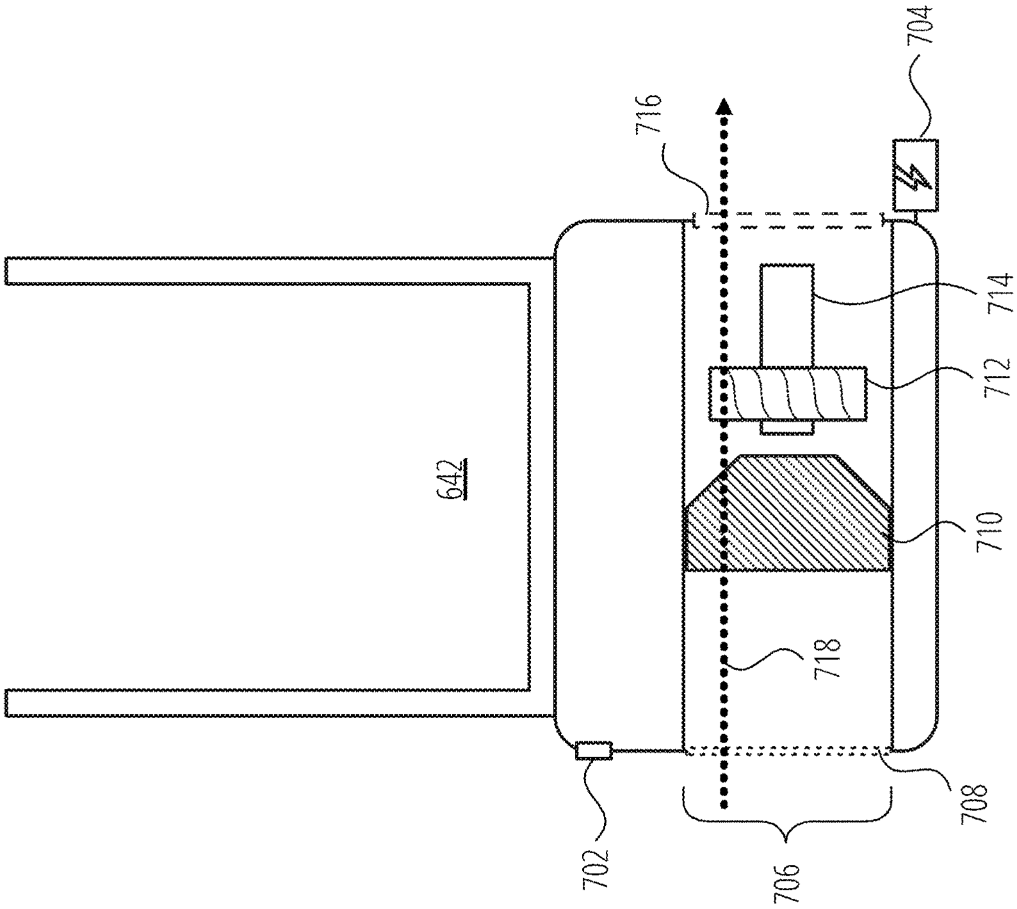
FIG. 7A illustrates a left side view of a base station 700 in accordance with one embodiment.

A vacuum compartment filter 626 may be disposed between the vacuum compartment intake port 618 and the vacuum compartment exhaust port 632. The vacuum compartment filter 626 may prevent dirt and dust from entering and clogging the vacuum compartment fan 628. The vacuum compartment filter 626 may be disposed such that blocked dirt and dust are deposited within a dirt collector 622. The dirt collector 622 may be closed off from the outside of the chassis 102 by a dirt release latch 624. The dirt release latch 624 may be configured to open when the tidying robot 600 is docked at a base station 700 with a vacuum compartment 616 emptying system, as is illustrated in FIG. 7A and FIG. 7B below.

The drawings in this disclosure may not be to scale. One of ordinary skill in the art will realize that elements, such as the rotating brush, may be located further back in the device, as shown in FIG. 6C.

As illustrated in FIG. 6B, the mobility system 104 of the tidying robot 600 may include a right front wheel 136, a left front wheel 138, and a single rear wheel 644, in contrast to the four wheels shown for the robot 100. In one embodiment, the motor 602 of the mobility system 104 may actuate the right front wheel 136 and left front wheel 138 while the single rear wheel 644 provides support and reduced friction with no driving force, as indicated in FIG. 6A. In another embodiment, the tidying robot 600 may have additional motors to provide all-wheel drive, may use a different number of wheels, or may use caterpillar tracks or other mobility devices in lieu of wheels.

As indicated in FIG. 6B, the cameras 124 of the tidying robot 600 may comprise a front right camera 144, a front left camera 146, a rear left camera 148, and a rear right camera 150, as is shown and described for the robot 100.

In one embodiment, as shown in FIG. 6B, the scoop arm 112 may be configured with a linear actuator 608. This may allow the scoop arm 112 to extend and retract linearly, moving the scoop 110 away from or toward the chassis 102 of the tidying robot 600, independently from the rotation of the scoop 110 or scoop arm 112.

FIG. 6C and FIG. 6D illustrate degrees of freedom of motion with which the tidying robot 600 may be configured. Each pusher pad 116 may be able to raise and lower through the action of the motors 612 upon the pusher pad arms 118. Each pusher pad 116 may also be able to rotate horizontally through the action of the motors 610 upon the pusher pads 116, such that the pusher pads 116 may fold inward, as illustrated in FIG. 6D.

The scoop 110 may be rotated vertically with respect to the scoop arm 112 through the action of its motor 604. As previously described, it may be moved away from or toward the chassis 102 through the action of a linear actuator 608 configured with the scoop arm 112. The scoop 110 may also be raised and lowered by the rotation of the scoop arm 112, actuated by the motor 606.

FIG. 6D illustrates how the positions of the components of the tidying robot 600 may be configured such that the pusher pads 116 may be folded against the chassis 102 through the action of motor 610 so the tidying robot 600 may approach an object collection bin 642, and the scoop 110 may be raised by motor 606, extended by linear actuator 608, and tilted by motor 604 so that tidyable objects 640 carried in the scoop 110 may be deposited in an object collection bin 642 in a front dump operation.

FIG. 7A and FIG. 7B illustrate a base station 700 in accordance with one embodiment. FIG. 7A shows a left side view and FIG. 7B shows a top view. The base station 700 may comprise an object collection bin 642, a base station charge connector 702, a power source connection 704, and a vacuum emptying system 706 including a vacuum emptying system intake port 708, a vacuum emptying system filter bag 710, a vacuum emptying system fan 712, a vacuum emptying system motor 714, and a vacuum emptying system exhaust port 716.

The object collection bin 642 may be configured on top of the base station 700 so that a tidying robot 600 may deposit objects in the scoop 110 into the object collection bin 642. The base station charge connector 702 may be electrically coupled to the power source connection 704. The power source connection 704 may be a cable connector configured to couple through a cable to an alternating current (AC) or direct current (DC) source, a battery, or a wireless charging port, as will be readily apprehended by one of ordinary skill in the art. In one embodiment, the power source connection 704 is a cable and male connector configured to couple with 120V AC power, such as may be provided by a conventional U. S. home power outlet.

The vacuum emptying system 706 may include a vacuum emptying system intake port 708 allowing vacuum emptying airflow 718 into the vacuum emptying system 706. The vacuum emptying system intake port 708 may be configured with a flap or other component to protect the interior of the vacuum emptying system 706 when a tidying robot 600 is not docked. A vacuum emptying system filter bag 710 may be disposed between the vacuum emptying system intake port 708 and a vacuum emptying system fan 712 to catch dust and dirt carried by the vacuum emptying airflow 718 into the vacuum emptying system 706. The vacuum emptying system fan 712 may be powered by a vacuum emptying system motor 714. The vacuum emptying system fan 712 may pull the vacuum emptying airflow 718 from the vacuum emptying system intake port 708 to the vacuum emptying system exhaust port 716, which may be configured to allow the vacuum emptying airflow 718 to exit the vacuum emptying system intake port 708. The vacuum emptying system exhaust port 716 may be covered with a grid to protect the interior of the vacuum emptying system 706.

Figure 8:
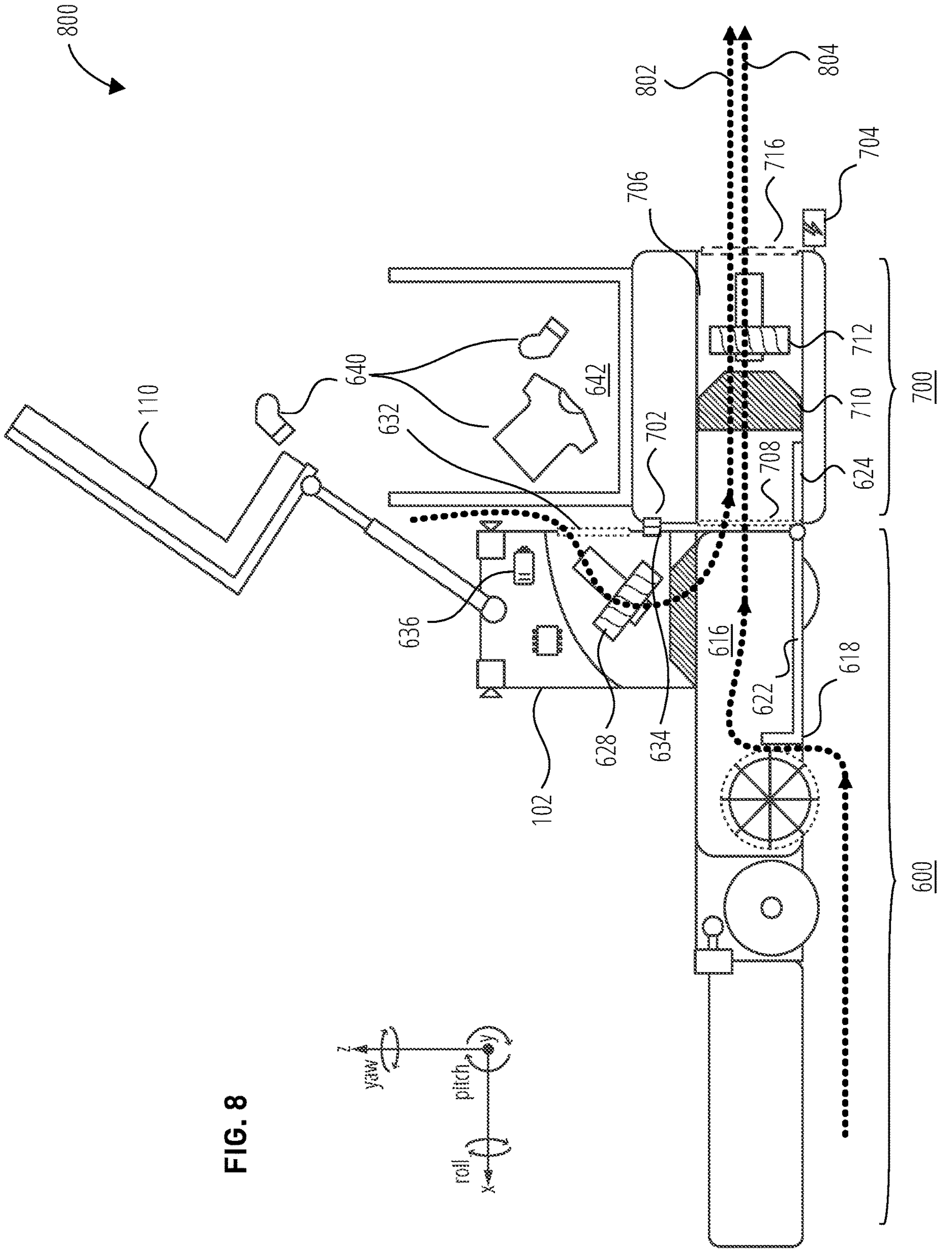
FIG. 8 illustrates a tidying robot interaction with a base station 800 in accordance with one embodiment.

FIG. 8 illustrates a tidying robot interaction with a base station 800 in accordance with one embodiment. The tidying robot 600 may back up to and dock with the base station 700 as shown. In a docked state, the robot charge connector 634 may electrically couple with the base station charge connector 702 such that electrical power from the power source connection 704 may be carried to the battery 636 and the battery 636 may be recharged toward its maximum capacity for future use.

When the tidying robot 600 is docked at a base station 700 having an object collection bin 642, the scoop 110 may be raised and rotated up and over the tidying robot 600 chassis 102, allowing tidyable objects 640 in the scoop 110 to drop into the object collection bin 642 in a rear dump operation.

When the tidying robot 600 docks at its base station 700, the dirt release latch 624 may lower, allowing the vacuum compartment 616 to interface with the vacuum emptying system 706. Where the vacuum emptying system intake port 708 is covered by a protective element, the dirt release latch 624 may interface with that element to open the vacuum emptying system intake port 708 when the tidying robot 600 is docked. The vacuum compartment fan 628 may remain inactive or may reverse direction, permitting or compelling vacuum emptying airflow 802 through the vacuum compartment exhaust port 632, into the vacuum compartment 616, across the dirt collector 622, over the dirt release latch 624, into the vacuum emptying system intake port 708, through the vacuum emptying system filter bag 710, and out the vacuum emptying system exhaust port 716, in conjunction with the operation of the vacuum emptying system fan 712. The action of the vacuum emptying system fan 712 may also pull vacuum emptying airflow 804 in from the vacuum compartment intake port 618, across the dirt collector 622, over the dirt release latch 624, into the vacuum emptying system intake port 708, through the vacuum emptying system filter bag 710, and out the vacuum emptying system exhaust port 716. In combination, vacuum emptying airflow 802 and vacuum emptying airflow 804 may pull dirt and dust from the dirt collector 622 into the vacuum emptying system filter bag 710, emptying the dirt collector 622 for future vacuuming tasks. The vacuum emptying system filter bag 710 may be manually discarded and replaced on a regular basis.

Figure 9:
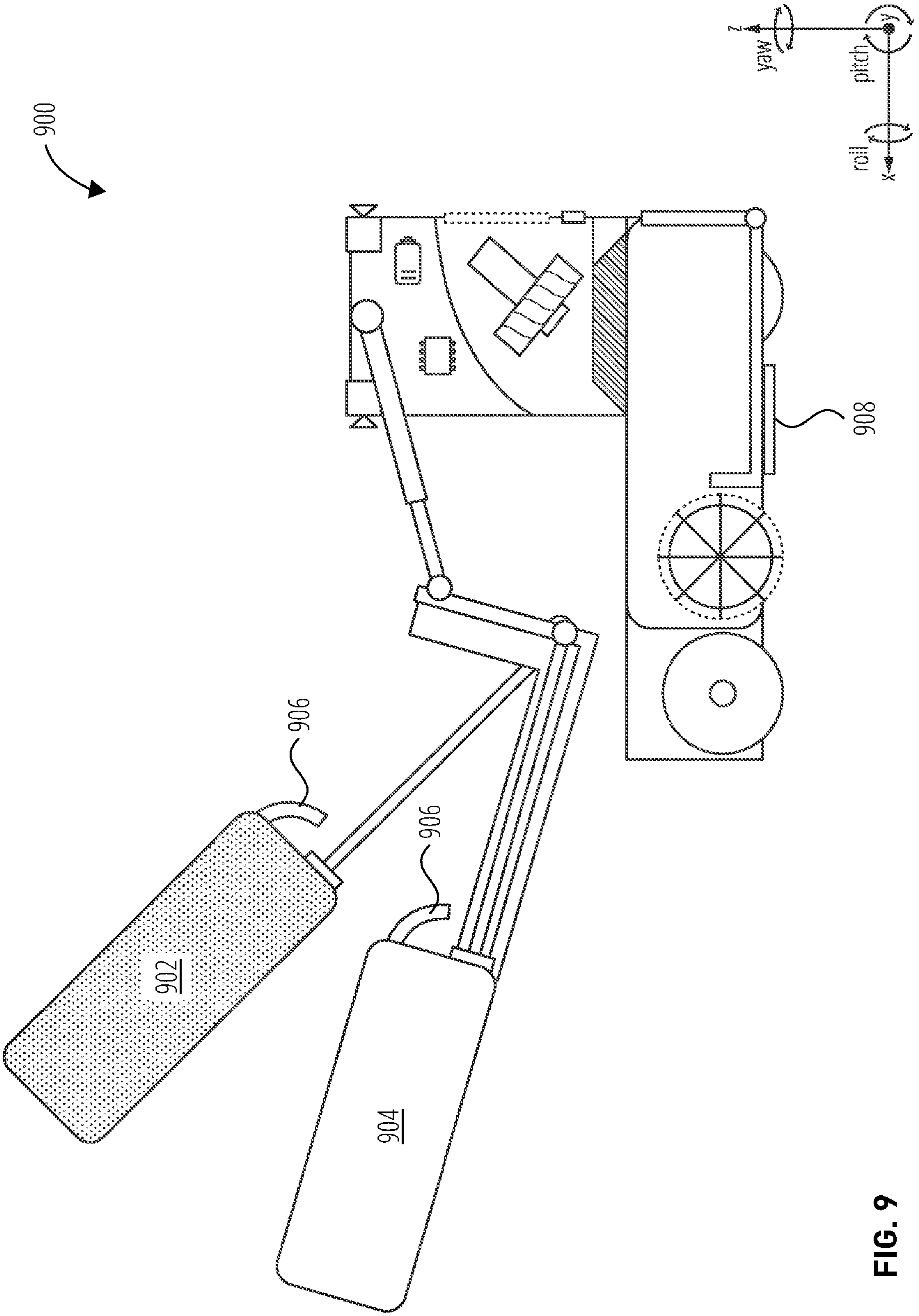
FIG. 9 illustrates a tidying robot 900 in accordance with one embodiment.

FIG. 9 illustrates a tidying robot 900 in accordance with one embodiment. The tidying robot 900 may be configured as described previously with respect to the robot 100 of FIG. 1A—FIG. 5 and the tidying robot 600 of FIG. 6A-FIG. 6D and FIG. 8. In addition, the tidying robot 900 may also include hooks 906 attached to its pusher pads pusher pad 116 and a mop pad 908.

In one embodiment, the pusher pads pusher pad 116 may be attached to the back of the scoop 110 as shown, instead of being attached to the chassis 102 of the tidying robot 900. There may be a hook on each of the pusher pads pusher pad 116 such that, when correctly positioned, the hook 906 may interface with a handle in order to open or close a drawer. Alternatively, there may be an actuated gripper on the back of the pusher arms that may similarly be used to grasp a handle to open or close drawers. When the pusher pads pusher pad 116 are being used to push or sweep objects into the scoop 110, the pusher pad inner surfaces 902 may be oriented inward, as indicated by pusher pad inner surface 902 (patterned) and pusher pad outer surface 904 (solid) as illustrated in FIG. 9, keeping the hooks 906 from impacting surrounding objects. When the hooks 906 are needed, the pusher pads pusher pad 116 may fold out and back against the scoop such that the solid pusher pad outer surfaces 904 face inward, the patterned pusher pad inner surfaces 902 face outward, and the hooks are oriented forward for use.

In one embodiment, the tidying robot 900 may include a mop pad 908 that may be used to mop a hard floor such as tile, vinyl, or wood during the operation of the tidying robot 900. The mop pad 908 may be a fabric mop pad that may be used to mop the floor after vacuuming. The mop pad 908 may be removably attached to the bottom of the tidying robot 900 chassis 102 and may need to be occasionally removed and washed or replaced when dirty.

In one embodiment, the mop pad 908 may be attached to an actuator to raise and lower it onto and off of the floor. In this way, the tidying robot 900 may keep the mop pad 908 raised during operations such as tidying objects on carpet, but may lower the mop pad 908 when mopping a hard floor. In one embodiment, the mop pad 908 may be used to dry mop the floor. In one embodiment, the tidying robot 900 may be able to detect and distinguish liquid spills or sprayed cleaning solution and may use the mop pad 908 to absorb spilled or sprayed liquid. In one embodiment, a fluid reservoir may be configured within the tidying robot 900 chassis 102, and may be opened or otherwise manipulated to wet the mop pad 908 with water or water mixed with cleaning fluid during a mopping task. In another embodiment, such a fluid reservoir may couple to spray nozzles at the front of the chassis 102, which may wet the floor in front of the mop pad 908, the mop pad 908 then wiping the floor and absorbing the fluid.

Figure 10A:
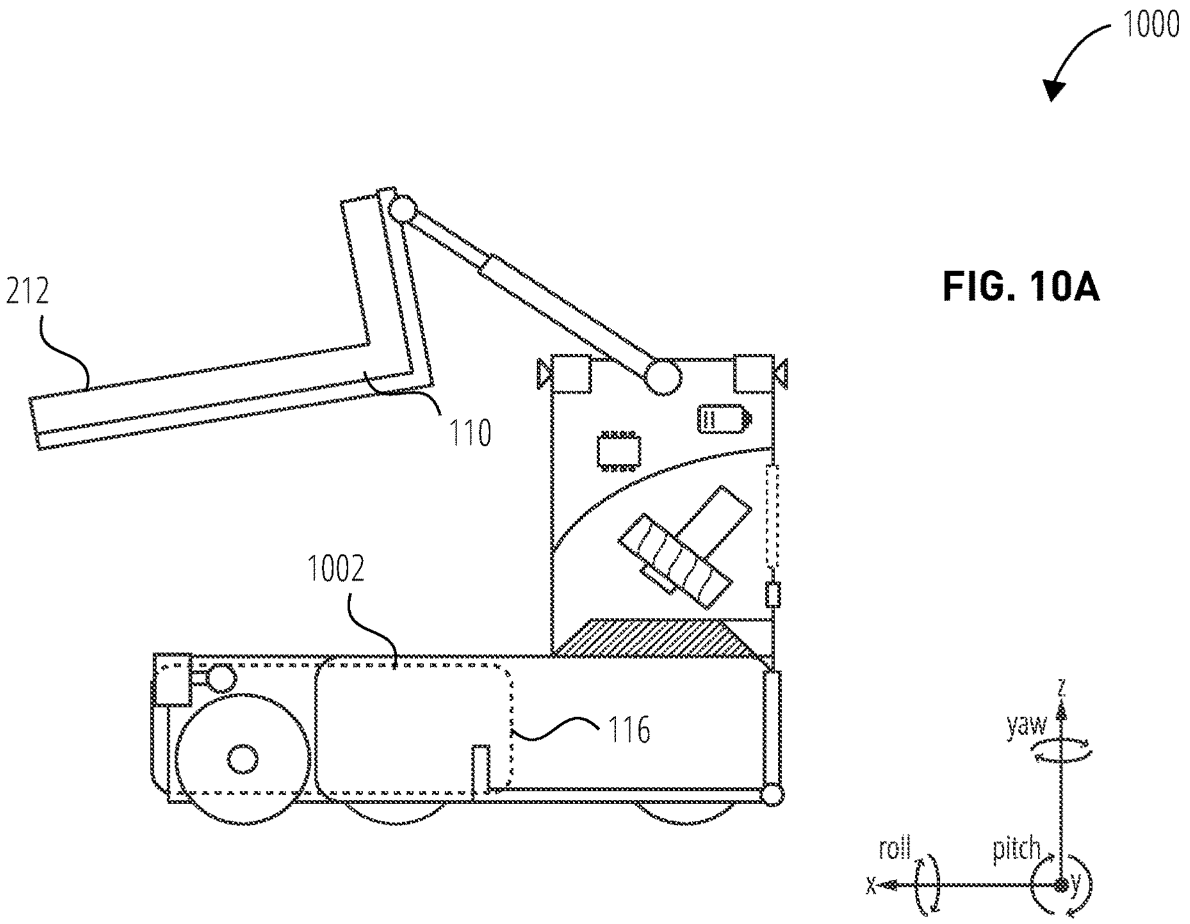
FIG. 10A and FIG. 10B illustrate a tidying robot in a pre-vacuum sweep position 1000 in accordance with one embodiment.
Figure 10B:
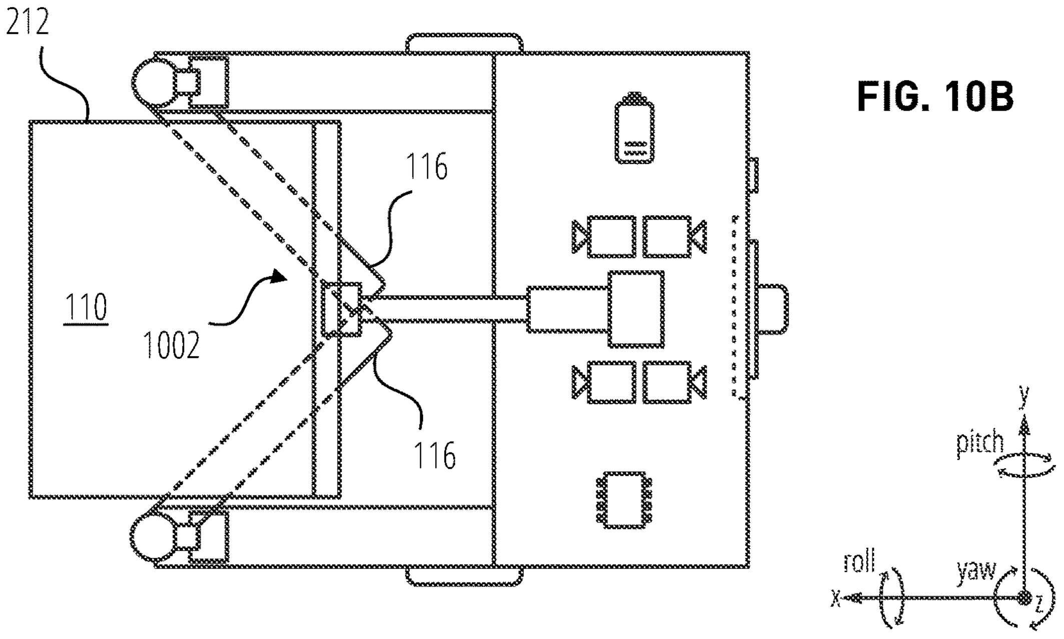

FIG. 10A and FIG. 10B illustrate how the positions of the components of the tidying robot 600 may be configured in a tidying robot in a pre-vacuum sweep position 1000, such that the scoop 110 may be moved into a raised scoop position 212 and the pusher pads 116 may be folded inward in an inverted wedge position 1002. In this position, the pusher pads 116 may capture items of debris, keeping such items away from the vacuuming components of the tidying robot 600.

Figure 11:
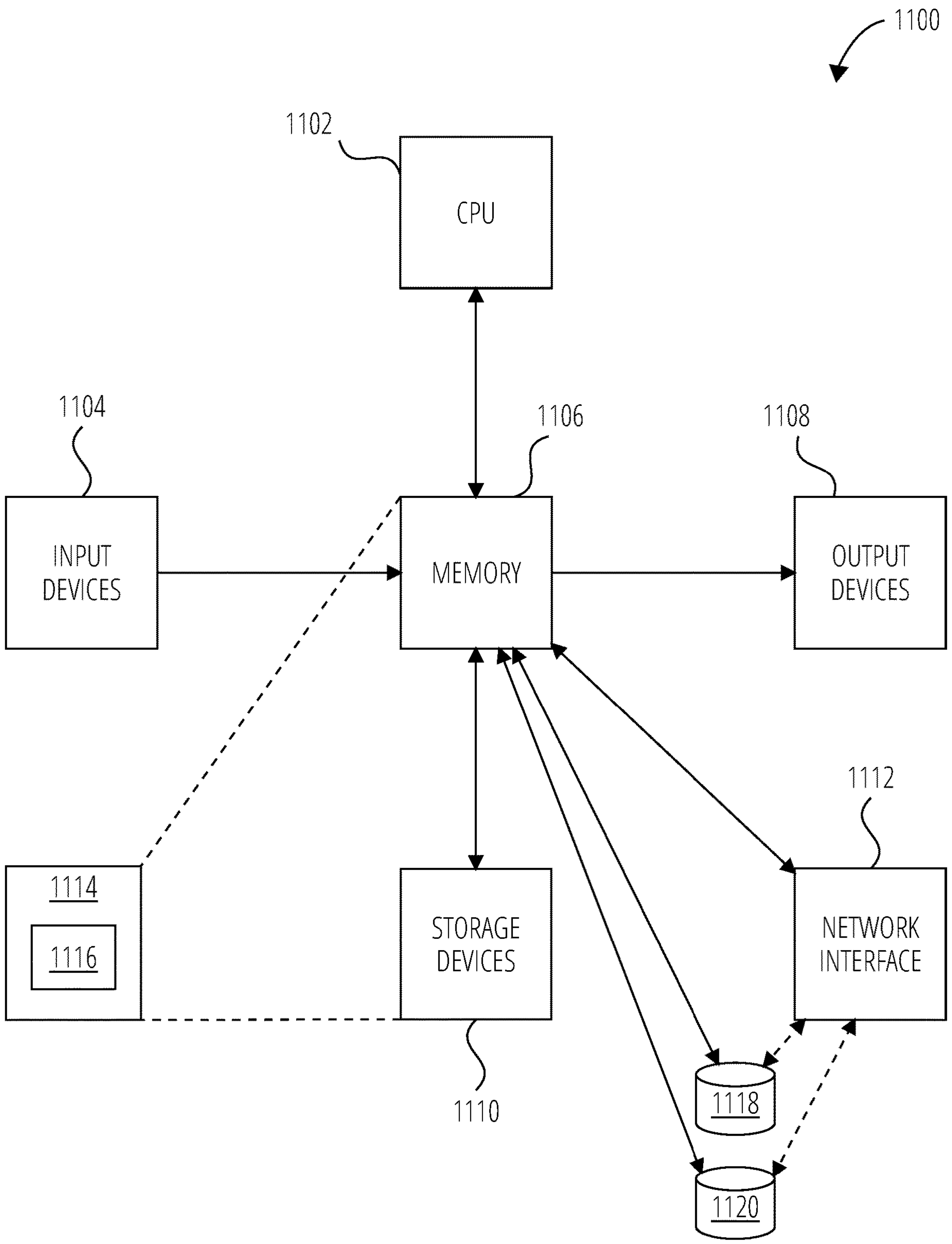
FIG. 11 illustrates an embodiment of a robotic control system 1100 to implement components and process steps of the system described herein.

FIG. 11 depicts an embodiment of a robotic control system 1100 to implement components and process steps of the systems described herein. Some or all portions of the robotic control system 1100 and its operational logic may be contained within the physical components of a robot and/or within a cloud server in communication with the robot and/or within the physical components of a user's mobile computing device, such as a smartphone, tablet, laptop, personal digital assistant, or other such mobile computing devices. In one embodiment, aspects of the robotic control system 1100 on a cloud server and/or user's mobile computing device may control more than one robot at a time, allowing multiple robots to work in concert within a working space.

Input devices 1104 (e.g., of a robot or companion device such as a mobile phone or personal computer) comprise transducers that convert physical phenomena into machine internal signals, typically electrical, optical, or magnetic signals. Signals may also be wireless in the form of electromagnetic radiation in the radio frequency (RF) range but also potentially in the infrared or optical range. Examples of input devices 1104 are contact sensors which respond to touch or physical pressure from an object or proximity of an object to a surface, mice which respond to motion through space or across a plane, microphones which convert vibrations in the medium (typically air) into device signals, scanners which convert optical patterns on two or three-dimensional objects into device signals. The signals from the input devices 1104 are provided via various machine signal conductors (e.g., busses or network interfaces) and circuits to memory 1106.

The memory 1106 is typically what is known as a first- or second-level memory device, providing for storage (via configuration of matter or states of matter) of signals received from the input devices 1104, instructions and information for controlling operation of the central processing unit or CPU 1102, and signals from storage devices 1110. The memory 1106 and/or the storage devices 1110 may store computer-executable instructions and thus forming logic 1114 that when applied to and executed by the CPU 1102 implement embodiments of the processes disclosed herein. Logic 1114 may include portions of a computer program, along with configuration data, that are run by the CPU 1102 or another processor. Logic 1114 may include one or more machine learning models 1116 used to perform the disclosed actions. In one embodiment, portions of the logic 1114 may also reside on a mobile or desktop computing device accessible by a user to facilitate direct user control of the robot.

Information stored in the memory 1106 is typically directly accessible to the CPU 1102 of the device. Signals input to the device cause the reconfiguration of the internal material/energy state of the memory 1106, creating in essence a new machine configuration, influencing the behavior of the robotic control system 1100 by configuring the CPU 1102 with control signals (instructions) and data provided in conjunction with the control signals.

Second- or third-level storage devices 1110 may provide a slower but higher capacity machine memory capability. Examples of storage devices 1110 are hard disks, optical disks, large-capacity flash memories or other non-volatile memory technologies, and magnetic memories.

In one embodiment, memory 1106 may include virtual storage accessible through a connection with a cloud server using the network interface 1112, as described below. In such embodiments, some or all of the logic 1114 may be stored and processed remotely.

The CPU 1102 may cause the configuration of the memory 1106 to be altered by signals in storage devices 1110. In other words, the CPU 1102 may cause data and instructions to be read from storage devices 1110 in the memory 1106 which may then influence the operations of CPU 1102 as instructions and data signals, and which may also be provided to the output devices 1108. The CPU 1102 may alter the content of the memory 1106 by signaling to a machine interface of memory 1106 to alter the internal configuration and then converted signals to the storage devices 1110 alter its material internal configuration. In other words, data and instructions may be backed up from memory 1106, which is often volatile, to storage devices 1110, which are often non-volatile.

Output devices 1108 are transducers that convert signals received from the memory 1106 into physical phenomena such as vibrations in the air, patterns of light on a machine display, vibrations (i.e., haptic devices), or patterns of ink or other materials (i.e., printers and 3-D printers).

The network interface 1112 receives signals from the memory 1106 and converts them into electrical, optical, or wireless signals to other machines, typically via a machine network. The network interface 1112 also receives signals from the machine network and converts them into electrical, optical, or wireless signals to the memory 1106. The network interface 1112 may allow a robot to communicate with a cloud server, a mobile device, other robots, and other network-enabled devices.

In one embodiment, a global database 1118 may provide data storage available across the devices that comprise or are supported by the robotic control system 1100. The global database 1118 may include maps, robotic instruction algorithms, robot state information, static, movable, and tidyable object reidentification fingerprints, labels, and other data associated with known static, movable, and tidyable object reidentification fingerprints, or other data supporting the implementation of the disclosed solution. The global database 1118 may be a single data structure or may be distributed across more than one data structure and storage platform, as may best suit an implementation of the disclosed solution. In one embodiment, the global database 1118 is coupled to other components of the robotic control system 1100 through a wired or wireless network, and in communication with the network interface 1112.

In one embodiment, a robot instruction database 1120 may provide data storage available across the devices that comprise or are supported by the robotic control system 1100. The robot instruction database 1120 may include the programmatic routines that direct specific actuators of the tidying robot, such as are described with respect to FIG. 1A-FIG. 6D, to actuate and cease actuation in sequences that allow the tidying robot to perform individual and aggregate motions to complete tasks.

Figure 12:
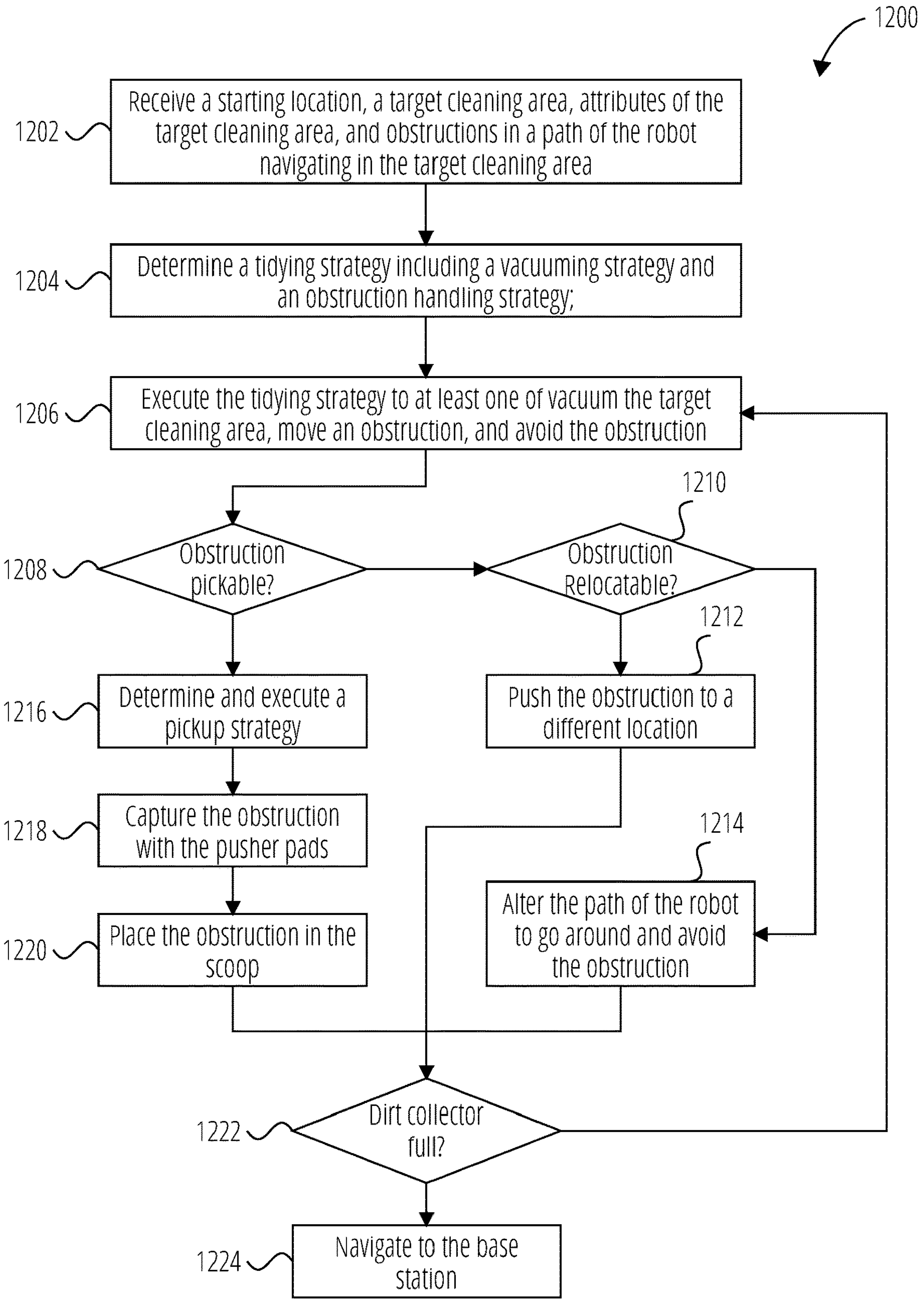
FIG. 12 illustrates a routine 1200 in accordance with one embodiment.

FIG. 12 illustrates an example routine 1200 for a tidying robot such as that introduced with respect to FIG. 6A. Although the example routine 1200 depicts a particular sequence of operations, the sequence may be altered without departing from the scope of the present disclosure. For example, some of the operations depicted may be performed in parallel or in a different sequence that does not materially affect the function of the routine 1200. In other examples, different components of an example device or system that implements the routine 1200 may perform functions at substantially the same time or in a specific sequence.

According to some examples, the method includes receiving a starting location, a target cleaning area, attributes of the target cleaning area, and obstructions in a path of the robot navigating in the target cleaning area at block 1202. For example, the tidying robot 600 illustrated in FIG. 6A may receive a starting location, a target cleaning area, attributes of the target cleaning area, and obstructions in a path of the robot navigating in the target cleaning area.

According to some examples, the method includes determining a tidying strategy including a vacuuming strategy and an obstruction handling strategy at block 1204. The vacuuming strategy may include choosing a vacuum cleaning pattern for the target cleaning area, identifying the obstructions in the target cleaning area, determining how to handle the obstructions, and vacuuming the target cleaning area. Handling the obstructions may include moving the obstructions and avoiding the obstructions. Moving the obstructions may include pushing them aside, executing a pickup strategy to pick them up in the scoop, carrying them to another location out of the way, etc. The obstruction may, for example, be moved to a portion of the target cleaning area that has been vacuumed, in close proximity to the path, to allow the robot to quickly return and continue, unobstructed, along the path. In one embodiment, the robot may execute an immediate removal strategy, in which it may pick an obstruction up in its scoop, then immediately navigate to a garget storage bine and place the obstruction into the bin. The robot may then navigate back to the position where it picked up the obstruction, and may resume vacuuming from there. In one embodiment, the robot may execute an in-situ removal strategy, where it picks the object up, then continues to vacuum. When the robot is near the target storage bin, it may place the obstruction in the bin, then continue vacuuming from there. It may adjust its pattern to vacuum any portions of the floor it missed due to handling the obstruction. Once vacuuming is complete, or if the robot determines it does not have adequate battery power, the robot may return to the base station to complete the vacuuming strategy.

According to some examples, the method includes executing the tidying strategy to at least one of vacuum the target cleaning area, move an obstruction, and avoid the obstruction at block 1206. The obstruction may include at least one of a tidyable object and a moveable object.

If the robot determines that the obstruction is pickable at decision block 1208, that is, the obstruction is an object the robot is capable of picking up, the method may progress to block 1216. If the robot decides the obstruction is not pickable, it may then determine whether the obstruction is relocatable at decision block 1210, that is, the obstruction is an object the robot is capable of moving and relocating, even though it cannot pick it up. If the robot determines the obstruction is relocatable, the method may include pushing the obstruction to a different location at block 1212. The obstruction may be pushed with the pusher pads, the scoop, and/or the chassis. If the robot determines the object is not relocatable, according to some examples, the method includes altering the path of the robot to go around and avoid the obstruction at block 1214.

According to some examples, the method includes determining and executing a pickup strategy at block 1216. The pickup strategy may include an approach path for the robot to take to reach the obstruction, a grabbing height for initial contact with the obstruction, a grabbing pattern for moving the pusher pads while capturing the obstruction, and a carrying position of the pusher pads and the scoop that secures the obstruction in a containment area on the robot for transport. The containment area may include at least two of the pusher pad arms, the pusher pads, and the scoop. Executing the pickup strategy may include extending the pusher pads out and forward with respect to the pusher pad arms and raising the pusher pads to the grabbing height. The robot may then approach the obstruction via the approach path, coming to a stop when the obstruction is positioned between the pusher pads. The robot may execute the grabbing pattern to allow capture of the obstruction within the containment area. The robot may confirm the obstruction is within the containment area. If the obstruction is within the containment area, the robot may exert pressure on the obstruction with the pusher pads to hold the obstruction stationary in the containment area and raise at least one of the scoop and the pusher pads, holding the obstruction, to the carrying position.

If the obstruction is not within the containment area, the robot may alter the pickup strategy with at least one of a different reinforcement learning based strategy, a different rules based strategy, and relying upon different observations, current object state, and sensor data, and may then execute the altered pickup strategy. According to some examples, the method includes capturing the obstruction with the pusher pads at block 1218. According to some examples, the method then includes placing the obstruction in the scoop at block 1220. In one embodiment, the robot may navigate to a target storage bin or an object collection bin, then execute a drop strategy to place the obstruction in the bin. In one embodiment, the robot may turn aside from its vacuuming path to an already vacuumed area, then execute a drop strategy to place the obstruction on the floor. In one embodiment, the object collection bin may be on top of the base station.

According to some examples, the robot may determine whether or not the dirt collector is full at decision block 1222. If the dirt collector is full, the robot may navigate to the base station at block 1224. Otherwise, the robot may return to block 1206 and continue executing the tidying strategy.

Figure 13:
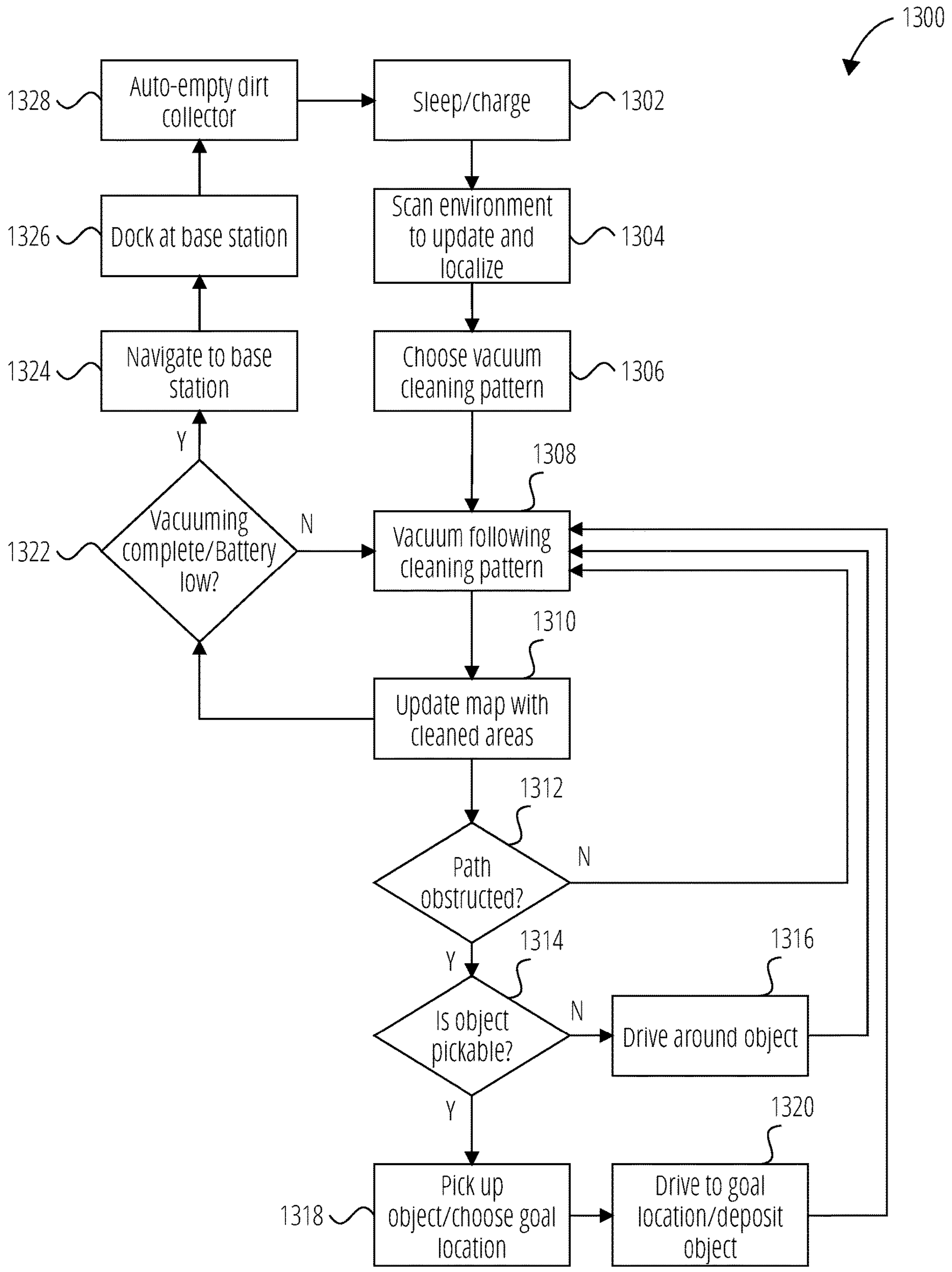
FIG. 13 illustrates a basic routine 1300 in accordance with one embodiment.

FIG. 13 illustrates an example basic routine 1300 for a system such as the tidying robot 600 and base station 700 disclosed herein and illustrated interacting in FIG. 8. Although the example basic routine 1300 depicts a particular sequence of operations, the sequence may be altered without departing from the scope of the present disclosure. For example, some of the operations depicted may be performed in parallel or in a different sequence that does not materially affect the function of the basic routine 1300. In other examples, different components of an example device or system that implements the basic routine 1300 may perform functions at substantially the same time or in a specific sequence.

The basic routine 1300 may begin with the tidying robot 600 previously illustrated in a sleeping and charging state at the base station 700 previously illustrated. The robot may wake up from the sleeping and charging state at block 1302. The robot may scan the environment at block 1304 to update its local or global map and localize itself with respect to its surroundings and its map. In one embodiment, the tidying robot 600 may utilize its sensing system, including cameras and/or LIDAR sensors to localize itself in its environment. If this localization fails, the tidying robot 600 may execute an exploration cleaning pattern, such as a random walk in order to update its map and localize itself as it cleans.

At block 1306, the robot may determine a tidying strategy including at least one of a vacuuming strategy and an object isolation strategy. The tidying strategy may include choosing a vacuum cleaning pattern. For example, the robot may choose to execute a simple pattern of back and forth lines to clear a room where there are no obstacles detected. In one embodiment, the robot may choose among multiple planned cleaning patterns.

"Vacuum cleaning pattern" refers to a pre-determined path to be traveled by the tidying robot with its robot vacuum system engaged for the purposes of vacuuming all or a portion of a floor. The vacuum cleaning pattern may be configured to optimize efficiency by, e.g., minimizing the number of passes performed or the number of turns made. The vacuum cleaning pattern may account for the locations of known static objects and known movable objects which the tidying robot may plan to navigate around, and known tidyable objects which the tidying robot may plan to move out of its path. The vacuum cleaning pattern may be interrupted by tidyable objects or movable objects not anticipated at the time the pattern was selected, such that the tidying robot may be configured to engage additional strategies flexibly to complete a vacuum cleaning pattern under unanticipated circumstances it may encounter.

The robot may start vacuuming, and may at block 1308 vacuum the floor following the planned cleaning pattern. As cleaning progresses, maps may be updated at block 1310 to mark cleaned areas, keeping track of which areas have been cleaned. As long as the robot's path according to its planned cleaning pattern is unobstructed, the cleaning pattern is incomplete, and the robot has adequate battery power, the robot may return to block 1308 and continue cleaning according to its pattern.

Where the robot determines its path is obstructed at decision block 1312, the robot may next determine at decision block 1314 if the object obstructing its path may be picked up. If the object cannot be picked up, the robot may drive around the object at block 1316 and return to block 1308 to continue vacuuming/cleaning. If the object may be picked up, the robot may pick up the object and determine a goal location for that object at block 1318. Once the goal location is chosen, the robot may at block 1320 drive to the goal location with the object and may deposit the object at the goal location. The robot may then return to block 1308 and continue vacuuming.

In one embodiment, if the robot encounters an obstruction in its path at decision block 1312, it may determine the type of obstruction, and based on the obstruction type, the robot may determine an action plan for handling the obstruction. The action plan may be an action plan to move object(s) aside 1500 or an action plan to pick up objects in path 1600, as will be described in additional detail below. The action plan to pick up objects in path 1600 may lead to the determination of additional action plans, such as the action plan to drop object(s) at a drop location 1700. The robot may execute the action plan(s). If the action plan fails, the robot may execute an action plan to drive around object(s) 1800 and may return to block 1308 and continue vacuuming. If the action plan to handle the obstruction succeeds, the robot may return to its vacuuming task at block 1308 following its chosen cleaning pattern.

The robot may in one embodiment return to the point at which vacuuming was interrupted to address the obstructing object to continue vacuuming. In another embodiment, the robot may restart vacuuming at the goal location, following a new path that allows it to complete its vacuuming task from that point. In one embodiment, the robot may continue to carry the object while vacuuming, waiting to deposit the object until after vacuuming is complete, or until the robot has reached a location near the goal location.

Once vacuuming is complete, or if a low battery condition is detected before vacuuming is complete at decision block 1322, the robot may at block 1324 navigate back to its base station. Upon arriving at the base station, the robot may dock with the base station at block 1326. In one embodiment, the base station may be equipped to auto-empty dirt from the robot's dirt collector at block 1328, if any dust, dirt, or debris is detected in the dirt collector. In one embodiment, the base station may comprise a bin, such as the base station 700 and object collection bin 642 illustrated in FIG. 7A. The robot may deposit any objects it is carrying in this bin. The robot may return to block 1302, entering a sleeping and/or charging mode while docked at the base station.

Figure 14:
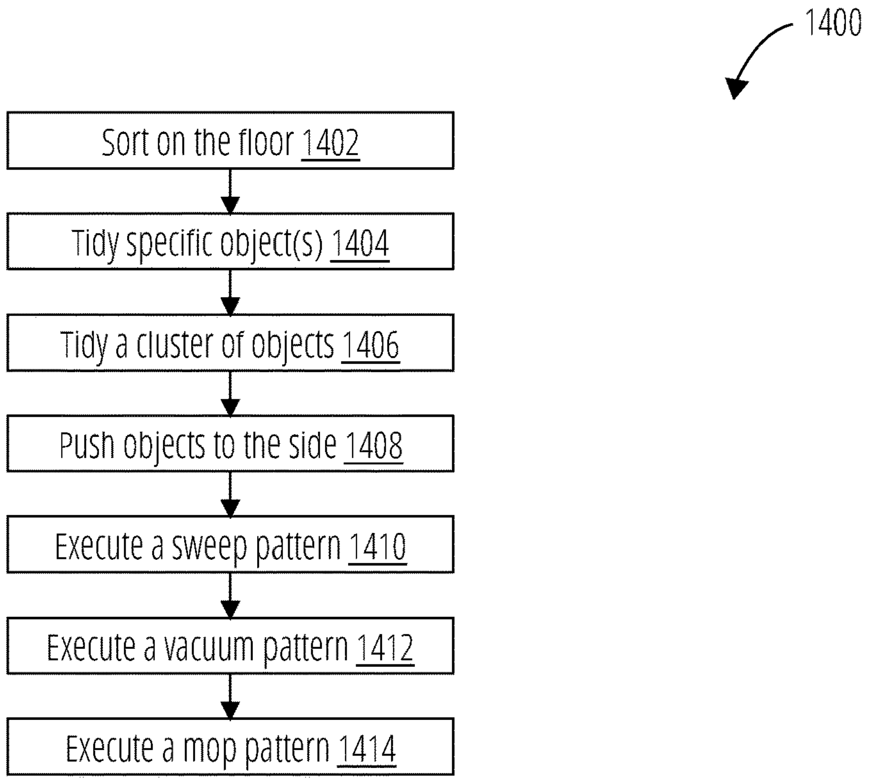
FIG. 14 illustrates an exemplary multi-stage tidying routine 1400 in accordance with one embodiment.

FIG. 14 illustrates an exemplary multi-stage tidying routine 1400 in accordance with one embodiment. Although the example exemplary multi-stage tidying routine 1400 depicts a particular sequence of operations, the sequence may be altered without departing from the scope of the present disclosure. For example, some of the operations depicted may be performed in parallel or in a different sequence that does not materially affect the function of the exemplary multi-stage tidying routine 1400. In other examples, different components of an example device or system that implements the exemplary multi-stage tidying routine 1400 may perform functions at substantially the same time or in a specific sequence.

According to some examples, the method includes sorting on the floor at block 1402. For example, the tidying robot 600 illustrated in FIG. 6A may sort on the floor. The tidying robot may initially sort objects located on the floor. This sorting may group the objects based on an object type for easier pickup.

According to some examples, the method includes tidying specific object(s) at block 1404. The tidying robot may put away a specific object or specific objects, dropping them at their home locations.

According to some examples, the method includes tidying a cluster of objects at block 1406. The tidying robot may tidy clusters of objects, dropping them at their home locations. In one embodiment, the robot may collect multiple objects having the same home location as one cluster to be tidied.

According to some examples, the method includes pushing objects to the side at block 1408. The tidying robot may push remaining objects without home locations to the side of the room they currently reside in, along the wall, into an open closet, or otherwise to an area out of the way of future operations.

According to some examples, the method includes executing a sweep pattern at block 1410. The tidying robot may use pusher pads having brushes to sweep dirt and debris from the floor into the scoop. The robot may then transport the dirt and debris to a garbage bin and dump it therein.

According to some examples, the method includes executing a vacuum pattern at block 1412. The tidying robot may vacuum up any remaining fine dust and dirt, leaving the floor clear. In one embodiment, the vacuumed dust and dirt may be stored in the robot's dust bin and emptied later at the charging dock.

According to some examples, the method includes executing a mop pattern at block 1414. The tidying robot may wet-mop the floor using a mop pad to further deep-clean a hard floor such as tile, vinyl, or wood.

This staged approach may allow the robot to progressively tidy a messy room by breaking the cleaning effort into manageable tasks, such as organizing objects on the floor before trying to put them away, putting objects away before sweeping, sweeping up dirt and debris such as food pieces before vacuuming up finer particles, etc.

Figure 15:
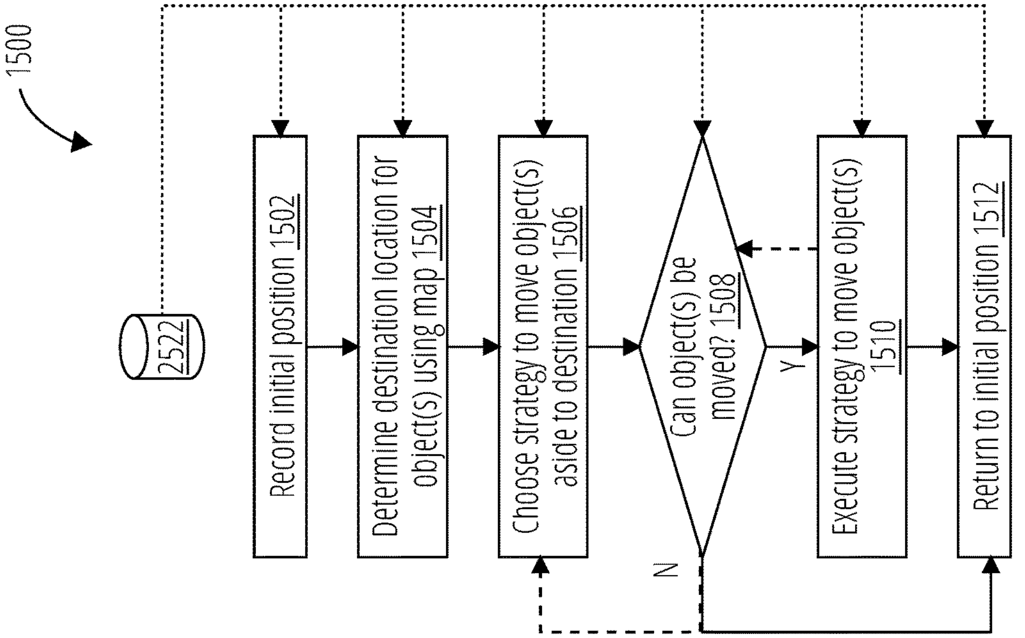
FIG. 15 illustrates an action plan to move object(s) aside 1500 in accordance with one embodiment.

FIG. 15 illustrates an action plan to move object(s) aside 1500 in accordance with one embodiment. The tidying robot 600 may execute the action plan to move object(s) aside 1500 supported by the observations, current robot state, current object state, and sensor data 2522 introduced earlier with respect to FIG. 25.

The action plan to move object(s) aside 1500 may begin with recording an initial position for the tidying robot 600 at block 1502. The tidying robot 600 may then determine a destination for the object(s) to be moved using its map at block 1504. The tidying robot 600 may use its map, which may include noting which areas have already been vacuumed and determining a target location for the object(s) that has already been vacuumed, is in close proximity, and/or will not obstruct the continued vacuuming pattern.

The robot may at block 1506 choose a strategy to move the object(s). The robot may determine if it is able to move the object(s) via the strategy at decision block 1508. If it appears the object(s) are not moveable via the strategy selected, the tidying robot 600 may return to its initial portion at block 1512. Alternatively, the tidying robot 600 may return to block 1506 and select a different strategy.

If the object(s) appear to be able to be moved, the robot may execute the strategy for moving the object(s) at block 1510. Executing the strategy may include picking up object(s) and dropping them at a determined destination location. Alternatively, the obstructing object(s) may be aligned with the outside of a robot's arm, and the robot may then use a sweeping motion to push the object(s) to the side, out of its vacuuming path. For example, the robot may pivot away from cleaned areas to navigate to a point where the robot may be pushed into the cleaned area by the robot pivoting back toward those cleaned areas.

If it is determined during execution of the strategy at block 1510 the object(s) cannot be moved, or if the strategy fails, the robot may navigate back to a starting position at block 1512. Alternatively, the robot may navigate to a different position that allows for continuation of the vacuuming pattern, skipping the area of obstruction. The action plan to move object(s) aside 1500 may then be exited.

In one embodiment, the robot may store the obstruction location on its map. The robot may issue an alert to notify a user of the instruction. The user may be able to clear the obstruction physically from the path, and then clear it from the robot's map through a user interface, either on the robot or through a mobile application in communication with the robot. The robot may in one embodiment be configured to revisit areas of obstruction once the rest of its cleaning pattern has been completed.

Figure 16:
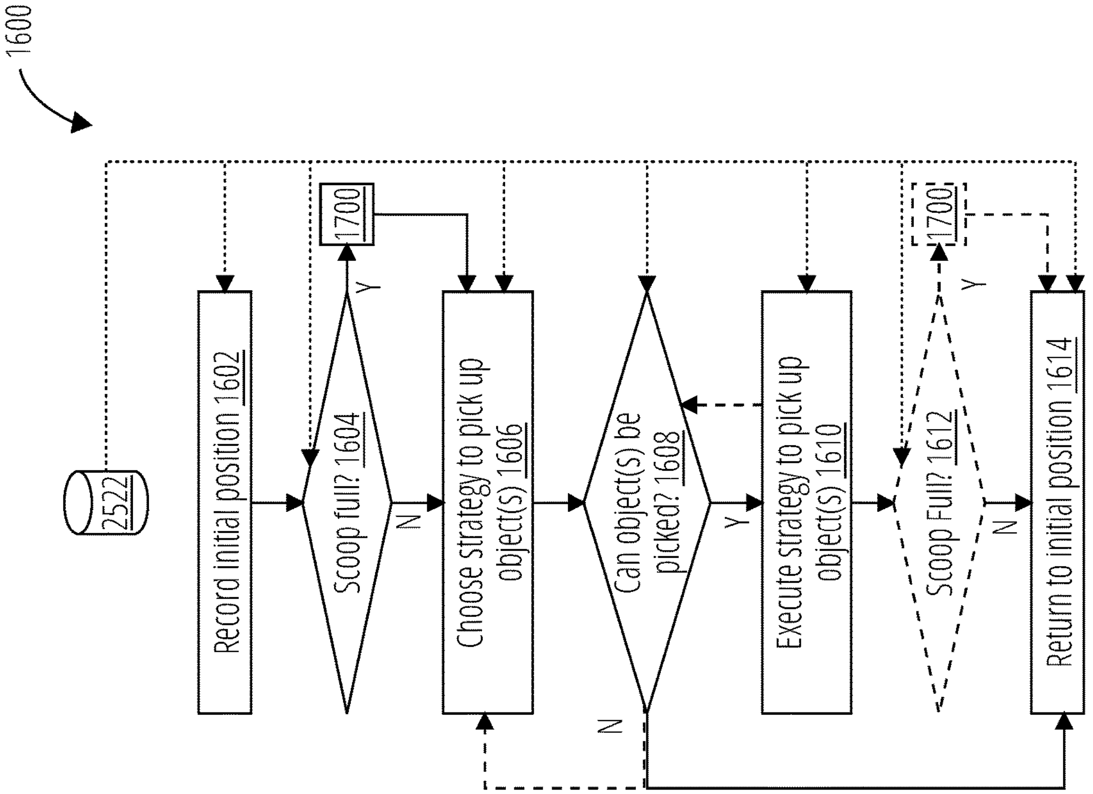
FIG. 16 illustrates an action plan to pick up objects in path 1600 in accordance with one embodiment.

FIG. 16 illustrates an action plan to pick up objects in path 1600 in accordance with one embodiment. The tidying robot 600 may execute the action plan to pick up objects in path 1600 supported by the observations, current robot state, current object state, and sensor data 2522 introduced earlier with respect to FIG. 25.

The action plan to pick up objects in path 1600 may begin with recording an initial position for the tidying robot 600 at block 1602. The tidying robot 600 may make a determination at decision block 1604 whether its scoop is full or has capacity to pick up additional objects. If the scoop is full, the tidying robot 600 may, before proceeding, empty its scoop by depositing the objects therein at a desired drop location by following action plan to drop object(s) at a drop location 1700. The drop location may be a bin, a designated place on the floor that will be vacuumed before objects are deposited, or a designated place on the floor that has already been vacuumed.

Once it is determined that the scoop has capacity to pick up the objects, the tidying robot 600 may at block 1606 choose a strategy to pick up the obstructing objects it has detected. The tidying robot 600 may determine if it is able to pick the objects up via the selected strategy at decision block 1608. If it appears the object(s) are not pickable via the strategy selected, the tidying robot 600 may return to its initial portion at block 1614. Alternatively, the tidying robot 600 may return to block 1606 and select a different strategy.

If it is determined during execution of the strategy at block 1610 the object(s) cannot be picked up, or if the strategy fails, the robot may navigate back to a starting position at block 1614. Alternatively, the robot may navigate to a different position that allows for continuation of the vacuuming pattern, skipping the area of obstruction. The action plan to pick up objects in path 1600 may then be exited.

Once the objects are picked up through execution of the pickup strategy at block 1610, the tidying robot 600 may in one embodiment re-check scoop capacity at decision block 1612. If the scoop is full, the tidying robot 600 may perform the action plan to drop object(s) at a drop location 1700 to empty the scoop.

In one embodiment, the tidying robot 600 may immediately perform the action plan to drop object(s) at a drop location 1700 regardless of remaining scoop capacity in order to immediately drop the objects in a bin. In one embodiment, the tidying robot 600 may include features that allow it to haul a bin behind it, or carry a bin with it. In such an embodiment, the robot may perform an immediate rear dump into the bin behind it, or may set down the bin it is carrying before executing the pickup strategy, then immediately deposit the objects in the bin and retrieve the bin.

In one embodiment, if the scoop is not full and still has capacity, the tidying robot 600 may return to the initial position at block 1614 and continue cleaning while carrying the objects in its scoop, exiting the action plan to pick up objects in path 1600. Alternately, the robot may navigate to a different position that allows for continuation of the vacuuming pattern and may exit the action plan to pick up objects in path 1600.

Figure 17:
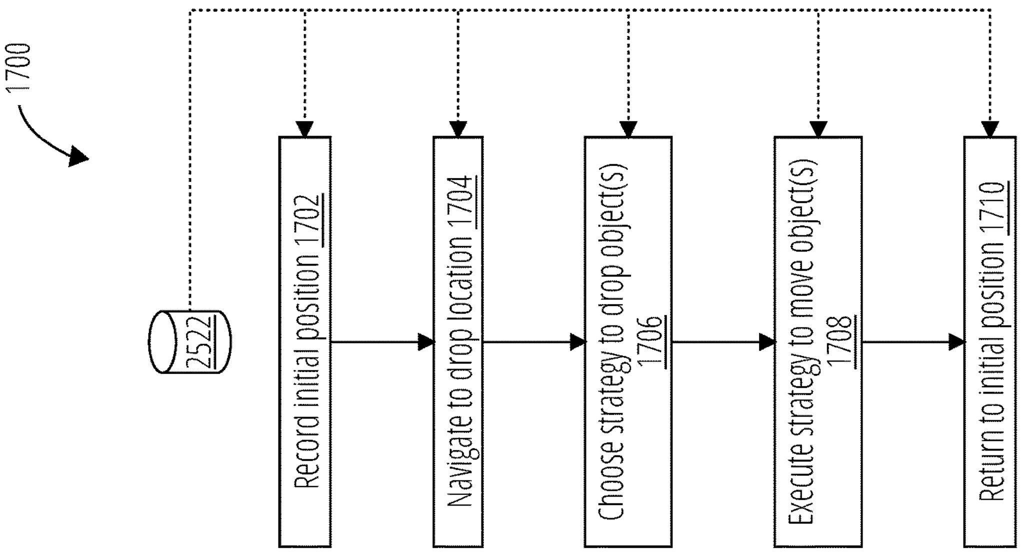
FIG. 17 illustrates an action plan to drop object(s) at a drop location 1700 in accordance with one embodiment.

FIG. 17 illustrates an action plan to drop object(s) at a drop location 1700 in accordance with one embodiment. The tidying robot 600 may execute the action plan to drop object(s) at a drop location 1700 supported by the observations, current robot state, current object state, and sensor data 2522 introduced earlier with respect to FIG. 25.

The action plan to drop object(s) at a drop location 1700 may begin at block 1702 with the tidying robot 600 recording an initial position. The tidying robot 600 may then navigate to the drop location at block 1704. The drop location may be a bin or a designated place on the floor that will be vacuumed before dropping, or may have already been vacuumed.

At block 1706, the tidying robot 600 may choose a strategy for dropping the objects. The drop strategy may include performing a rear dump or a front dump, and may involve coordinated patterns of movement by the pusher pad arms to successfully empty the scoop, based on the types of objects to be deposited.

The tidying robot 600 may then execute the strategy to drop the objects at block 1708. In one embodiment, similar to other action plans disclosed herein, a failure in the drop strategy may be detected, wherein the tidying robot 600 may select a different strategy, return to other actions, or alert a user that an object is stuck in the scoop. Finally, at block 1710, the tidying robot 600 may return to the initial position, exiting the action plan to drop object(s) at a drop location 1700 and continuing to vacuum or perform other tasks.

Figure 18:
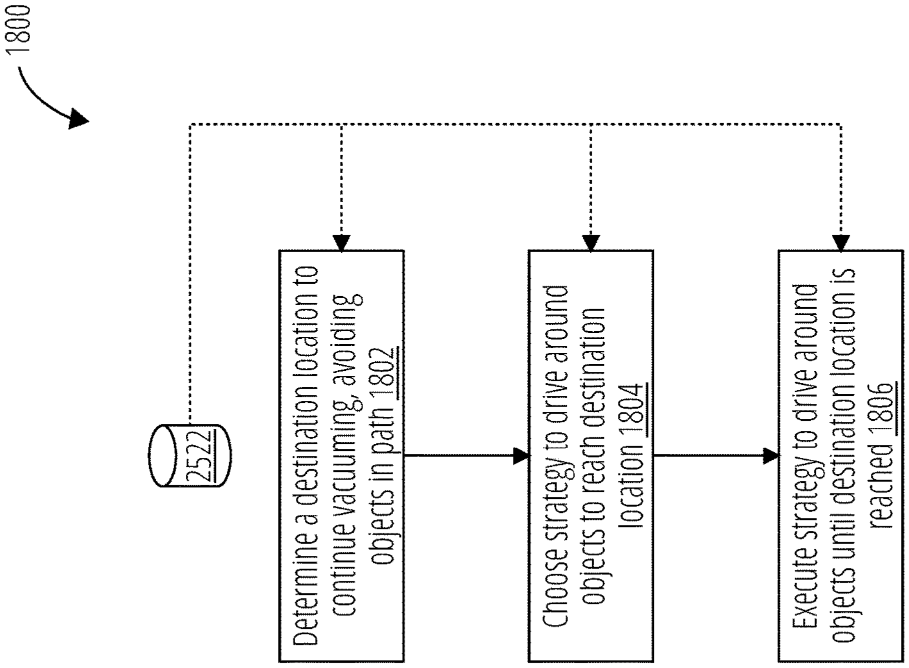
FIG. 18 illustrates an action plan to drive around object(s) 1800 in accordance with one embodiment.

FIG. 18 illustrates an action plan to drive around object(s) 1800 in accordance with one embodiment. The tidying robot 600 may execute the action plan to drive around object(s) 1800 supported by the observations, current robot state, current object state, and sensor data 2522 introduced earlier with respect to FIG. 25.

The action plan to drive around object(s) 1800 may begin at block 1802 with the tidying robot 600 determining a destination location to continue vacuuming after navigating around and avoiding the objects currently obstructing the vacuuming path. In one embodiment, the tidying robot 600 may use a map including the location of the objects and which areas have already been vacuumed to determine the desired target location beyond obstructing objects where it may best continue its vacuuming pattern.

At block 1804, the tidying robot 600 may choose a strategy to drive around the objects to reach the selected destination location. The tidying robot 600 may then execute the strategy at block 1806. In one embodiment, the robot may plot waypoint(s) to a destination location on a local map using an algorithm to navigate around objects. The robot may then navigate to the destination location following those waypoints.

Figure 19:
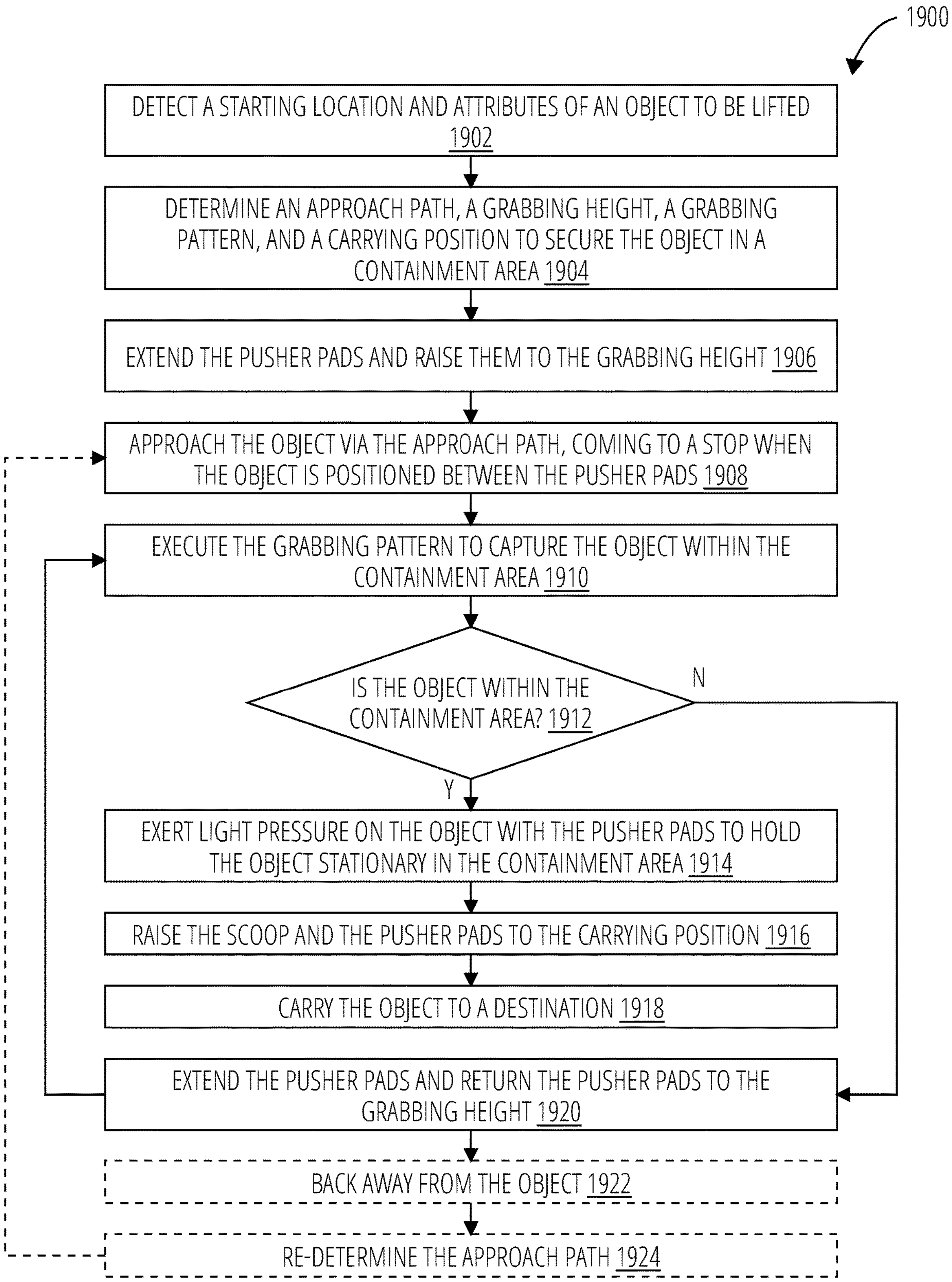
FIG. 19 illustrates a capture process 1900 portion of the disclosed algorithm in accordance with one embodiment.

The disclosed algorithm may comprise a capture process 1900 as illustrated in FIG. 19. The capture process 1900 may be performed by a tidying robot 600 such as that introduced with respect to FIG. 6A. This robot may have the sensing system, control system, mobility system, pusher pads, pusher pad arms, and scoop illustrated in FIG. 1A through FIG. 1D, or similar systems and features performing equivalent functions as is well understood in the art.

The capture process 1900 may begin in block 1902 where the robot detects a starting location and attributes of an object to be lifted. Starting location may be determined relative to a learned map of landmarks within a room the robot is programmed to declutter. Such a map may be stored in memory within the electrical systems of the robot. These systems are described in greater detail with regard to FIG. 11. Object attributes may be detected based on input from a sensing system, which may comprise cameras, LIDAR, or other sensors. In some embodiments, data detected by such sensors may be compared to a database of common objects to determine attributes such as deformability and dimensions. In some embodiments, the robot may use known landmark attributes to calculate object attributes such as dimensions. In some embodiments, machine learning may be used to improve attributes detection and analysis.

In block 1904, the robot may determine an approach path to the starting location. The approach path may take into account the geometry of the surrounding space, obstacles detected around the object, and how components the robot may be configured as the robot approaches the object. The robot may further determine a grabbing height for initial contact with the object. This grabbing height may take into account an estimated center of gravity for the object in order for the pusher pads to move the object with the lowest chance of slipping off of, under, or around the object, or deflecting the object in some direction other than into the scoop. The robot may determine a grabbing pattern for movement of the pusher pads during object capture, such that objects may be contacted from a direction and with a force applied in intervals optimized to direct and impel the object into the scoop. Finally, the robot may determine a carrying position of the pusher pads and a scoop that secures the object in a containment area for transport after the object is captured. This position may take into account attributes such as the dimensions of the object, its weight, and its center of gravity.

In block 1906, the robot may extend its pusher pads out and forward with respect to the pusher pad arms and raise the pusher pads to the grabbing height. This may allow the robot to approach the object as nearly as possible without having to leave room for this extension after the approach. Alternately, the robot may perform some portion of the approach with arms folded in close to the chassis and scoop to prevent impacting obstacles along the approach path. In some embodiments, the robot may first navigate the approach path and deploy arms and scoop to clear objects out of and away from the approach path. In block 1908, the robot may finally approach the object via the approach path, coming to a stop when the object is positioned between the pusher pads.

In block 1910, the robot may execute the grabbing pattern determined in block 1902 to capture the object within the containment area. The containment area may be an area roughly described by the dimensions of the scoop and the disposition of the pusher pad arms with respect to the scoop. It may be understood to be an area in which the objects to be transported may reside during transit with minimal chances of shifting or being dislodged or dropped from the scoop and pusher pad arms. In decision block 1912, the robot may confirm that the object is within the containment area. If the object is within the containment area, the robot may proceed to block 1914.

In block 1914, the robot may exert a light pressure on the object with the pusher pads to hold the object stationary in the containment area. This pressure may be downward in some embodiments to hold an object extending above the top of the scoop down against the sides and surface of the scoop. In other embodiments this pressure may be horizontally exerted to hold an object within the scoop against the back of the scoop. In some embodiments, pressure may be against the bottom of the scoop in order to prevent a gap from forming that may allow objects to slide out of the front of the scoop.

In block 1916, the robot may raise the scoop and the pusher pads to the carrying position determined in block 1902. The robot may then at block 1918 carry the object to a destination. The robot may follow a transitional path between the starting location and a destination where the object will be deposited. To deposit the object at the destination, the robot may follow the deposition process 2000 illustrated in FIG. 20.

If at decision block 1912 the object is not detected within the containment area, or is determined to be partially or precariously situated within the containment area, the robot may at block 1920 extend the pusher pads fall out of the scoop and forward with respect to the pusher pad arms and returns the pusher pads to the grabbing height. The robot may then return to block 1910. In some embodiments, the robot may at block 1922 back away from the object if simply releasing and reattempting to capture the object is not feasible. This may occur if the object has been repositioned or moved by the initial attempt to capture it. In block 1924, the robot may re-determine the approach path to the object. The robot may then return to block 1908.

Figure 20:
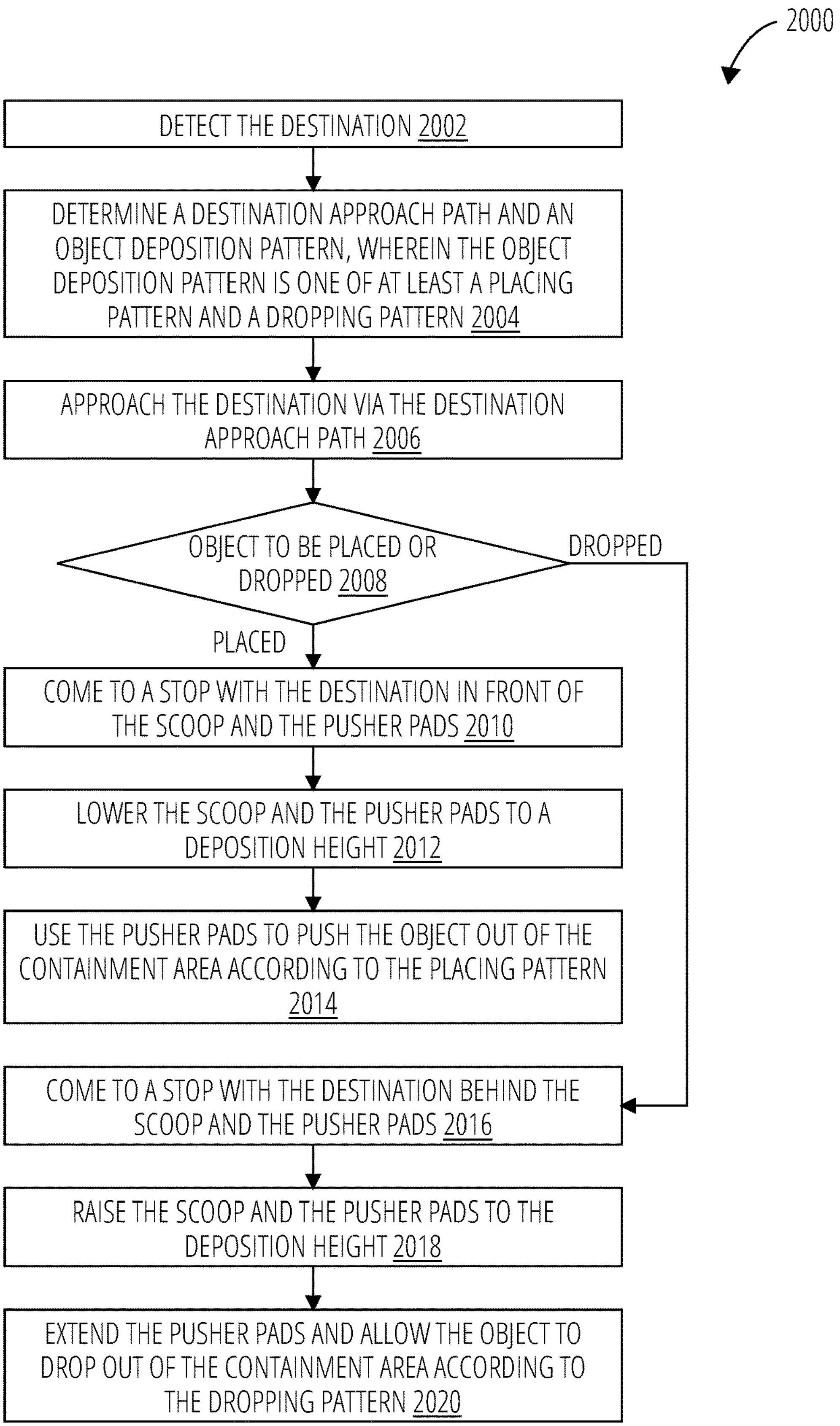
FIG. 20 illustrates a deposition process 2000 portion of the disclosed algorithm in accordance with one embodiment.
Figure 21A:
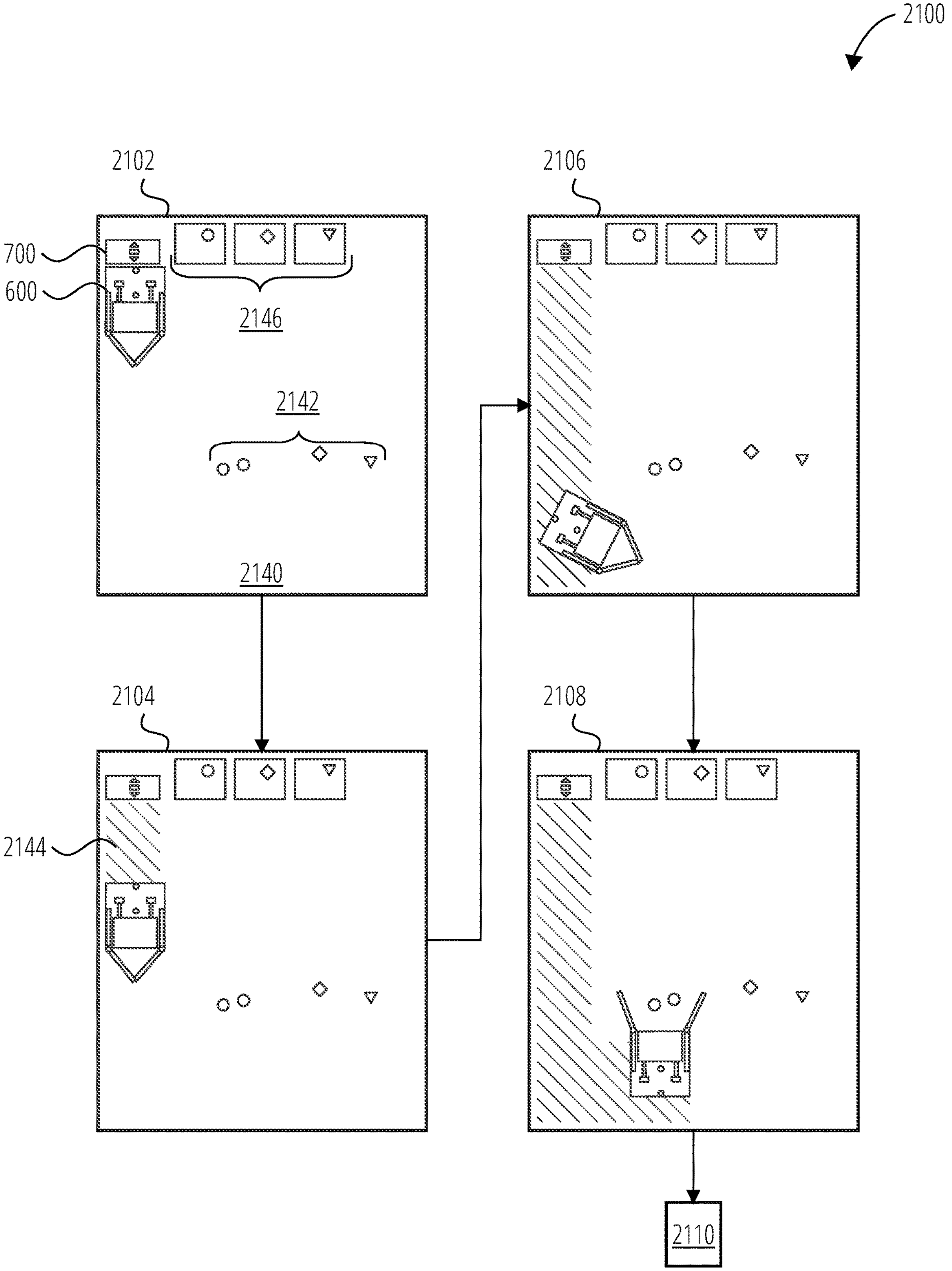
FIG. 21A-FIG. 21E illustrate a map tracking vacuumed areas while putting objects away immediately 2100 in accordance with one embodiment.
Figure 21B:
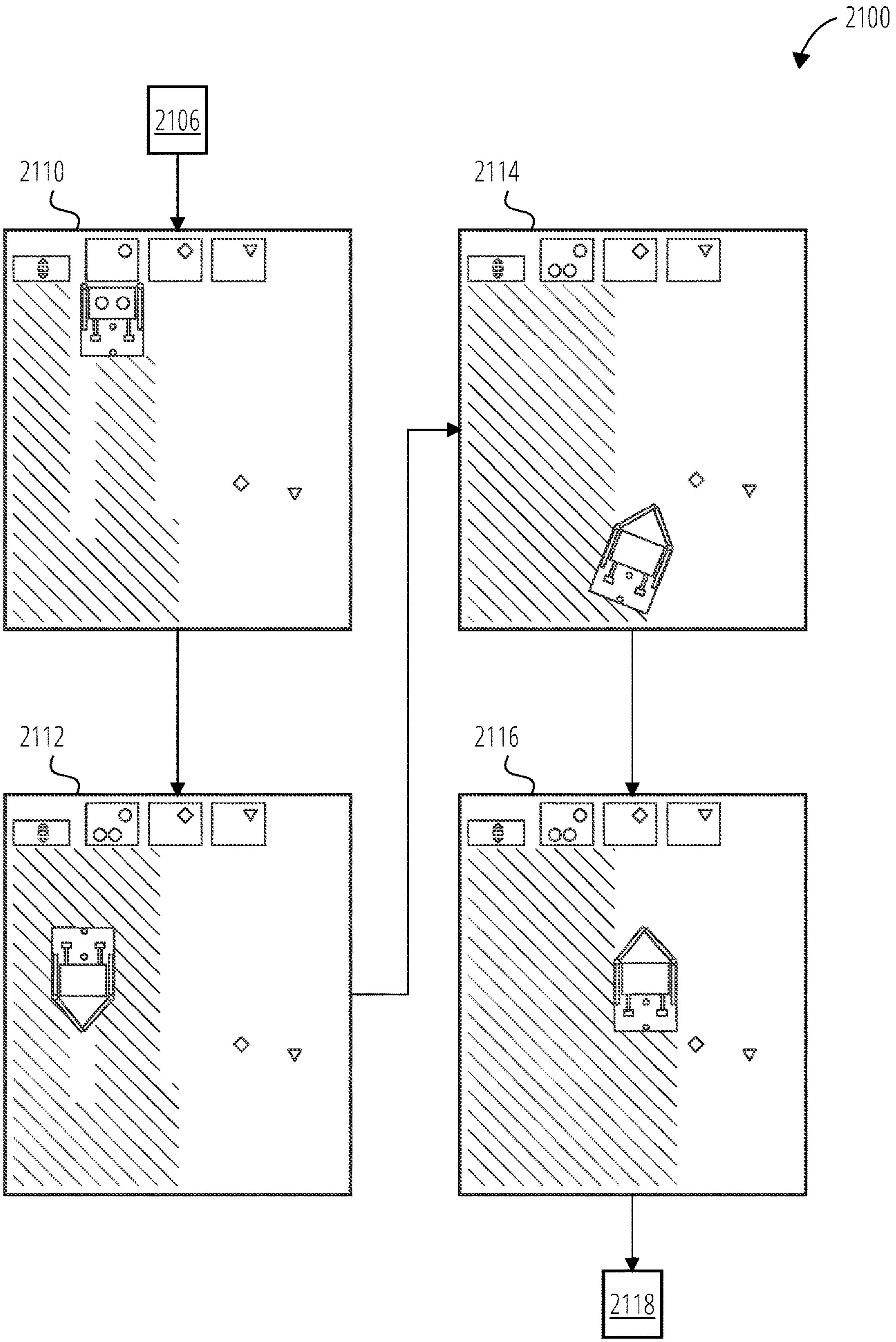
Figure 21C:
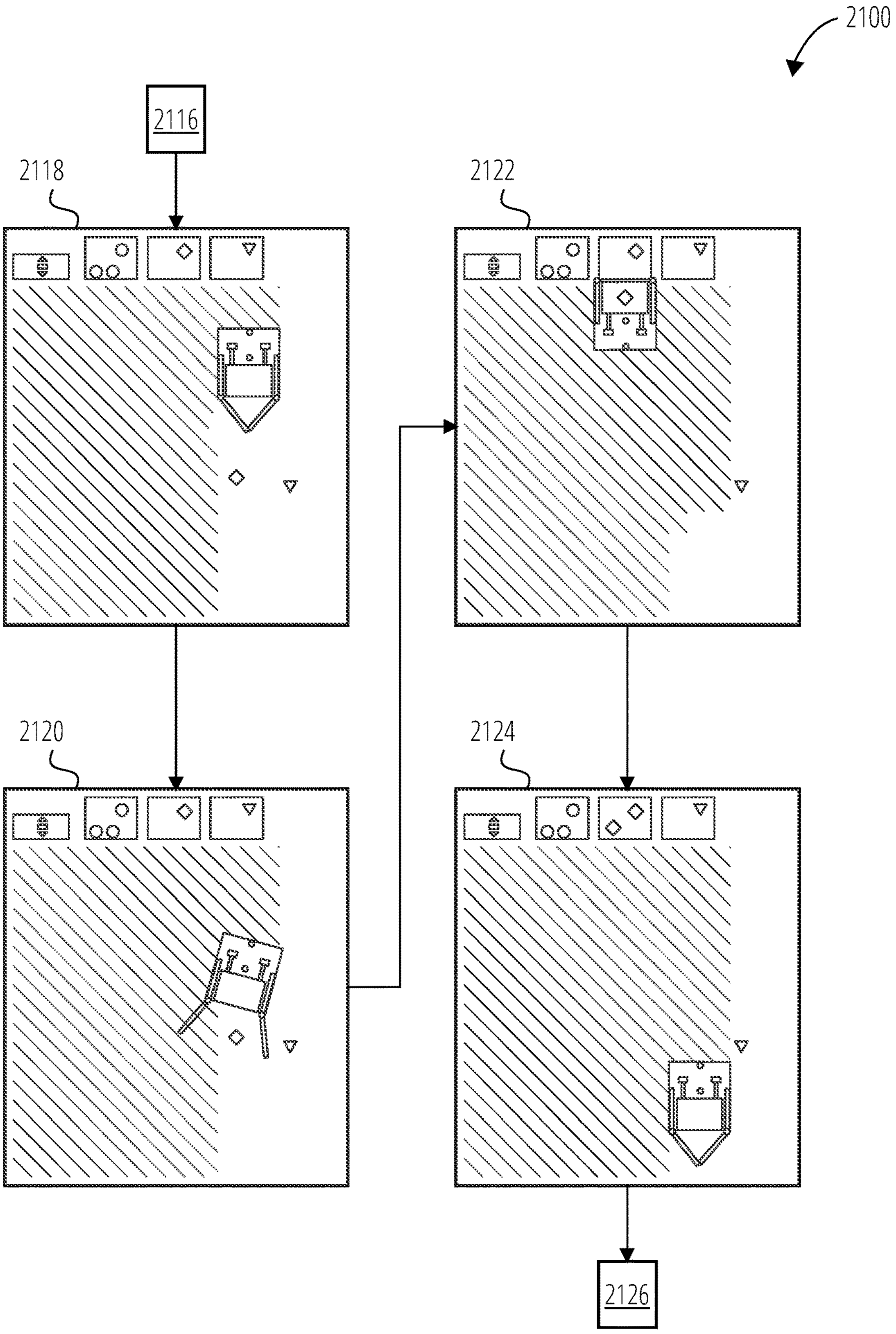
Figure 21D:
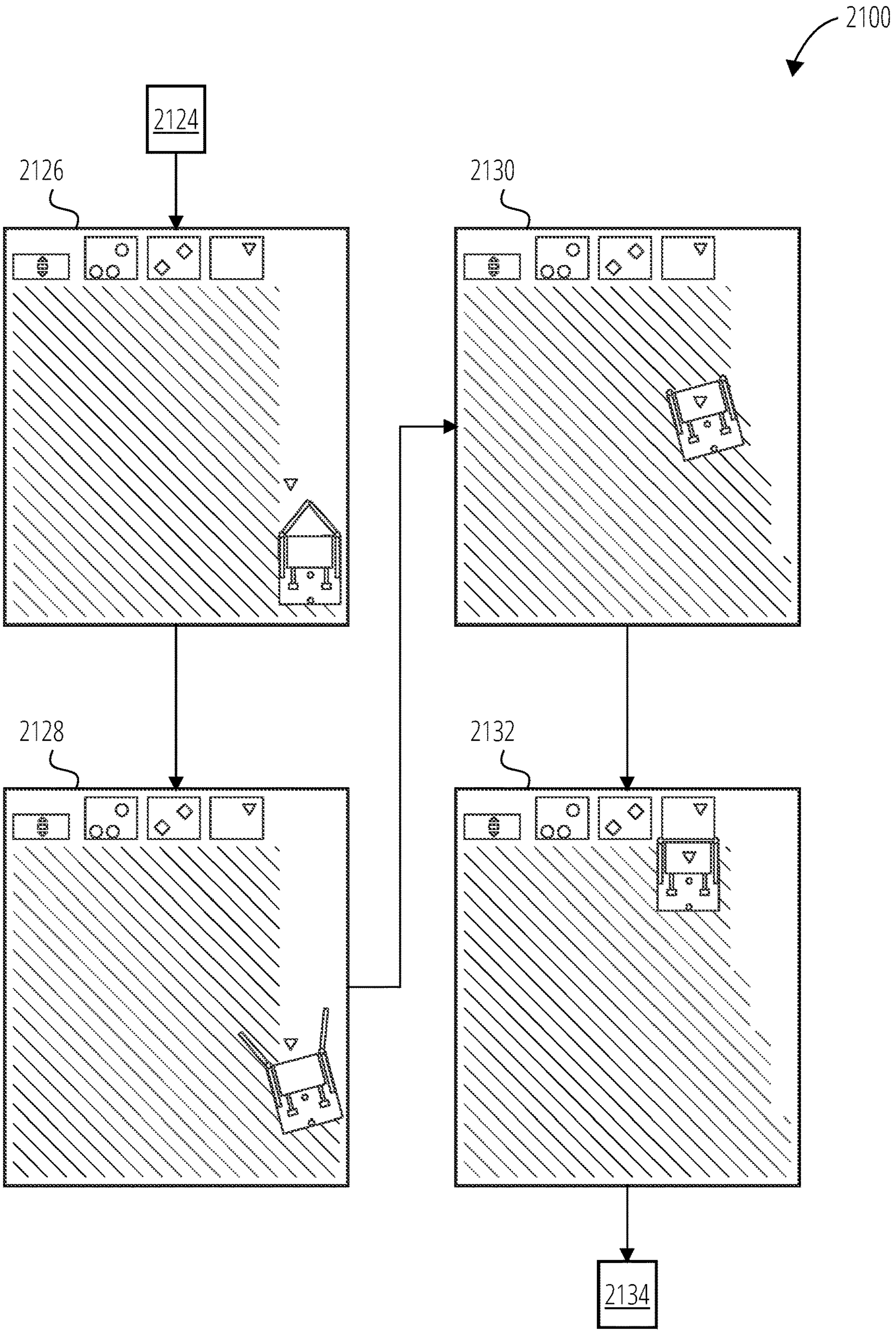
Figure 21E:
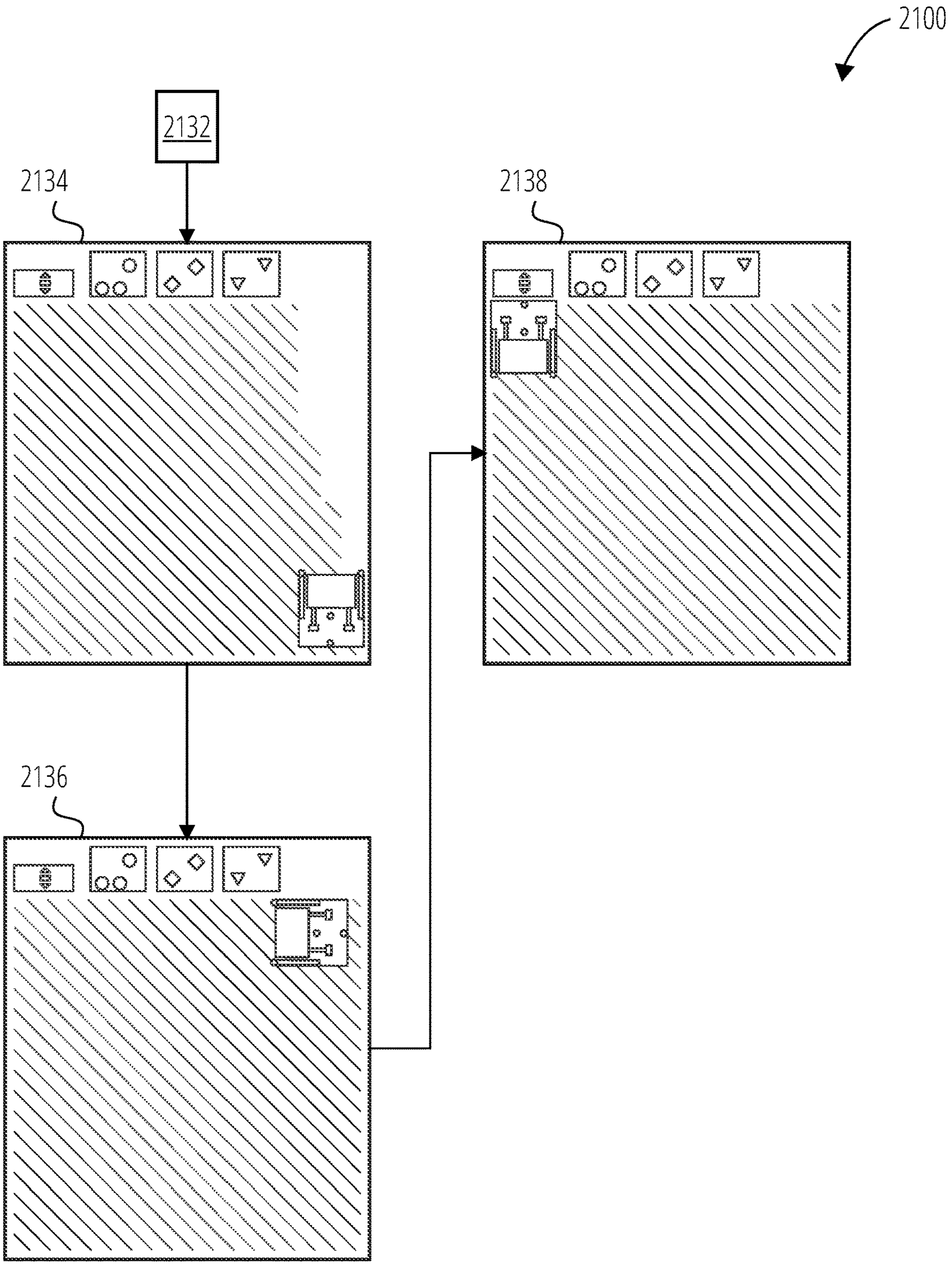
Figure 22A:
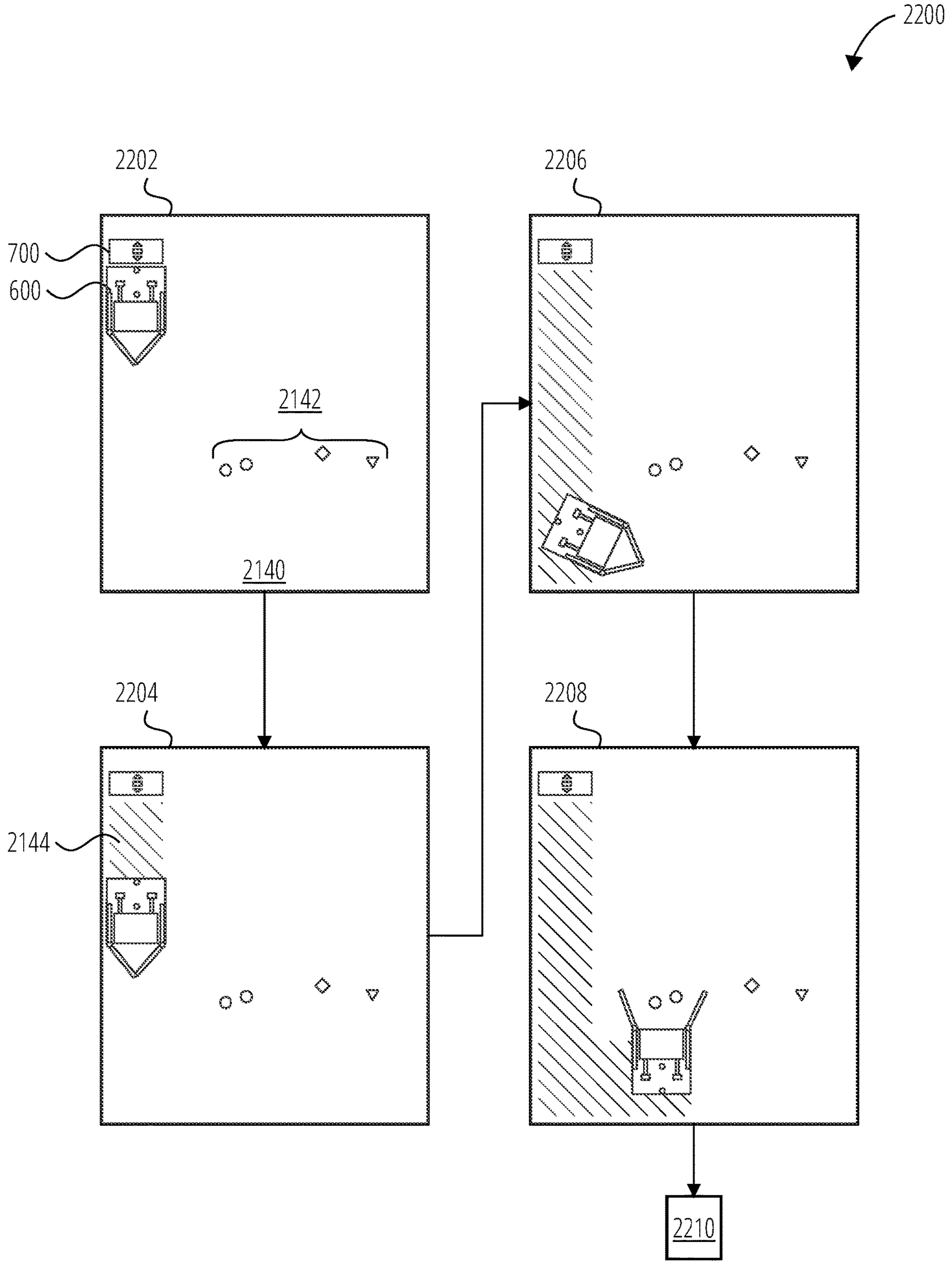
FIG. 22A-FIG. 22E illustrate a map tracking vacuumed areas while moving objects aside 2200 in accordance with one embodiment.
Figure 22B:
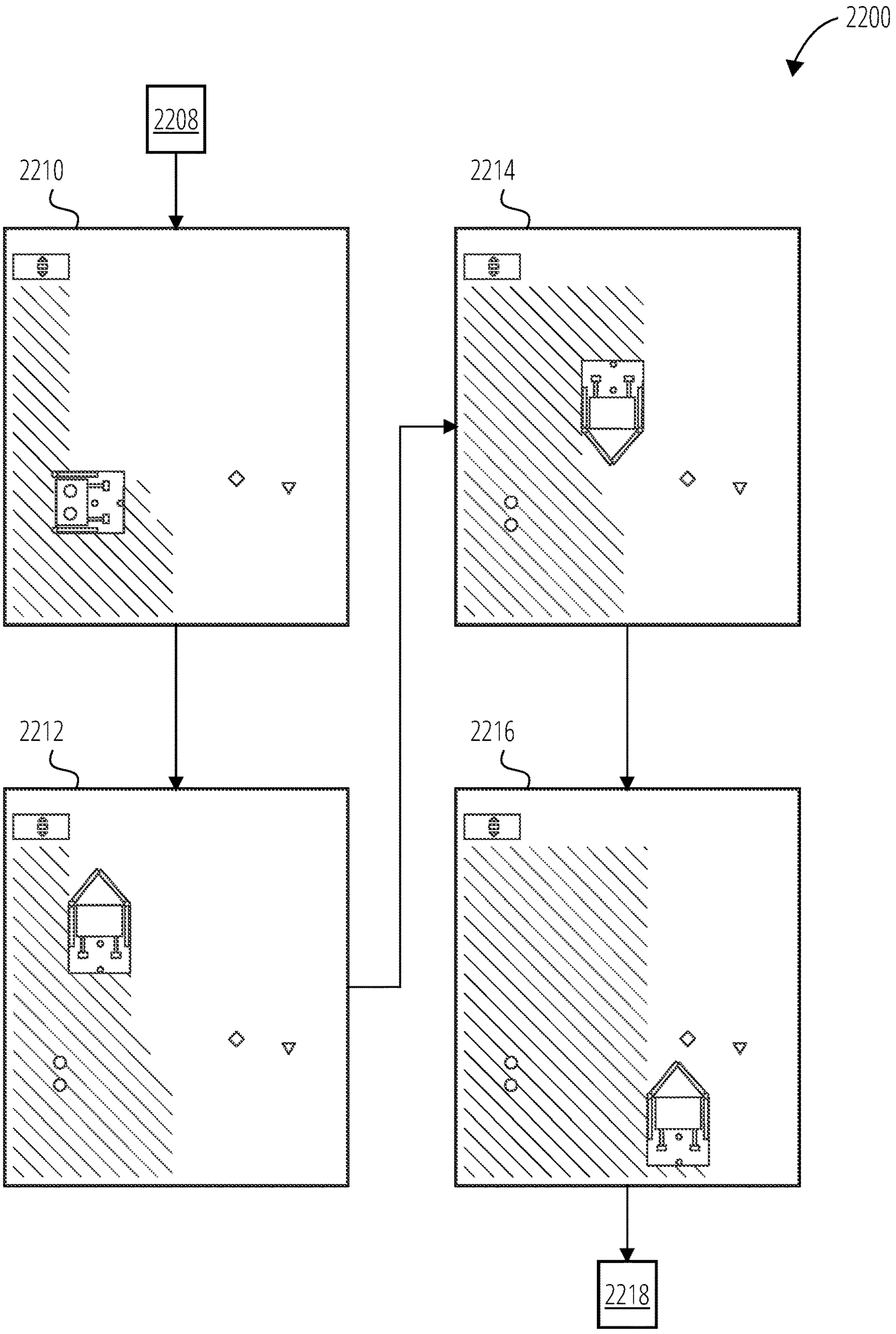
Figure 22C:
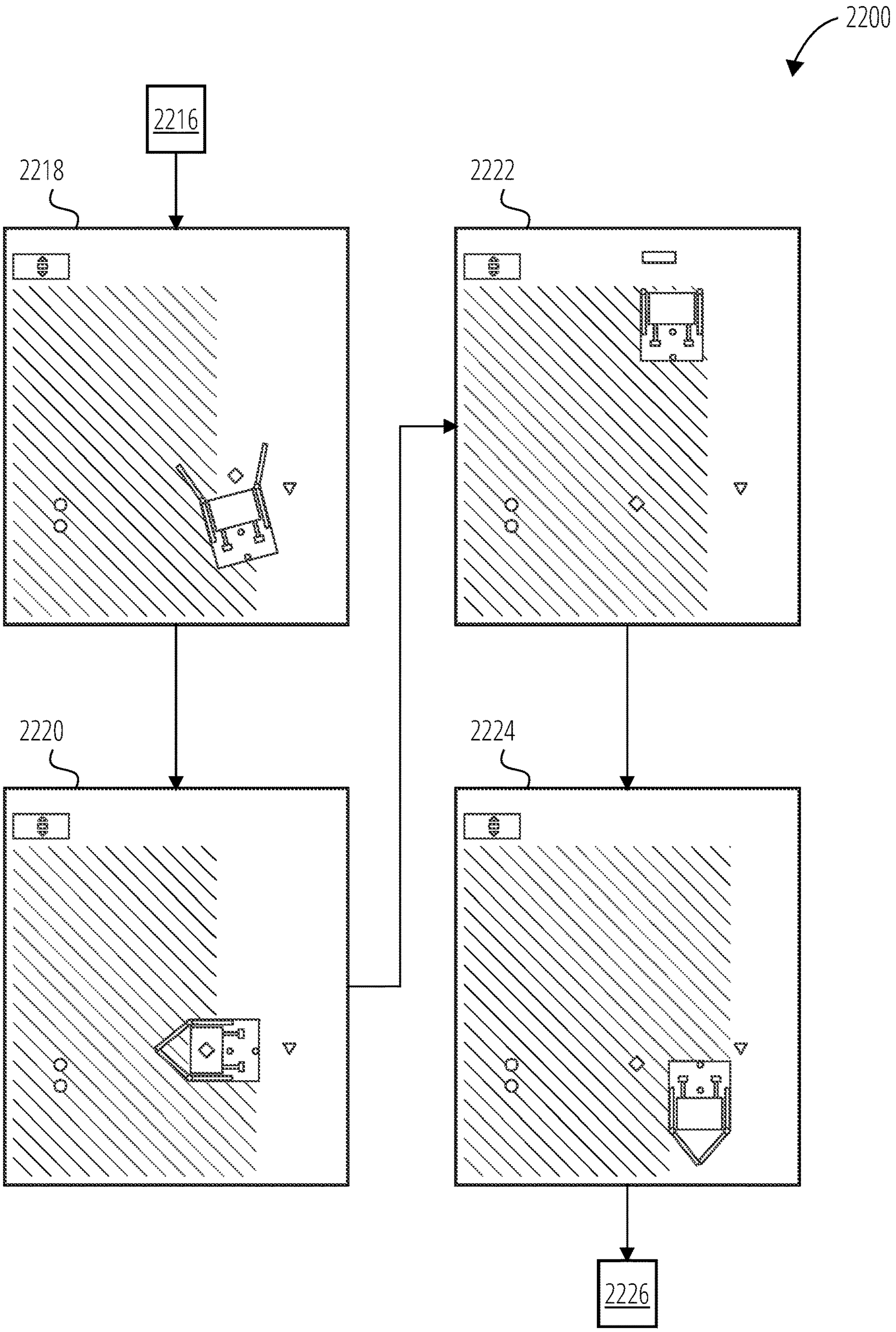
Figure 22D:
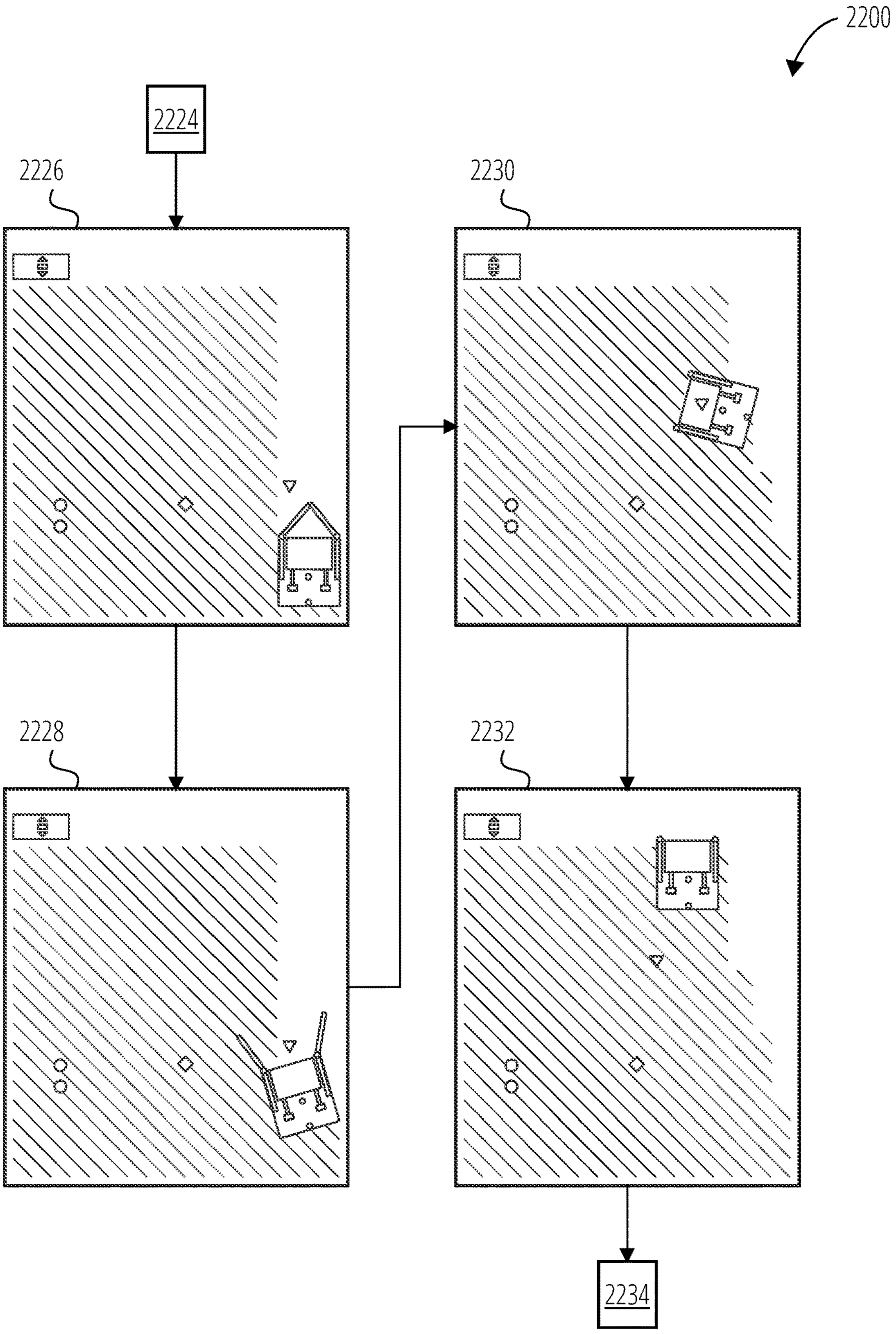
Figure 22E:
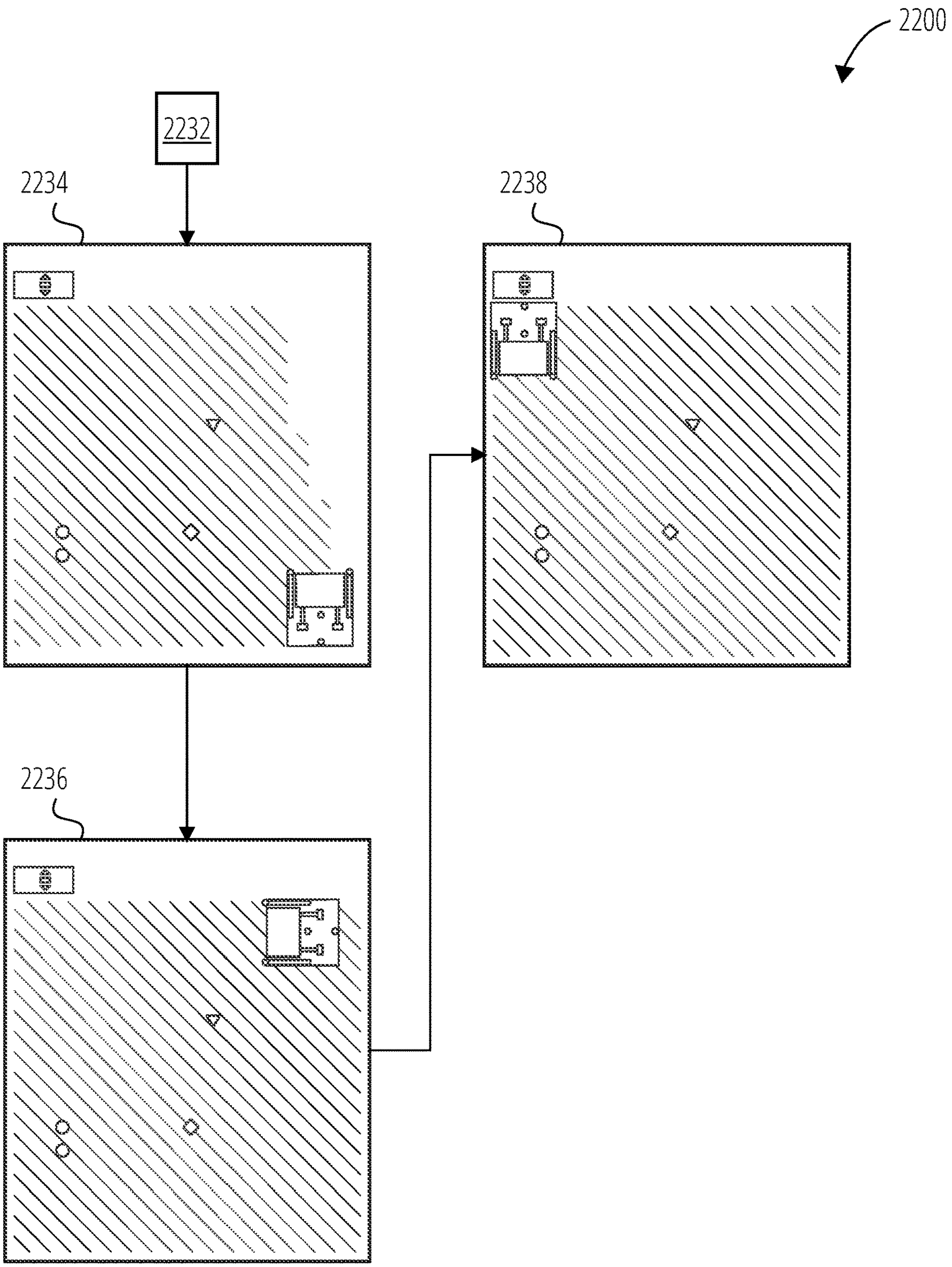

FIG. 20 illustrates a deposition process 2000 in accordance with one embodiment. The deposition process 2000 may be performed by a tidying robot 600 such as that introduced with respect to FIG. 6A as part of the algorithm disclosed herein. This robot may have the sensing system, control system, mobility system, pusher pads, pusher pad arms, and scoop illustrated in FIG. 1A through FIG. 1D or similar systems and features performing equivalent functions as is well understood in the art.

In block 2002, the robot may detect the destination where an object carried by the robot is intended to be deposited. In block 2004, the robot may determine a destination approach path to the destination. This path may be determined so as to avoid obstacles in the vicinity of the destination. In some embodiments, the robot may perform additional navigation steps to push objects out of and away from the destination approach path. The robot may also determine an object deposition pattern, wherein the object deposition pattern is one of at least a placing pattern and a dropping pattern. Some neatly stackable objects such as books, other media, narrow boxes, etc., may be most neatly decluttered by stacking them carefully. Other objects may not be neatly stackable, but may be easy to deposit by dropping into a bin. Based on object attributes, the robot may determine which object deposition pattern is most appropriate to the object.

In block 2006, the robot may approach the destination via the destination approach path. How the robot navigates the destination approach path may be determined based on the object deposition pattern. If the object being carried is to be dropped over the back of the robot's chassis, the robot may traverse the destination approach path in reverse, coming to a stop with the back of the chassis nearest the destination. Alternatively, for objects to be stacked or placed in front of the scoop, i.e., at the area of the scoop that is opposite the chassis, the robot may travel forward along the destination approach path so as to bring the scoop nearest the destination.

At decision block 2008, the robot may proceed in one of at least two ways, depending on whether the object is to be placed or dropped. If the object deposition pattern is intended to be a placing pattern, the robot may proceed to block 2010. If the object deposition pattern is intended to be a dropping pattern, the robot may proceed to block 2016.

For objects to be placed via the placing pattern, the robot may come to a stop with the destination in front of the scoop and the pusher pads at block 2010. In block 2012, the robot may lower the scoop and the pusher pads to a deposition height. For example, if depositing a book on an existing stack of books, the deposition height may be slightly above the top of the highest book in the stack, such that the book may be placed without disrupting the stack or dropping the book from a height such that it might have enough momentum to slide off the stack or destabilize the stack. Finally, at block 2014, the robot may use its pusher pads to push the object out of the containment area and onto the destination. In one embodiment, the scoop may be tilted forward to drop objects, with or without the assistance of the pusher pads pushing the objects out from the scoop.

If in decision block 2008 the robot determines that it will proceed with an object deposition pattern that is a dropping pattern, the robot may continue to block 2016. At block 2016, the robot may come to a stop with the destination behind the scoop and the pusher pads, and by virtue of this, behind the chassis for a robot such as the one introduced in FIG. 1A. In block 2018, the robot may raise the scoop and the pusher pads to the deposition height. In one embodiment the object may be so positioned that raising the scoop and pusher pad arms from the carrying position to the deposition height results in the object dropping out of the containment area into the destination area. Otherwise, in block 2020, the robot may extend the pusher pads and allow the object to drop out of the containment area, such that the object comes to rest at or in the destination area. In one embodiment, the scoop may be tilted forward to drop objects, with or without the assistance of the pusher pads pushing the objects out from the scoop.

FIG. 21A-FIG. 21E illustrate a map tracking vacuumed areas while putting objects away immediately 2100 in accordance with one embodiment. A tidying robot 600 may be seen, beginning at its base station 700 in step 2102. It may be configured to clean a target cleaning area 2140 in which there are obstructions 2142. There are also target storage bins 2146 in which different categories of obstructions may be placed. In step 2104, the robot may be seen departing from its base station, having begun a vacuum cleaning pattern 2144, where cleaned areas are marked on its map, as indicated by the diagonal line pattern. The robot may encounter a wall or some other immoveable object at step 2106, and may make a turn to continue its vacuuming strategy. The robot may encounter objects at step 2108. The robot may pick the objects up in its scoop and carry them to a bin, leaving a portion of the floor vacuumed as shown in step 2110. After depositing the objects into the bin, the robot may turn and vacuum the portion left vacuumed in step 2112, and may proceed to a point along the path it was previously following, continuing its vacuuming pattern, as shown in step 2114, step 2116, and step 2118. More objects may be encountered and retrieved at step 2120 and moved to appropriate bins at step 2122, with the robot returning to its vacuuming pattern at step 2124, this process being again repeated in step 2126, step 2128, step 2130, step 2132, and step 2134. When all areas of the vacuuming pattern have been completed and the entire floor has thus been vacuumed, as shown at step 2136, the robot may return to its base station at step 2138.

In one embodiment, debris and trash may be among the objects detected, and the robot may use its pusher pads to sweep these into its scoop and carry them to a designated trash bin. In another embodiment, the robot may traverse the floor in a pre-sweep position as shown in FIG. 10A and FIG. 10B. In such an embodiment, the robot may relocate any debris it may have picked up in this position to an vacuumed spot on the floor before retrieving and putting away objects. It may then re-encounter the debris later in its vacuuming pattern, and continue in this manner until all tidyable objects are put away, at which time it may collect the debris in its scoop and deposit it in an appropriate trash bin. For example, the bin on the base station 700 illustrated in FIG. 7A and FIG. 7B may be used for depositing this debris once the vacuuming pattern is complete.

FIG. 22A-FIG. 22E illustrate a map tracking vacuumed areas while moving objects aside 2200 in accordance with one embodiment. As may be seen, it begins similarly to the map tracking vacuumed areas while putting objects away immediately 2100 illustrated in FIG. 21A-FIG. 21E. However, instead of carrying objects picked up to a bin, the robot simply deposits the objects onto areas that have already been vacuumed, as represented by the diagonal line pattern. Each time, the robot continues its vacuuming pattern from there, until the entire area has been cleaned, then returns to its base station, leaving the objects on the floor.

A tidying robot 600 may be seen, beginning at its base station 700 in step 2202. It may be configured to clean a target cleaning area 2140 in which there are obstructions 2142. In step 2204, the robot may be seen departing from its base station, having begun a vacuum cleaning pattern 2144, where cleaned areas are marked on its map, as indicated by the diagonal line pattern. The robot may encounter a wall or some other immoveable object at step 2206, and may make a turn to continue its vacuuming strategy. The robot may encounter objects at step 2208. The robot may pick the objects up in its scoop and carry them to an already vacuumed portion of the floor, as shown in step 2210. After depositing the objects onto a vacuumed portion of the floor, the robot may continue its vacuuming pattern, as may be seen in step 2212, step 2214, and step 2216. This process may be repeated in step 2218, step 2220, step 2222, step 2224, and step 2226, an then again for step 2228, step 2230, step 2232, and step 2234, until the vacuuming pattern is complete as shown at step 2236. The robot may return to its base station at step 2238.

In another embodiment, the robot may vacuum during a process of tidying objects from the floor of a target cleaning area. The robot may detect objects via its sensors and/or based on their known location on an environment map, as described with respect to FIG. 35. As the robot detects and picks up objects and deposits them in appropriate bins and/or locations, the vacuum system may be functioning, and the robot may keep track of areas that are and/or are not vacuumed during the tidying process. Once the tidying process is complete, the robot may complete a vacuuming pattern that covers at least the portions of the target cleaning area that were not vacuumed during the tidying process. In another embodiment, the robot may complete the tidying process without vacuuming, and may then vacuum the entire area in accordance with a simple vacuuming strategy that covers the entire target cleaning area.

Figure 23A:
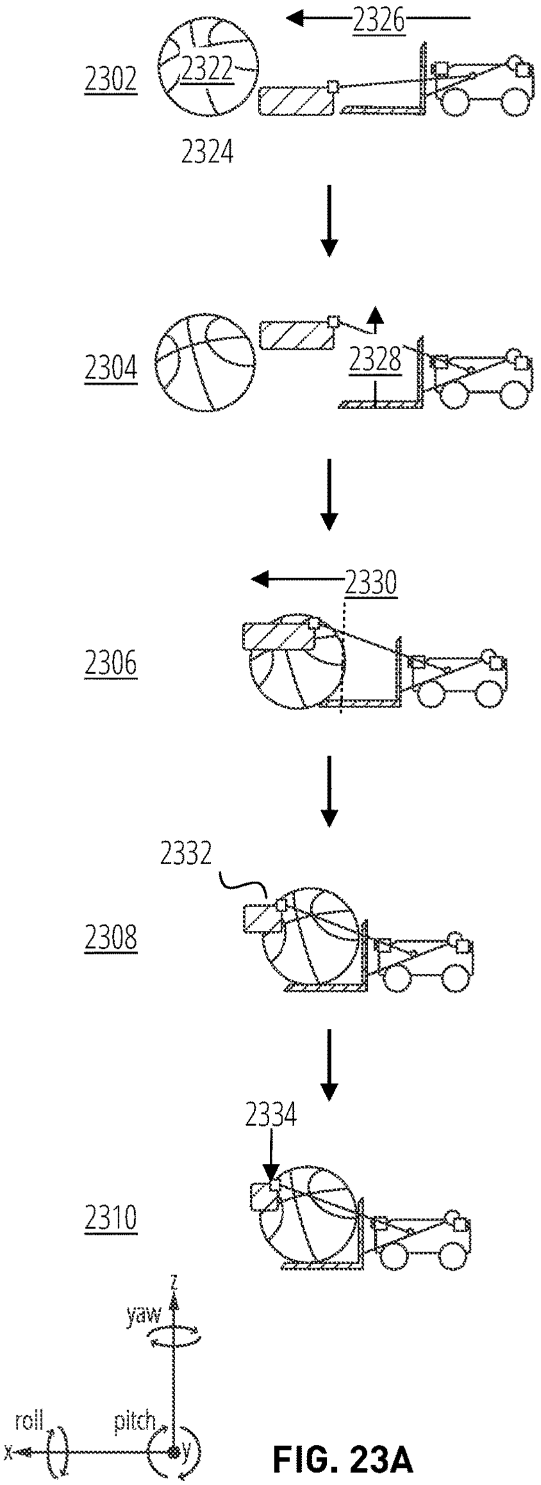
FIG. 23A through FIG. 23D illustrate a pickup strategy for a large, slightly deformable object 2300 in accordance with one embodiment.
Figure 23B:
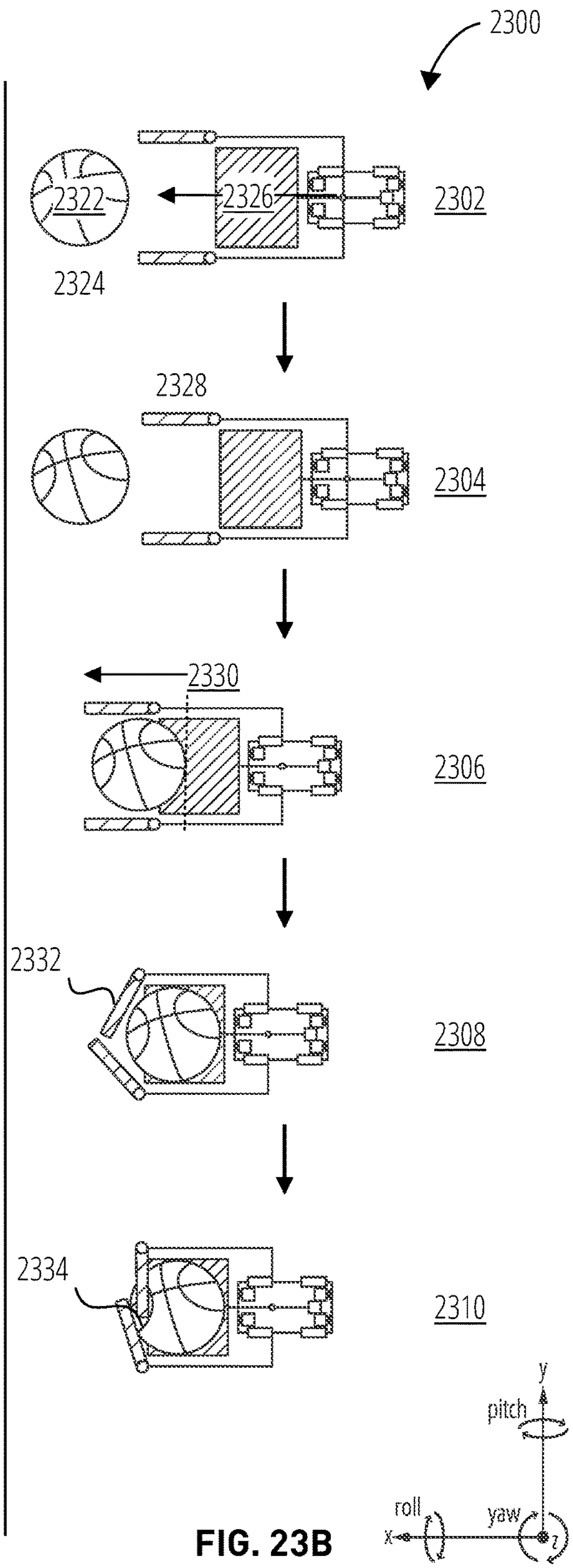
Figures 23C, 23D:
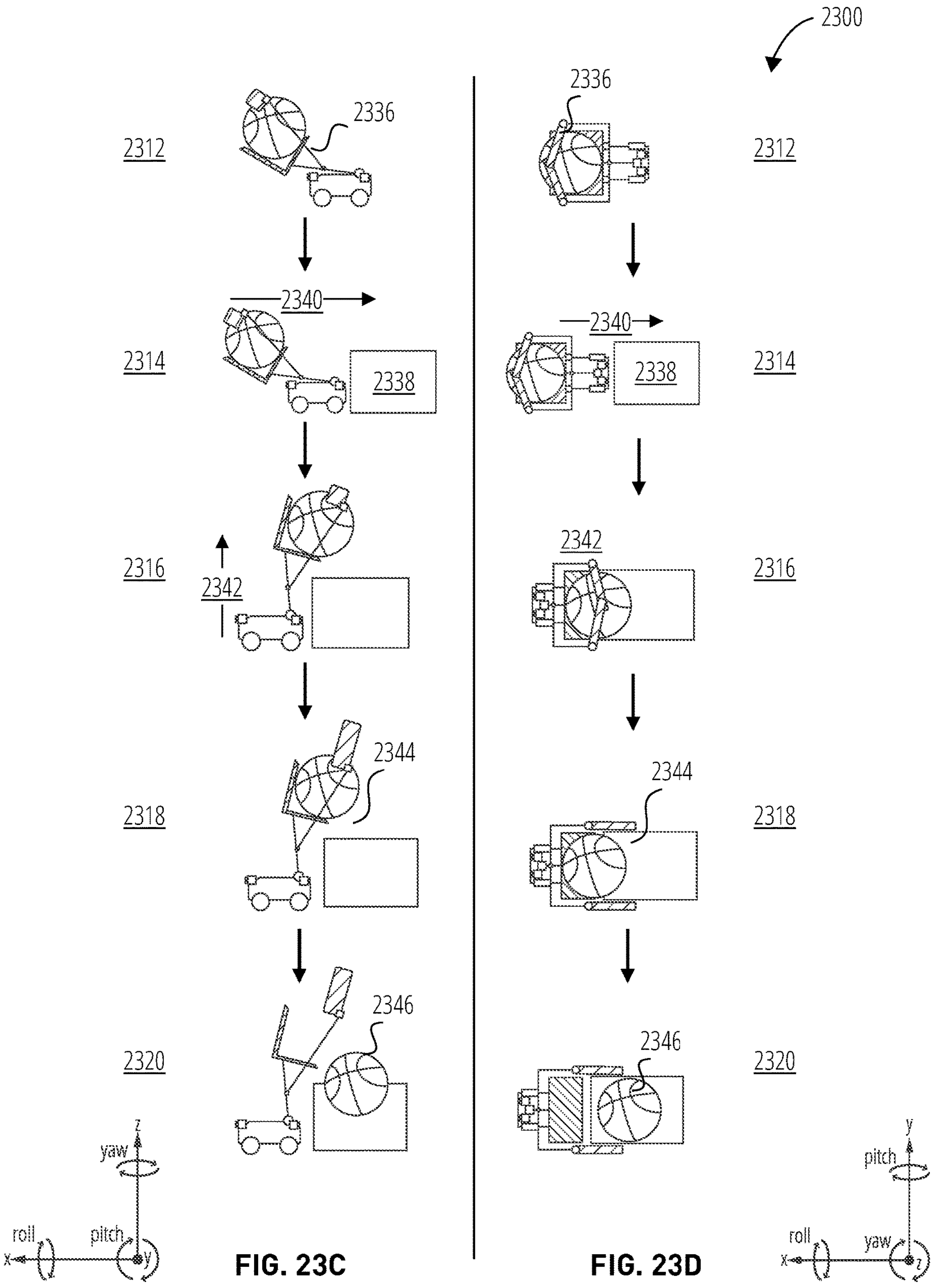

FIG. 23A-FIG. 23D illustrate a pickup strategy for a large, slightly deformable object 2300 in accordance with one embodiment. FIG. 23A shows a side view of the robot performing steps 2302-2310, while FIG. 23B shows a top view of the performance of these same steps. FIG. 23C illustrates a side view of steps 2312-2320, and FIG. 23D shows a top view of these steps. A large, slightly deformable object may be an object such as a basketball, which extends outside of the dimensions of the scoop, and may respond to pressure with very little deformation or change of shape.

As illustrated in FIG. 23A and FIG. 23B, the robot may first drive to the basketball 2322, such as a basketball, located at a starting location 2324, following an approach path 2326 at step 2302. The robot may adjust its pusher pad arms to a grabbing height 2328 based on the type of object at step 2304. For a basketball 2322 such as a basketball, this may be near or above the top of the basketball. The robot, at step 2306, may drive so that its arms align past the object 2330. The robot may employ a grabbing pattern 2332 at step 2308 to use its arms to push or roll the basketball onto the scoop or scoop. Using the pusher pad arms at step 2310, the robot may apply a light pressure 2334 to the top of the basketball to hold it securely within or atop the scoop.

As shown in FIG. 23C and FIG. 23D, the robot may lift the basketball at step 2312 while continuing to hold it with its pusher pad arms, maintaining the ball within the scoop in a carrying position 2336. Next, at step 2314, the robot may drive to the post pickup location 2338 where the basketball is intended to be placed, following a post pickup location approach path 2340. At step 2316, the robot may adjust the scoop and pusher pad arms to position the basketball at a deposition height 2342. For an object such as a basketball, this may position the scoop and ball in an area above the robot, tilted or aimed toward a container. Alternatively, the container may be to the front of the robot and the objects deposited as illustrated in FIG. 6D. The robot may at step 2318 open its arms to release the object into the post pickup location container using a dropping pattern 2344. The basketball may then fall out of the scoop 2346 and come to rest in its post pickup location container at step 2320.

While the robot shown in FIG. 23A-FIG. 23D may be seen to have pusher pad arms attaching to pivot points on the scoop arm, this is a simplified schematic view provided for exemplary purposes. Performance of the pickup strategy for a large, slightly deformable object 2300 is not limited to robot embodiments exhibiting this feature. The pickup strategy for a large, slightly deformable object 2300 may be performed by any of the robot embodiments disclosed herein.

Figure 24A:
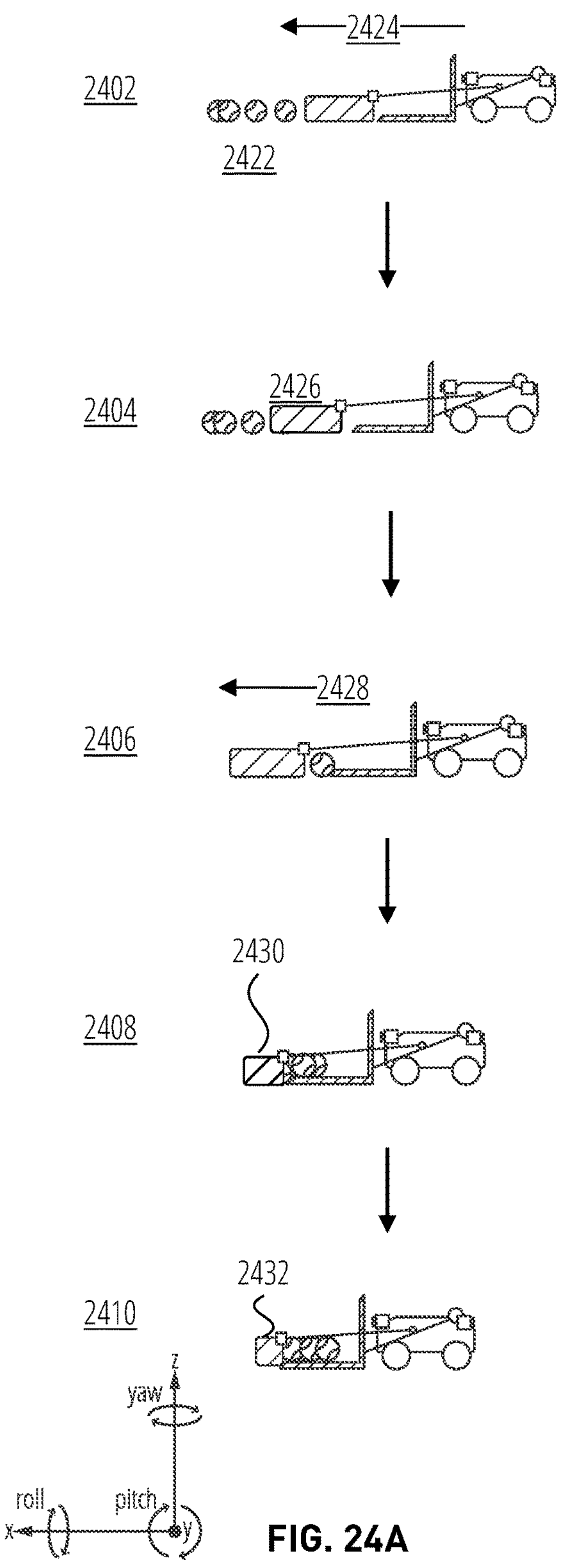
FIG. 24A-FIG. 24D illustrate a pickup strategy for small, easily scattered objects 2400 in accordance with one embodiment.
Figure 24B:
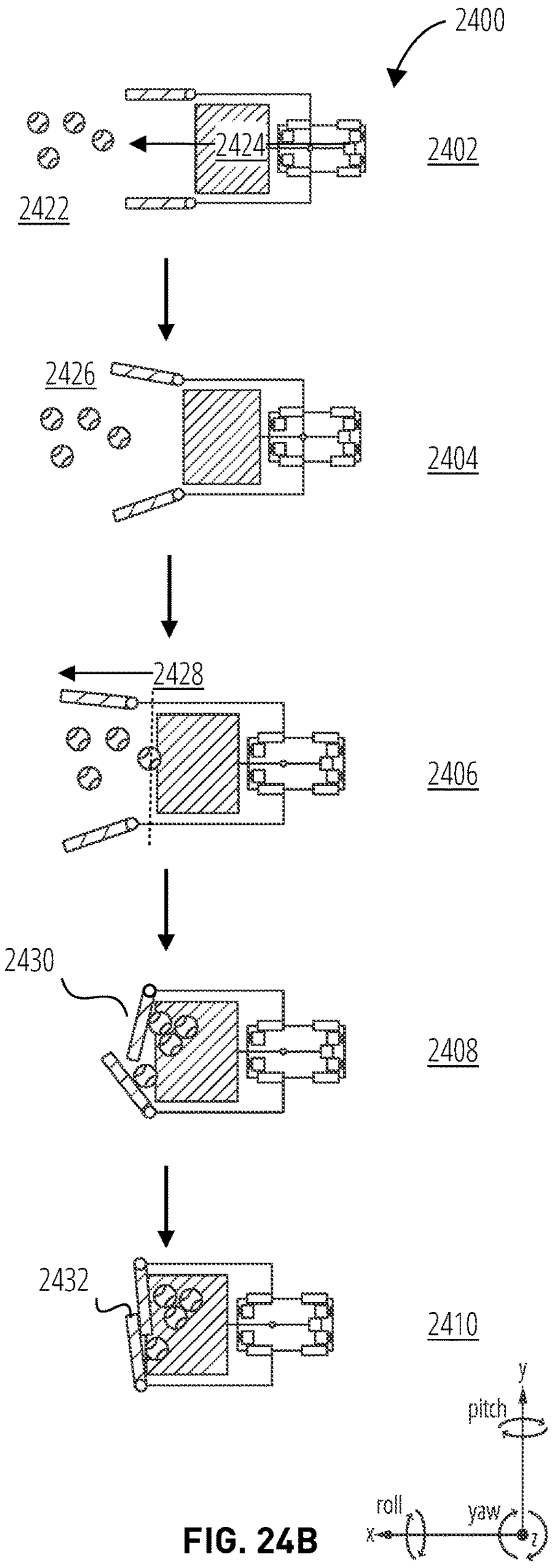
Figure 24C:
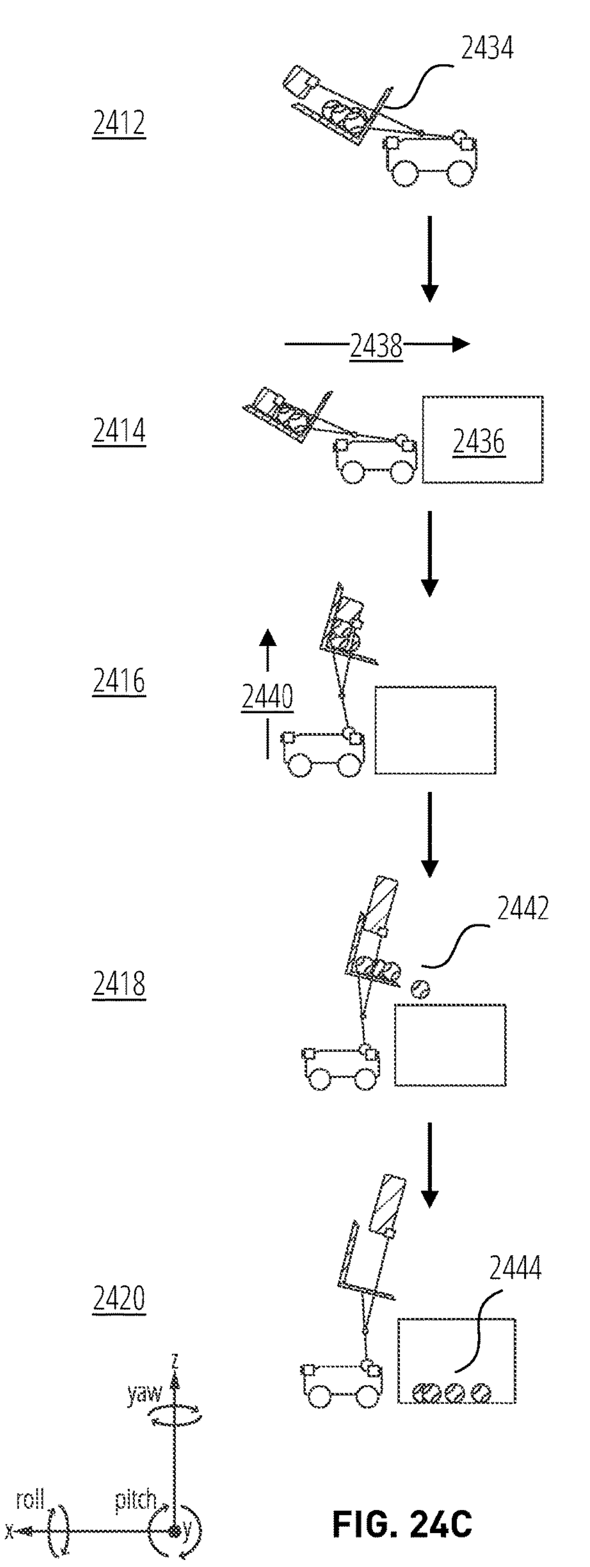
Figure 24D:
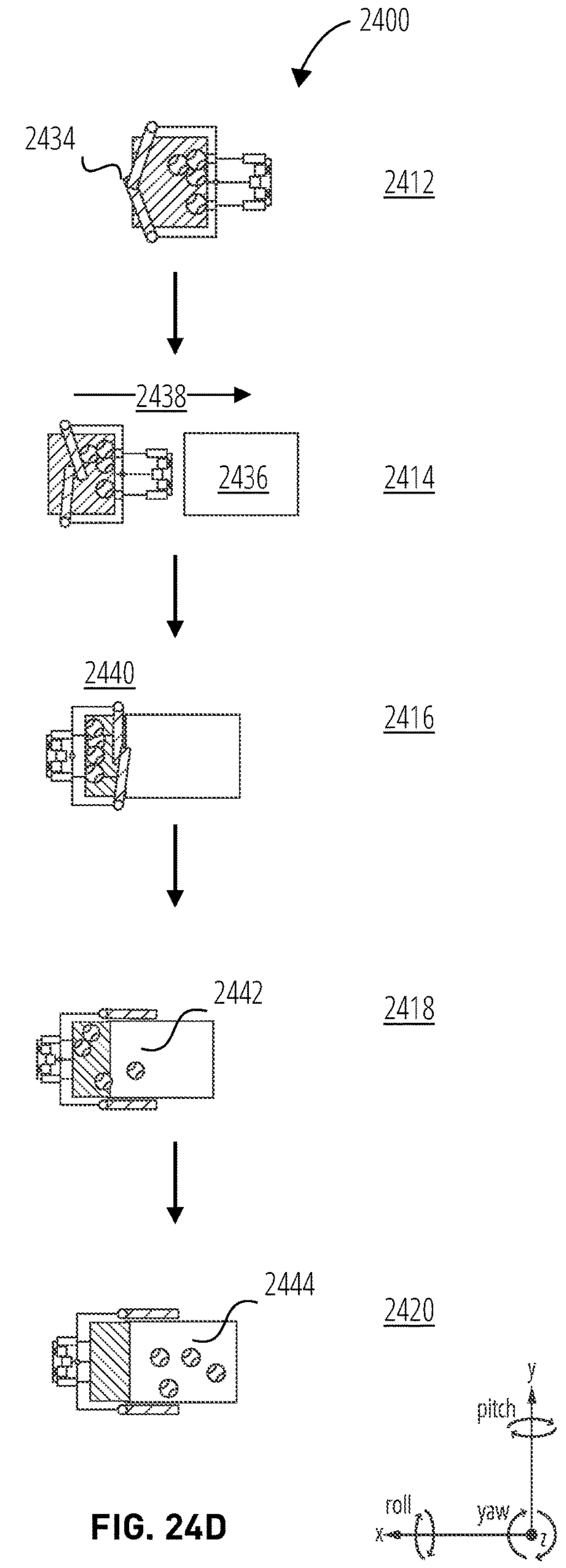

FIG. 24A-FIG. 24D illustrate a pickup strategy for small, easily scattered objects 2400 in accordance with one embodiment. FIG. 24A shows a side view of the robot performing steps step 2402-2410, while FIG. 24B shows a top view of the performance of these same steps. FIG. 24C illustrates a side view of steps 2412-2420, and FIG. 24D shows a top view of these steps. Tennis balls are illustrated, but a similar process may be used for other small, easily scattered objects that may be easily disbursed when contacted with the robot's pusher pad arms, or may slip out of the scoop during transit if appropriate care is not taken.

As illustrated in FIG. 24A and FIG. 24B, the robot may first drive to the tennis balls located at a starting location 2422, following an approach path 2424 at step 2402. The robot may, at step 2404, adjust its pusher pad arms to a grabbing height 2426 based on the type of object being collected. For tennis balls, this may be near or in contact with the floor. At step 2406, the robot may drive so that its arms are aligned past the objects 2428. The robot may employ a grabbing pattern 2430 at step 2408 to use its arms to push the objects onto the scoop. The grabbing pattern 2430 for such objects may apply less force, or use small, sweeping motions rather than a continuous pressure. The grabbing pattern 2430 may include a caging maneuver, in which one arm closes first and the other closes behind it to first trap then collect the balls. At step 2410, the robot may close its arms 2432 across the front of the scoop, and may apply light pressure against the scoop, to prevent the tennis balls or other objects from rolling or sliding out.

As shown in FIG. 24C and FIG. 24D, the robot may lift the tennis balls or other objects at step 2412 while continuing to block the scoop front opening with its pusher pad arms, maintaining the objects within the scoop in a carrying position 2434. Next, at step 2414, the robot may drive to the post pickup location 2436 where the objects are intended to be placed, such as a ball basket, following a post pickup location approach path 2438. The robot may adjust the scoop and pusher pad arms at step 2416 to position the objects at a deposition height 2440. This may position the scoop in an area above the robot, tilted or aimed toward a container at the rear of the robot as shown. Alternatively, the container may be to the front of the robot and the objects deposited as illustrated in FIG. 6D. At step 2418, the robot may open its arms to release any objects trapped by them into the post pickup location container using a dropping pattern 2442. The tennis balls or other objects may then roll, slide, or fall out of the scoop 2444 and come to rest in their post pickup location container at step 2420.

While the robot shown in FIG. 24A-FIG. 24D may be seen to have pusher pad arms attaching to pivot points on the scoop arm, this is a simplified schematic view provided for exemplary purposes. Performance of the pickup strategy for small, easily scattered objects 2400 is not limited to robot embodiments exhibiting this feature. The pickup strategy for small, easily scattered objects 2400 may be performed by any of the robot embodiments disclosed herein.

Figure 25:
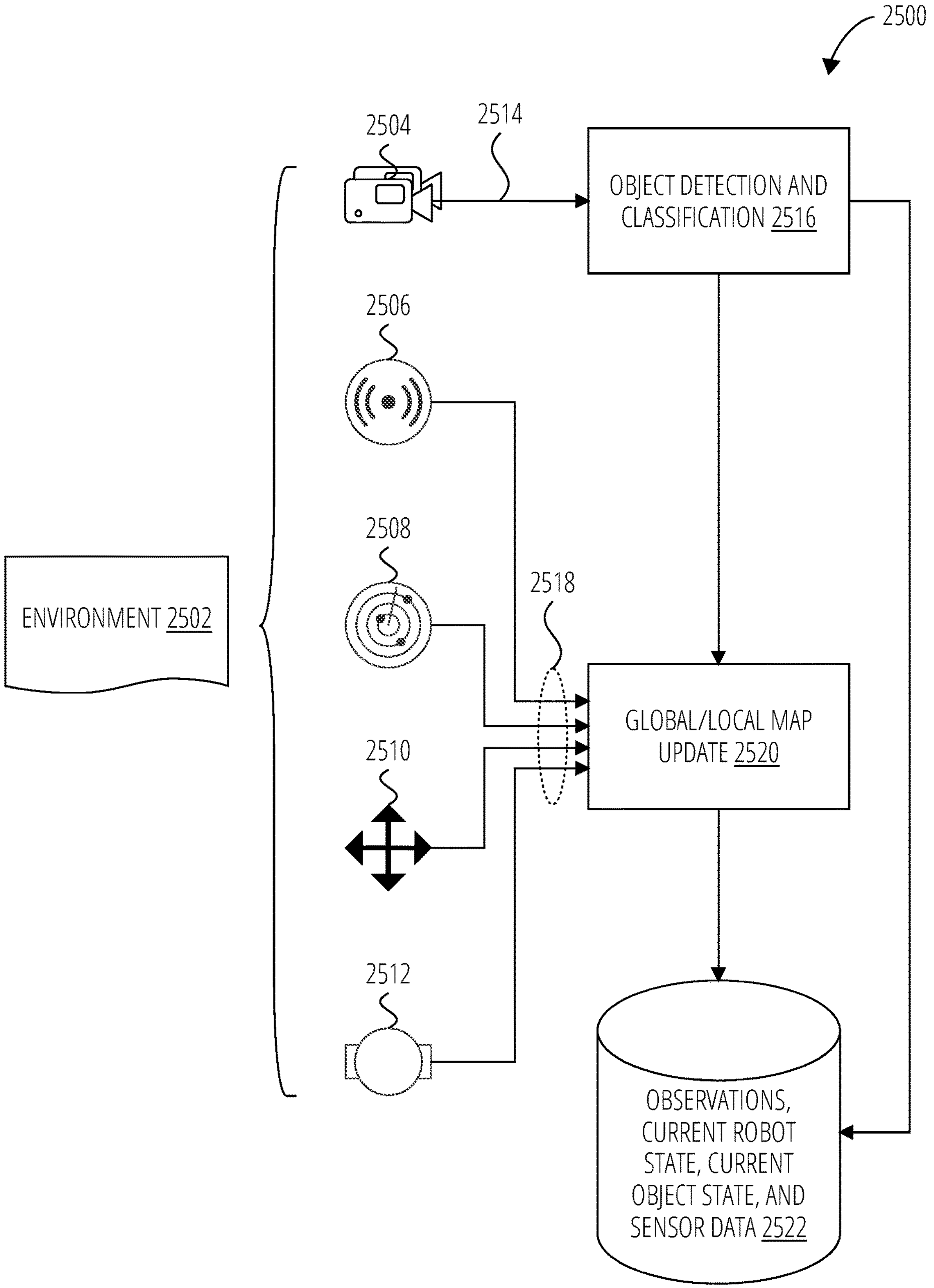
FIG. 25 illustrates sensor input analysis 2500 in accordance with one embodiment.

FIG. 25 illustrates sensor input analysis 2500 in accordance with one embodiment. Sensor input analysis 2500 may inform the robot vacuum system tidying robot 600 of the dimensions of its immediate environment 2502 and the location of itself and other objects within that environment 2502.

The robot vacuum system tidying robot 600 as previously described includes a sensing system 106. This sensing system 106 may include at least one of cameras 2504, IMU sensors 2506, lidar sensor 2508, odometry 2510, and actuator force feedback sensor 2512. These sensors may capture data describing the environment 2502 around the tidying robot 600.

Image data 2514 from the cameras 2504 may be used for object detection and classification 2516. Object detection and classification 2516 may be performed by algorithms and models configured within the robotic control system 1100 of the tidying robot 600. In this manner, the characteristics and types of objects in the environment 2502 may be determined.

Image data 2514, object detection and classification 2516 data, and other sensor data 2518 may be used for a global/local map update 2520. The global and/or local map may be stored by the tidying robot 600 and may represent its knowledge of the dimensions and objects within its decluttering environment 2502. This map may be used in navigation and strategy determination associated with decluttering tasks. In one embodiment, image data 2514 may undergo processing as described with respect to the image processing routine 2600 illustrated in FIG. 26.

The tidying robot 600 may use a combination of camera 2504, lidar sensor 2508 and the other sensors to maintain a global or local area map of the environment and to localize itself within that. Additionally, the robot may perform object detection and object classification and may generate visual re-identification fingerprints for each object. The robot may utilize stereo cameras along with a machine learning/neural network software architecture (e.g., semi-supervised or supervised convolutional neural network) to efficiently classify the type, size and location of different objects on a map of the environment.

The robot may determine the relative distance and angle to each object. The distance and angle may then be used to localize objects on the global or local area map. The robot may utilize both forward and backward facing cameras to scan both to the front and to the rear of the robot.

image data 2514, object detection and classification 2516 data, other sensor data 2518, and global/local map update 2520 data may be stored as observations, current robot state, current object state, and sensor data 2522. The observations, current robot state, current object state, and sensor data 2522 may be used by the robotic control system 1100 of the tidying robot 600 in determining navigation paths and task strategies.

Figure 26:
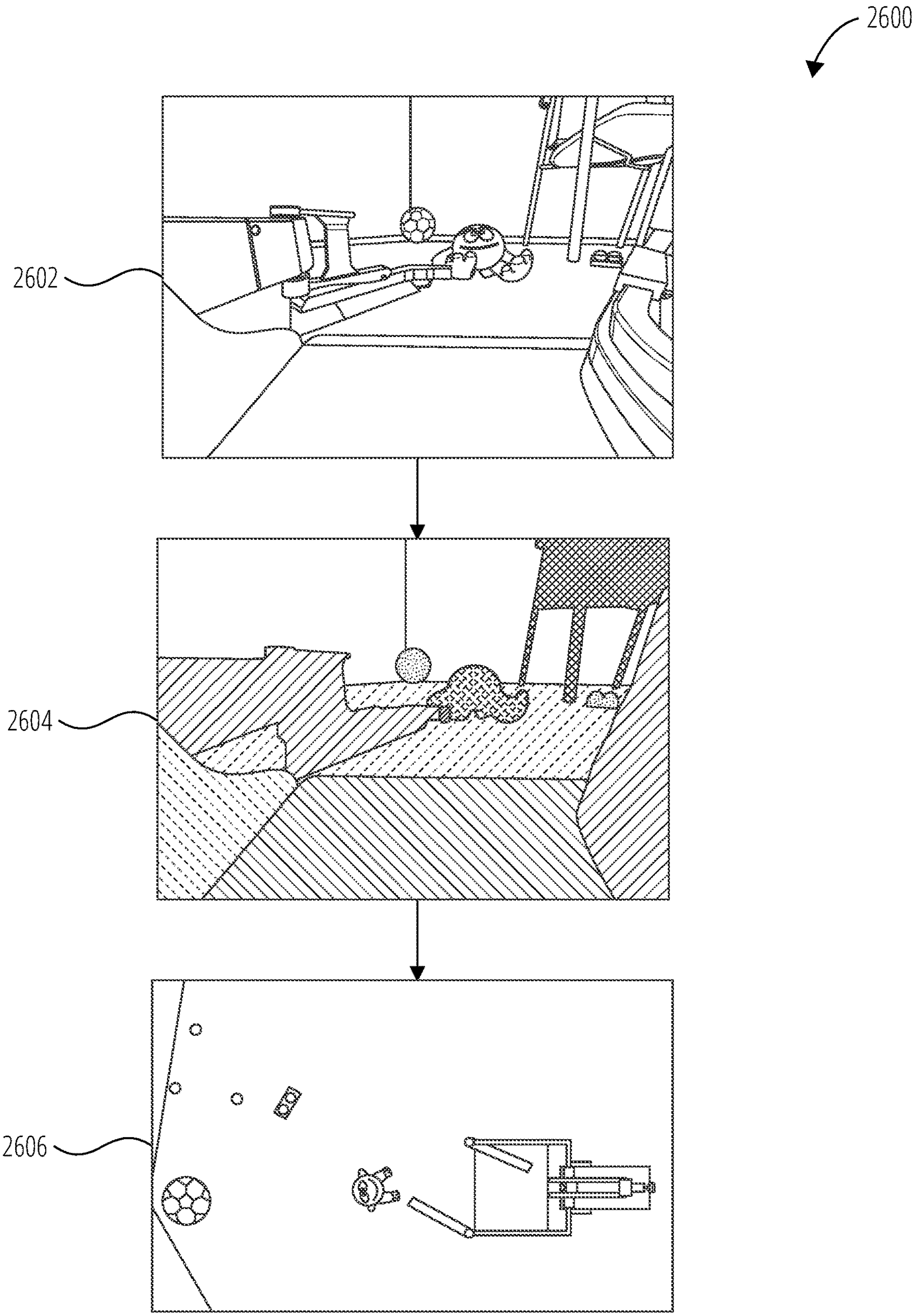
FIG. 26 illustrates an image processing routine 2600 in accordance with one embodiment.

FIG. 26 illustrates an image processing routine 2600 in accordance with one embodiment. Detected images 2602 captured by the robot sensing system may undergo segmentation, such that areas of the segmented image 2604 may be identified as different objects, and those objects may be classified. Classified objects may then undergo perspective transform 2606, such that a map, as shown by the top down view at the bottom, may be updated with objects detected through segmentation of the image.

Figure 27:
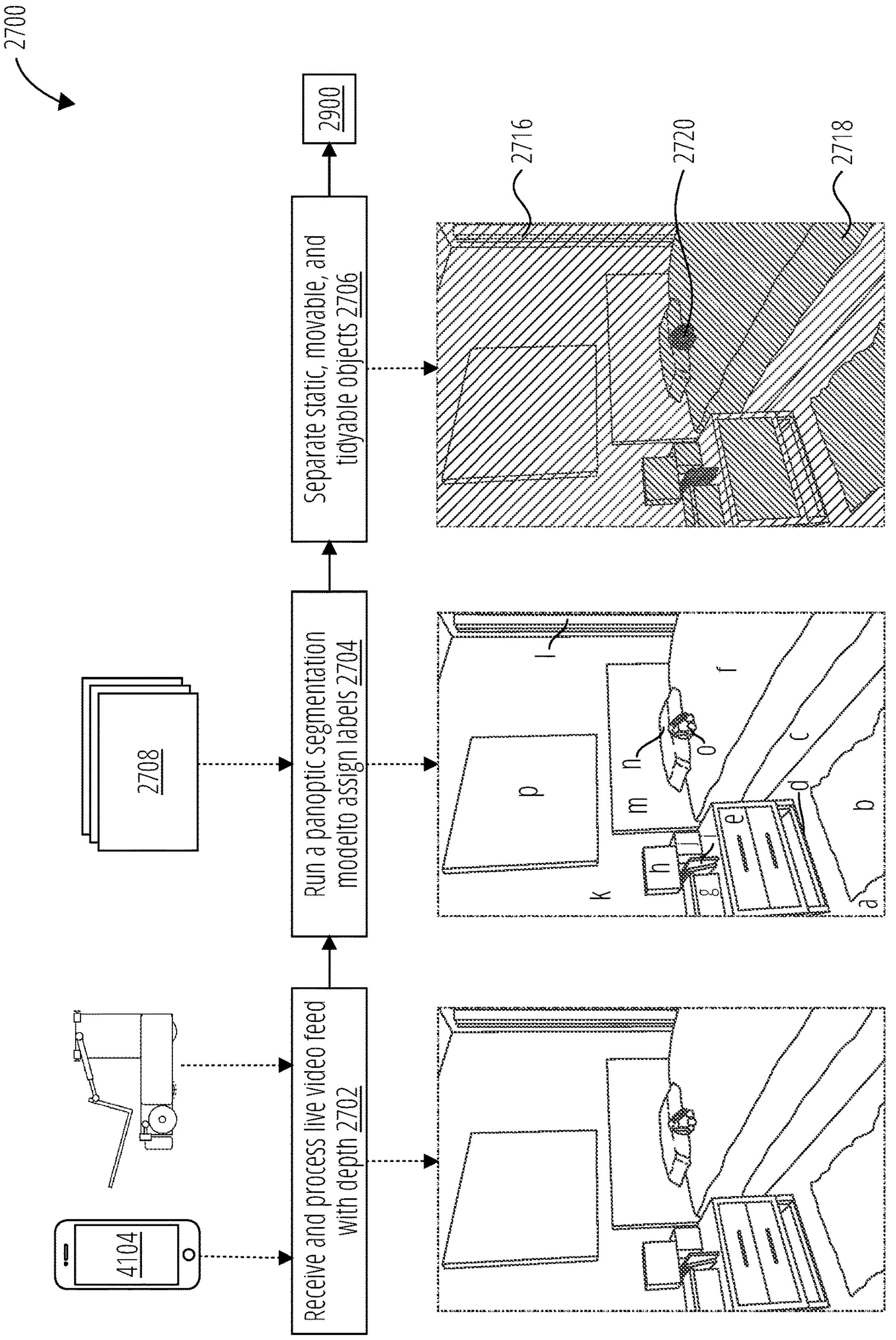
FIG. 27 illustrates a video-feed segmentation routine 2700 in accordance with one embodiment.

FIG. 27 illustrates a video-feed segmentation routine 2700 in accordance with one embodiment. Although the example video-feed segmentation routine 2700 depicts a particular sequence of operations, the sequence may be altered without departing from the scope of the present disclosure. For example, some of the operations depicted may be performed in parallel or in a different sequence that does not materially affect the function of the video-feed segmentation routine 2700. In other examples, different components of an example device or system that implements the video-feed segmentation routine 2700 may perform functions at substantially the same time or in a specific sequence.

According to some examples, the method includes receiving and processing live video with depth at block 2702. The live video feed may capture an environment to be tidied. For example, the mobile computing device 4104 illustrated in FIG. 41 may be configured to receive and process live video with depth using a camera configured as part of the mobile computing device 4104 in conjunction with the robotic control system 1100. This live video may be used to begin mapping the environment to be tidied, and to support the configuration and display of an augmented reality (AR) user interface. Alternatively, the tidying robot previously disclosed may be configured to receive and process live video with depth using their cameras 124 in conjunction with the robotic control system 1100. This may support the robot's initialization, configuration, and operation as disclosed herein. The live video feed may include images of a scene 2710 across the environment to be tidied. These may be processed to display an augmented reality view to a user on a global map of the environment to be tidied.

According to some examples, the method includes running a panoptic segmentation model 2708 to assign labels at block 2704. For example, the panoptic segmentation model 2708 illustrated in FIG. 27 may run a model to assign labels. The model may assign a semantic label (such as an object type), an instance identifier, and a movability attribute (such as static, movable, and tidyable) for each pixel in an image of a scene 2710 (such as is displayed in a frame of captured video). The panoptic segmentation model 2708 may be configured as part of the logic 1114 of the robotic control system 1100 in one embodiment. The panoptic segmentation model 2708 may in this manner produce a segmented image 2712 for each image of a scene 2710. Elements detected in the segmented image 2712 may in one embodiment be labeled as shown:

a. floor
b. rug
c. bedframe
d. nightstand
e. drawer
f. bedspread
g. box
h. lamp
i. books
j. picture
k. wall
l. curtains
m. headboard
n. pillow
o. stuffed animal
p. painting According to some examples, the method includes separating the segmented image into static objects 2716, movable objects 2718, and tidyable objects 2720 at block 2706. For example, the robotic control system 1100 illustrated in FIG. 11 may separate static, movable, and tidyable objects. Using the segmented image 2712 and assigned labels, static structures in the represented scene, such as floors, walls, and large furniture, may be separated out as static objects 2716 from movable objects 2718 like chairs, doors, and rugs, and tidyable objects 2720 such as toys, books, and clothing. Upon completion of the video-feed segmentation routine 2700, the mobile device, tidying robot, and robotic control system may act to perform the static object identification routine 2900 illustrated in FIG. 29 based on the objects separated into static objects, movable objects, and tidyable objects 2714.

Figure 28A:
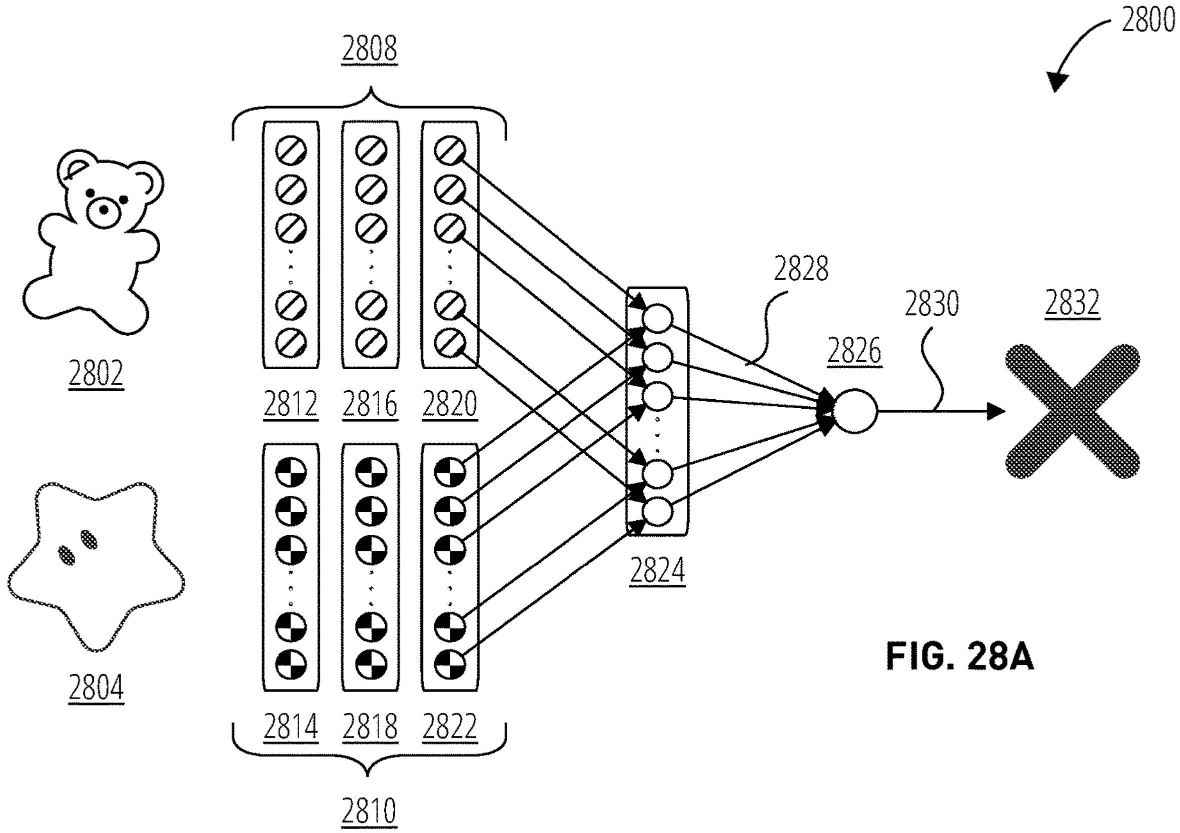
FIG. 28A and FIG. 28B illustrate object identification with fingerprints 2800 in accordance with one embodiment.
Figure 28B:
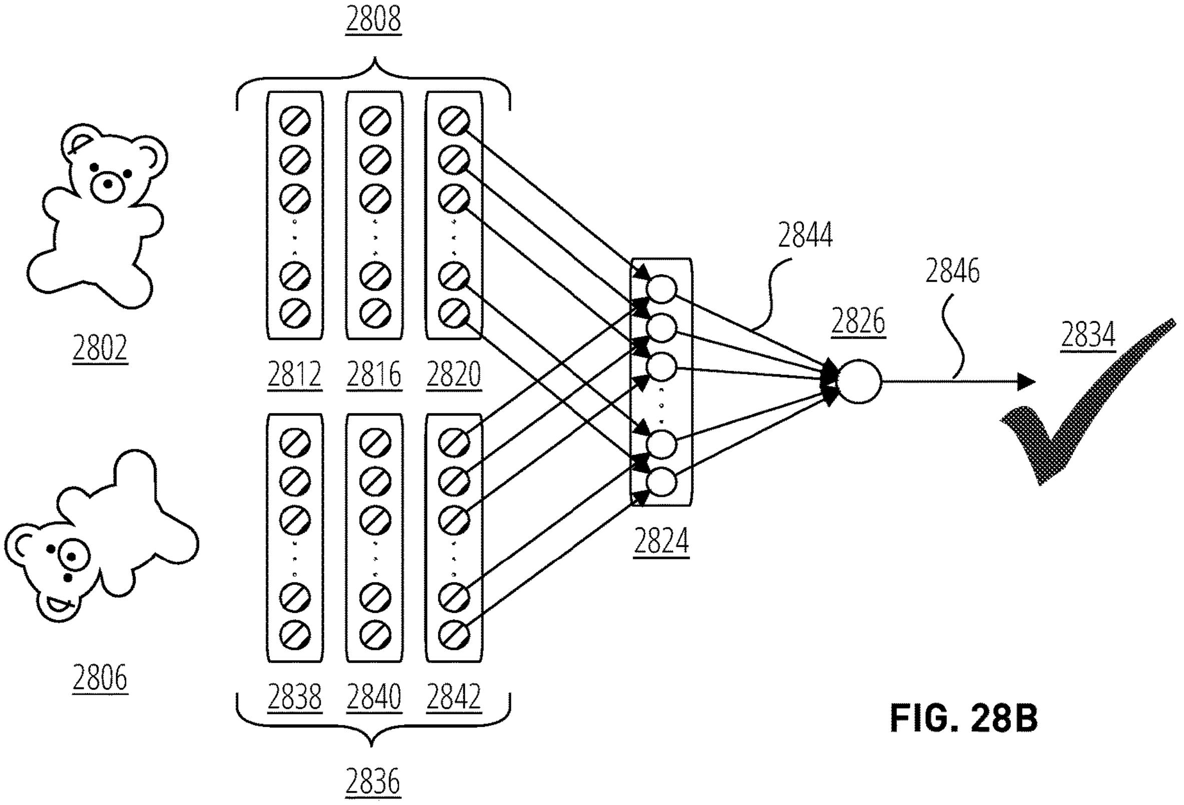

FIG. 28A and FIG. 28B illustrate object identification with fingerprints 2800 in accordance with one embodiment. FIG. 28A shows an example where a query set of fingerprints does not match the support set. FIG. 28B shows an example where the query set does match the support set.

A machine learning algorithm called meta-learning may be used to re-identify objects detected after running a panoptic segmentation model 2708 on a frame from an image of a scene 2710 as described with respect to FIG. 27. This may also be referred to as few-shot learning.

Images of objects are converted into embeddings using a convolutional neural network (CNN). The embeddings may represent a collection of visual features that may be used to compare visual similarity between two images. In one embodiment, the CNN may be specifically trained to focus on reidentifying whether an object is an exact visual match (i.e, determine if it is an image of the same object).

A collection of embeddings that represent a particular object may be referred to as a re-identification fingerprint. When re-identifying an object, a support set or collection of embeddings for each known object and a query set including several embeddings for the object being re-identified may be used. For example, for query object 2802, query object fingerprint 2808 may comprise the query set and may include query object embedding 2812, query object embedding 2816, and query object embedding 2820. Known objects 2804 and 2806 may each be associated with known object fingerprint 2810 and known object fingerprint 2836, respectively. Known object fingerprint 2810 may include known object embedding 2814, known object embedding 2818, and known object embedding 2822. Known object fingerprint 2836 may include known object embedding 2838, known object embedding 2840, and known object embedding 2842.

Embeddings may be compared in a pairwise manner using a distance function to generate a distance vector that represents the similarity of visual features. For example, distance function 2824 may compare the embeddings of query object fingerprint 2808 and known object fingerprint 2810 in a pairwise manner to generate distance vectors 2828. Similarly, the embeddings of query object fingerprint 2808 and known object fingerprint 2836 may be compared pairwise to generate distance vectors 2844.

A probability of match may then be generated using a similarity function that takes all the different distance vector(s) as input. For example, similarity function 2826 may use distance vectors 2828 as input to generate a probability of a match 2830 for query object 2802 and known object 2804. The similarity function 2826 may likewise use distance vectors 2844 as input to generate a probability of a match 2846 for query object 2802 and known object 2806. Note that because an object may look visually different when viewed from different angles it is not necessary for all of the distance vector(s) to be a strong match.

Additional factors may also be taken into account when determining the probability of a match such as object position on the global match and the object type as determined by the panoptic segmentation model. This is especially important when a small support set is used.

Taking these factors into account, the probability of a match 2830 may indicate no match 2832 between query object 2802 and known object 2804. On the other hand, the probability of a match 2846 may indicate a match 2834 between query object 2802 and known object 2806. Query object 2802 may thus be re-identified with high confidence as known object 2806 in one embodiment.

Once an object has been re-identified with high confidence, embeddings from the query set (query object fingerprint 2808) may be used to update the support set (known object fingerprint 2836). This may improve the reliability of re-identifying an object again in the future. However, the support set may not grow indefinitely and may have a maximum number of samples.

In one embodiment, a prototypical network may be chosen, where different embeddings for each object in the support set are combined into an "average embedding" or "representative embedding" which may then be compared with the query set to generate a distance vector as an input to help determine the probability of a match. In one embodiment, more than one "representative embedding" for an object may be generated if the object looks visually different from different angles.

Figure 29:
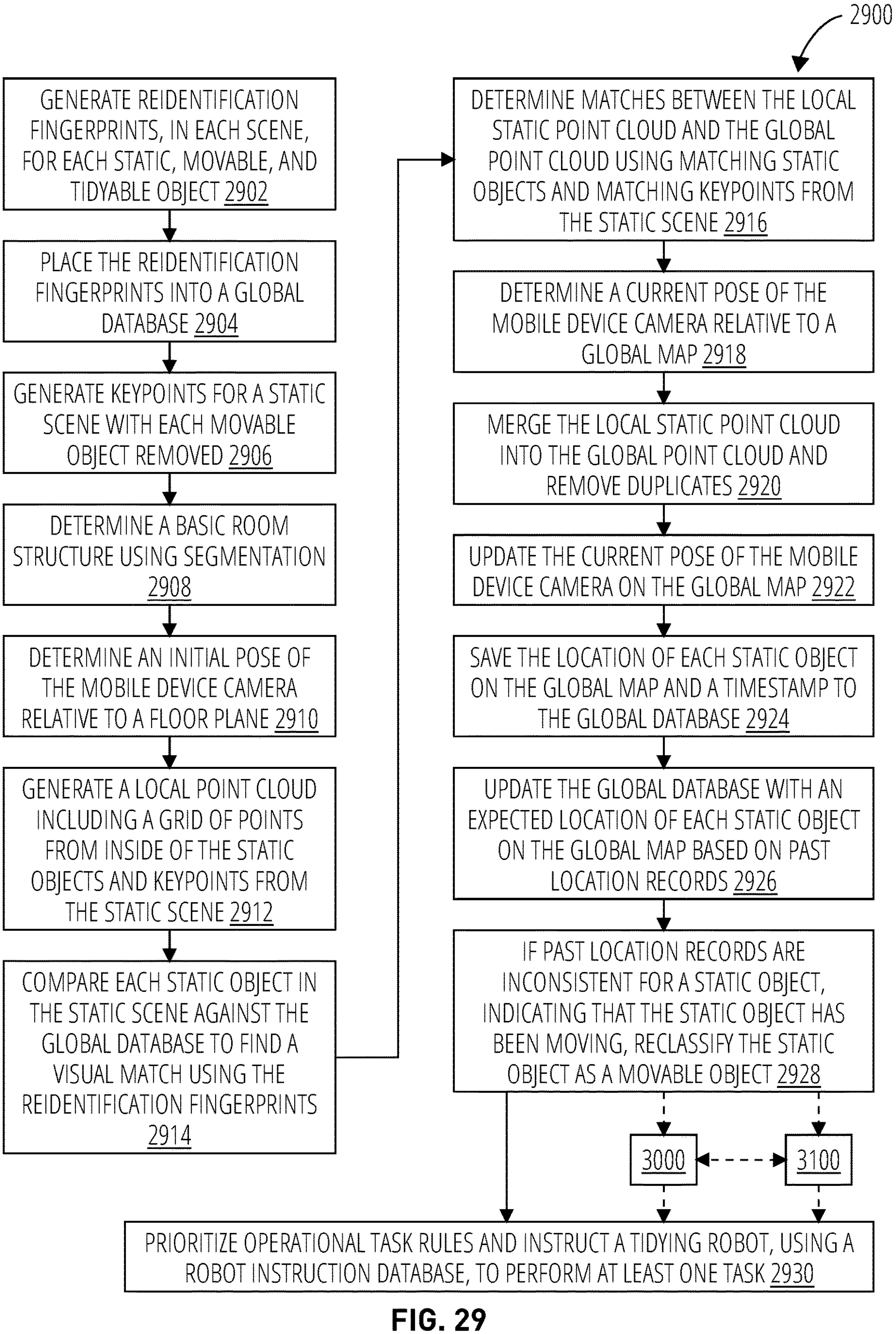
FIG. 29 illustrates a static object identification routine 2900 in accordance with one embodiment.

FIG. 29 illustrates a static object identification routine 2900 in accordance with one embodiment. The mobile device, such as a user's smartphone or tablet or the tidying robot, may use a mobile device camera to detect static objects in order to localize itself within the environment, since such objects may be expected to remain in the same position.

- The indoor room structure such as the floor segmentation, wall segmentation, and ceiling segmentation may be used to orient the mobile device camera relative to the floor plane. This may provide the relative vertical position and orientation of the mobile device camera relative to the floor, but not necessarily an exact position on the map.
- Scale invariant keypoints may be generated using the pixels in the segmented image 2712 that correspond with static objects, and these keypoints may be stored as part of a local point cloud.
- Reidentification fingerprints may also be generated for each static object in the image frame and stored as part of a local point cloud.
- Matching takes place between the local point cloud (based on the current mobile device camera frame) and the global point cloud (based on visual keypoints and static objects on the global map). This is used to localize the mobile device camera relative to the global map.

The mobile device camera may be the cameras camera 124 mounted on the tidying robot as previously described. The mobile device camera may also be a camera configured as part of a user's smartphone, tablet, or other commercially available mobile computing device.

Although the example static object identification routine 2900 depicts a particular sequence of operations, the sequence may be altered without departing from the scope of the present disclosure. For example, some of the operations depicted may be performed in parallel or in a different sequence that does not materially affect the function of the static object identification routine 2900. In other examples, different components of an example device or system that implements the static object identification routine 2900 may perform functions at substantially the same time or in a specific sequence. This static object identification routine 2900 may be performed by the robotic control system 1100 described with respect to FIG. 11.

According to some examples, the method includes generating reidentification fingerprints, in each scene, for each static, movable, and tidyable object at block 2902. This may be performed using a segmented image including static scene structure elements and omitting other elements. These reidentification fingerprints may act as query sets (query object fingerprints 2808) used in the object identification with fingerprints 2800 process described with respect to FIG. 28A and FIG. 28B. According to some examples, the method includes placing the reidentification fingerprints into a global database at block 2904. The global database may store data for known static, movable, and tidyable objects. This data may include known object fingerprints to be used as described with respect to FIG. 28A and FIG. 28B.

According to some examples, the method includes generating keypoints for a static scene with each movable object removed at block 2906. According to some examples, the method includes determining a basic room structure using segmentation at block 2908. The basic room structure may include at least one of a floor, a wall, and a ceiling.

According to some examples, the method includes determining an initial pose of the mobile device camera relative to a floor plane at block 2910.

According to some examples, the method includes generating a local point cloud including a grid of points from inside of the static objects and keypoints from the static scene at block 2912. According to some examples, the method includes comparing each static object in the static scene against the global database to find a visual match using the reidentification fingerprints at block 2914. This may be performed as described with respect to object identification with fingerprints 2800 of FIG. 28A and FIG. 28B. According to some examples, the method includes determining matches between the local static point cloud and the global point cloud using matching static objects and matching keypoints from the static scene at block 2916.

According to some examples, the method includes determining a current pose of the mobile device camera relative to a global map at block 2918. The global map may be a previously saved map of the environment to be tidied. According to some examples, the method includes merging the local static point cloud into the global point cloud and remove duplicates at block 2920. According to some examples, the method includes updating the current pose of the mobile device camera on the global map at block 2922.

According to some examples, the method includes saving the location of each static object on the global map and a timestamp to the global database at block 2924. In one embodiment, new reidentification fingerprints for the static objects may also be saved to the global database. The new reidentification fingerprints to be saved may be filtered to reduce the number of fingerprints saved for an object.

According to some examples, the method includes updating the global database with an expected location of each static object on the global map based on past location records at block 2926. According to some examples, if past location records are inconsistent for a static object, indicating that the static object has been moving, the method includes reclassifying the static object as a movable object at block 2928.

Reclassifying the static object as a movable object may include generating an inconsistent static object location alert. The inconsistent static object location alert may be provided to the robotic control system of a tidying robot, such as that illustrated in FIG. 11, as feedback to refine, simplify, streamline, or reduce the amount of data transferred to instruct the tidying robot to perform at least one robot operation. The static object may then be reclassified as a movable object by updating the object's movability attribute in the global database. The global map may also be updated to reflect the reclassified movable object. Operational task rules may be prioritized based on the movability attributes and/or the updated movability attributes, thereby optimizing the navigation of the tidying robot or increasing the efficiency in power utilization by the tidying robot.

According to some examples, the method includes instructing a tidying robot, using a robot instruction database, to perform at least one task at block 2930. Tasks may include sorting objects on the floor, tidying specific objects, tidying a cluster of objects, pushing objects to the side of a room, executing a sweep pattern, and executing a vacuum pattern.

In one embodiment, the robotic control system may perform steps to identify moveable objects or tidyable objects after it has identified static objects. The static object identification routine 2900 may in one embodiment be followed by the movable object identification routine 3000 or the tidyable object identification routine 3100 described below with respect to FIG. 30 and FIG. 31, respectively. Either of these processes may continue on to the performance of the other, or to the instruction of the tidying robot at block 2930.

Figure 30:
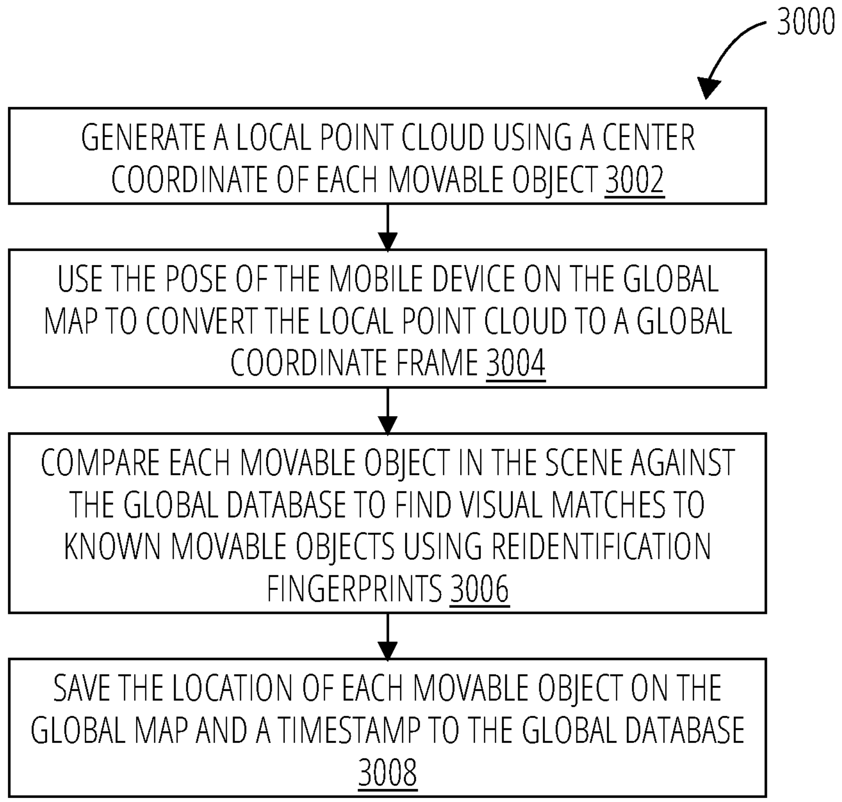
FIG. 30 illustrates a movable object identification routine 3000 in accordance with one embodiment.

FIG. 30 illustrates a movable object identification routine 3000 in accordance with one embodiment. Although the example movable object identification routine 3000 depicts a particular sequence of operations, the sequence may be altered without departing from the scope of the present disclosure. For example, some of the operations depicted may be performed in parallel or in a different sequence that does not materially affect the function of the movable object identification routine 3000. In other examples, different components of an example device or system that implements the movable object identification routine 3000 may perform functions at substantially the same time or in a specific sequence.

According to some examples, the method includes generating a local point cloud using a center coordinate of each movable object at block 3002. According to some examples, the method includes using the pose of the mobile device (either a user's mobile computing device or the tidying robot) on the global map to convert the local point cloud to a global coordinate frame at block 3004. According to some examples, the method includes comparing each movable object in the scene against the global database to find visual matches to known movable objects using reidentification fingerprints at block 3006.

According to some examples, the method includes saving the location of each movable object on the global map and a timestamp to the global database at block 3008. In one embodiment, new reidentification fingerprints for the movable objects may also be saved to the global database. The new reidentification fingerprints to be saved may be filtered to reduce the number of fingerprints saved for an object.

Figure 31:
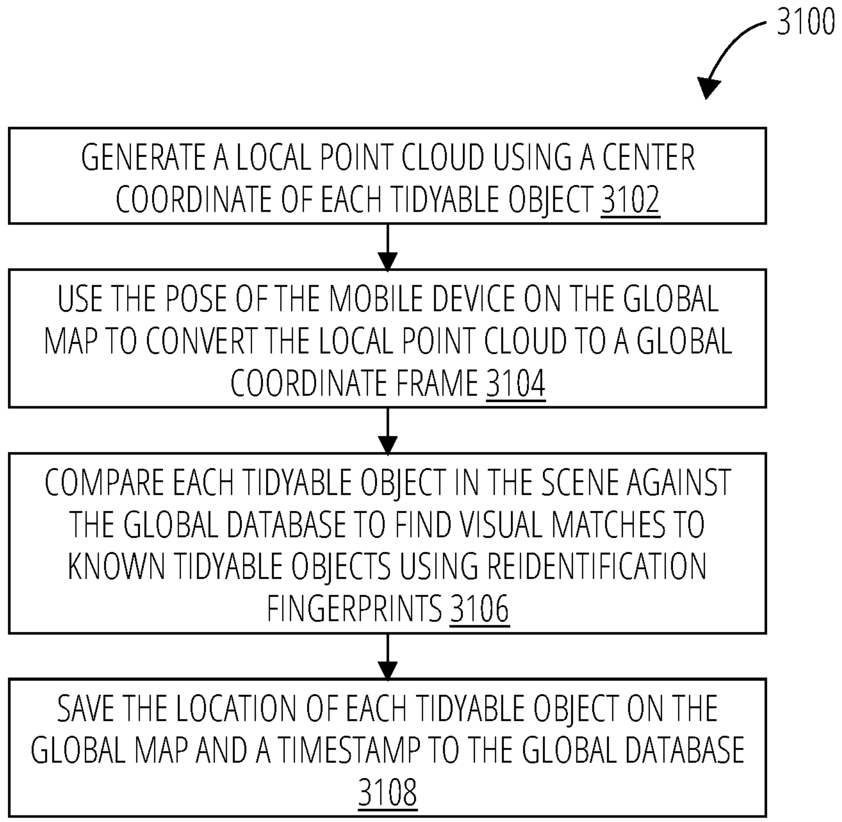
FIG. 31 illustrates a tidyable object identification routine 3100 in accordance with one embodiment.

FIG. 31 illustrates a tidyable object identification routine 3100 in accordance with one embodiment. Although the example tidyable object identification routine 3100 depicts a particular sequence of operations, the sequence may be altered without departing from the scope of the present disclosure. For example, some of the operations depicted may be performed in parallel or in a different sequence that does not materially affect the function of the tidyable object identification routine 3100. In other examples, different components of an example device or system that implements the tidyable object identification routine 3100 may perform functions at substantially the same time or in a specific sequence.

According to some examples, the method includes generating a local point cloud using a center coordinate of each tidyable object at block 3102. According to some examples, the method includes using the pose of the mobile device (either a user's mobile computing device or the tidying robot) on the global map to convert the local point cloud to a global coordinate frame at block 3104. According to some examples, the method includes comparing each tidyable object in the scene against the global database to find visual matches to known tidyable objects using reidentification fingerprints at block 3106.

According to some examples, the method includes saving the location of each tidyable object on the global map and a timestamp to the global database at block 3108. In one embodiment, new reidentification fingerprints for the tidyable objects may also be saved to the global database. The new reidentification fingerprints to be saved may be filtered to reduce the number of fingerprints saved for an object. In one embodiment, the user may next use an AR user interface to identify home locations for tidyable objects. These home locations may also be saved in the global database.

Figure 32:
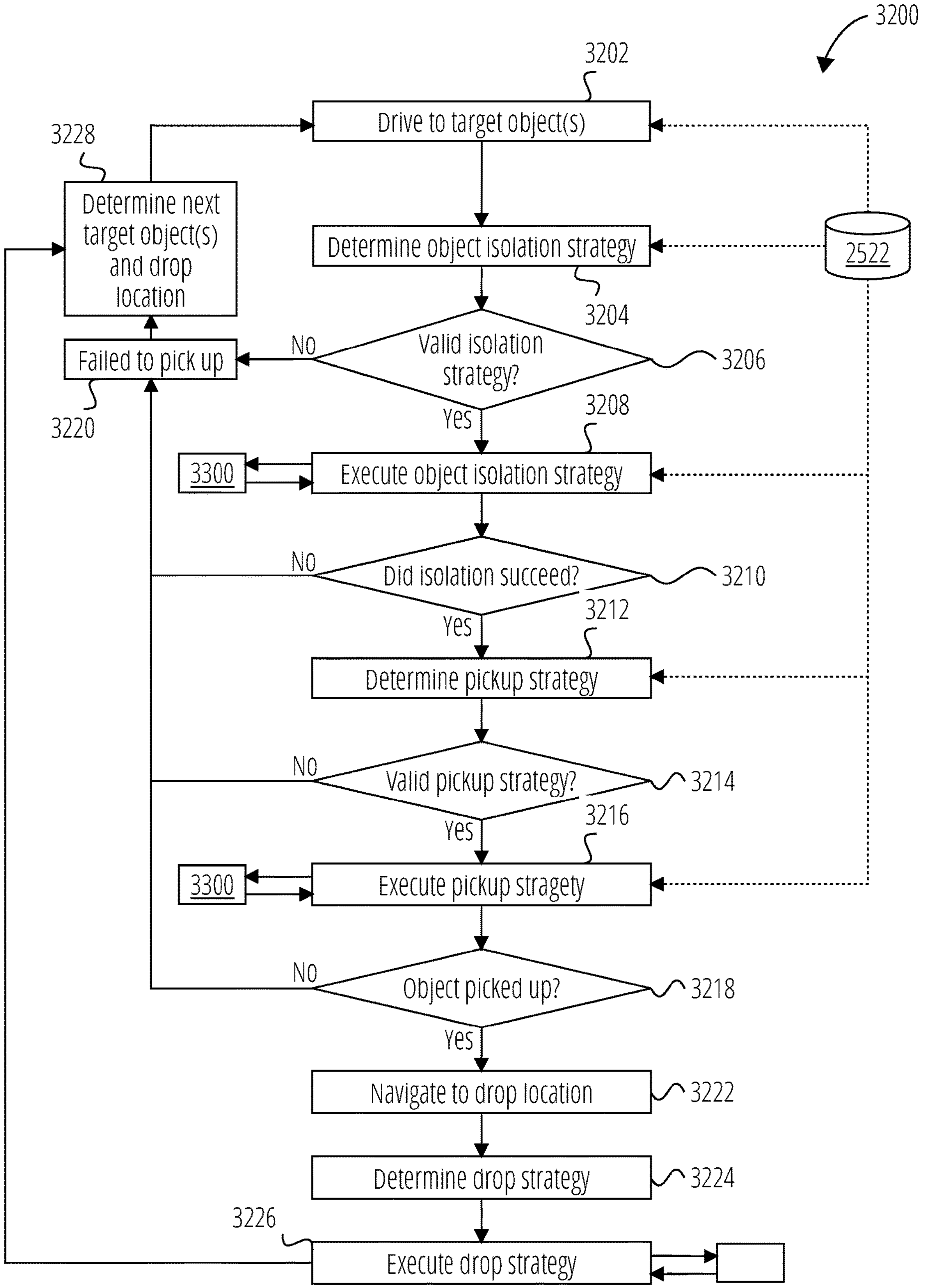
FIG. 32 illustrates a main navigation, collection, and deposition process 3200 in accordance with one embodiment.

FIG. 32 illustrates a main navigation, collection, and deposition process 3200 in accordance with one embodiment. According to some examples, the method includes driving to target object(s) at block 3202. For example, the tidying robot 600 such as that introduced with respect to FIG. 6A may drive to target object(s) using a local map or global map to navigate to a position near the target object(s), relying upon observations, current robot state, current object state, and sensor data 2522 determined as illustrated in FIG. 25.

According to some examples, the method includes determining an object isolation strategy at block 3204. For example, the robotic control system 1100 illustrated in FIG. 11 may determine an object isolation strategy in order to separate the target object(s) from other objects in the environment based on the position of the object(s) in the environment. The object isolation strategy may be determined using a machine learning model or a rules based approach, relying upon observations, current robot state, current object state, and sensor data 2522 determined as illustrated in FIG. 25. In some cases, object isolation may not be needed, and related blocks may be skipped. For example, in an area containing few items to be picked up and moved, or where such items are not in a proximity to each other, furniture, walls, or other obstacles, that would lead to interference in picking up target objects, object isolation may not be needed.

In some cases, a valid isolation strategy may not exist. For example, the robotic control system 1100 illustrated in FIG. 11 may be unable to determine a valid isolation strategy. If it is determined at decision block 3206 that there is no valid isolation strategy, the target object(s) may be marked as failed to pick up at block 3220. The main navigation, collection, and deposition process 3200 may then advance to block 3228, where the next target object(s) are determined.

If there is a valid isolation strategy determined at decision block 3206, the tidying robot 600 may execute the object isolation strategy to separate the target object(s) from other objects at block 3208. The isolation strategy may follow strategy steps for isolation strategy, pickup strategy, and drop strategy 3300 illustrated in FIG. 33. The isolation strategy may be a reinforcement learning based strategy using rewards and penalties in addition to observations, current robot state, current object state, and sensor data 2522, or a rules based strategy relying upon observations, current robot state, current object state, and sensor data 2522 determined as illustrated in FIG. 25. Reinforcement learning based strategies relying on rewards and penalties are described in greater detail with reference to FIG. 33.

Rules based strategies may use conditional logic to determine the next logic based on observations, current robot state, current object state, and sensor data 2522 such as are developed in FIG. 25. Each rules based strategy may have a list of available actions it may consider. In one embodiment, a movement collision avoidance system may be used to determine the range of motion involved with each action. Rules based strategies for object isolation may include:

- Navigating robot to a position facing the target object(s) to be isolated, but far enough away to open pusher pad arms and pusher pads and lower the scoop
- Opening the pusher pad arms and pusher pads, lowering the pusher pad arms and pusher pads, and lowering the scoop
- Turning robot slightly in-place so that target object(s) are centered in a front view
- Opening pusher pad arms and pusher pads to be slightly wider than target object(s)
- Driving forward slowly until the end of the pusher pad arms and pusher pads is positioned past the target object(s)
- Slightly closing the pusher pad arms and pusher pads into a V-shape so that the pusher pad arms and pusher pads surround the target object(s)
- Driving backwards 100 centimeters, moving the target object(s) into an open space According to some examples, the method includes determining whether or not the isolation succeeded at decision block 3210. For example, the robotic control system 1100 illustrated in FIG. 11 may determine whether or not the target object(s) were successfully isolated. If the isolation strategy does not succeed, the target object(s) may be marked as failed to pickup at block 3220. The main navigation, collection, and deposition process 3200 advances to block 3228, where a next target object is determined. In some embodiments, rather than determining a next target object, a different strategy may be selected for the same target object. For example, if target object(s) are not able to be isolated by the current isolation strategy, a different isolation strategy may be selected and isolation retried.

If the target object(s) were successfully isolated, the method then includes determining a pickup strategy at block 3212. For example, the robotic control system 1100 illustrated in FIG. 11 may determine the pickup strategy. The pickup strategy for the particular target object(s) and location may be determined using a machine learning model or a rules based approach, relying upon observations, current robot state, current object state, and sensor data 2522 determined as illustrated in FIG. 25.

In some cases, a valid pickup strategy may not exist. For example, the robotic control system 1100 illustrated in FIG. 11 may be unable to determine a valid pickup strategy. If it is determined at decision block 3214 that there is no valid pickup strategy, the target object(s) may be marked as failed to pick up at block 3220, as previously noted. The pickup strategy may need to take into account:

- An initial default position for the pusher pad arms and the scoop before starting pickup
- A floor type detection for hard surfaces versus carpet, which may affect pickup strategies
- A final scoop and pusher pad arm position for carrying If there is a valid pickup strategy determined at decision block 3214, the tidying robot 600 such as that introduced with respect to FIG. 6A may execute a pickup strategy at block 3216. The pickup strategy may follow strategy steps for isolation strategy, pickup strategy, and drop strategy 3300 illustrated in FIG. 33. The pickup strategy may be a reinforcement learning based strategy or a rules based strategy, relying upon observations, current robot state, current object state, and sensor data 2522 determined as illustrated in FIG. 25. Rules based strategies for object pickup may include:

- Navigating the robot to a position facing the target object(s), but far enough away to open the pusher pad arms and pusher pads and lower the scoop
- Opening the pusher pad arms and pusher pads, lowering the pusher pad arms and pusher pads, and lowering the scoop
- Turning the robot slightly in-place so that the target object(s) are centered in the front view

- Driving forward until the target object(s) are in a "pickup zone" against the edge of the scoop
- Determining a center location of target object(s) against the scoop-on the right, left or center
  - If on the right, closing the right pusher pad arm and pusher pad first with the left pusher pad arm and pusher pad closing behind
  - Otherwise, closing the left pusher pad arm and pusher pad first with the right pusher pad arm and pusher pad closing behind
- Determining if target object(s) were successfully pushed into the scoop
  - If yes, then pickup was successful
  - If no, lift pusher pad arms and pusher pads and then try again at an appropriate part of the strategy.

According to some examples, the method includes determining whether or not the target object(s) were picked up at decision block 3218. For example, the robotic control system 1100 illustrated in FIG. 11 may determine whether or not the target object(s) were picked up. Pickup success may be evaluated using:

- Object detection within the area of the scoop and pusher pad arms (i.e., the containment area as previously illustrated) to determine if the object is within the scoop/pusher pad arms/containment area
- Force feedback from actuator force feedback sensors indicating that the object is retained by the pusher pad arms
- Tracking motion of object(s) during pickup into area of scoop and retaining the state of those object(s) in memory (memory is often relied upon as objects may no longer be visible when the scoop is in its carrying position)
- Detecting an increased weight of the scoop during lifting indicating the object is in the scoop
- Utilizing a classification model for whether an object is in the scoop
- Using force feedback, increased weight, and/or a dedicated camera to re-check that an object is in the scoop while the robot is in motion If the pickup strategy fails, the target object(s) may be marked as failed to pick up at block 3220, as previously described. If the target object(s) were successfully picked up, the method includes navigating to drop location at block 3222. For example, the tidying robot 600 such as that introduced with respect to FIG. 6A may navigate to a predetermined drop location. The drop location may be a container or a designated area of the ground or floor. Navigation may be controlled by a machine learning model or a rules based approach.

According to some examples, the method includes determining a drop strategy at block 3224. For example, the robotic control system 1100 illustrated in FIG. 11 may determine a drop strategy. The drop strategy may need to take into account the carrying position determined for the pickup strategy. The drop strategy may be determined using a machine learning model or a rules based approach. Rules based strategies for object drop may include:

- Navigate the robot to a position 100 centimeters away from the side of a bin
- Turn the robot in place to align it facing the bin
- Drive toward the bin maintaining an alignment centered on the side of the bin
- Stop three centimeters from the side of the bin
- Verify that the robot is correctly positioned against the side of the bin
  - If yes, lift the scoop up and back to drop target object(s) into the bin
  - If no, drive away from bin and restart the process Object drop strategies may involve navigating with a rear camera if attempting a back drop, or with the front camera if attempting a forward drop.

According to some examples, the method includes executing the drop strategy at block 3226. For example, the tidying robot 600 such as that introduced with respect to FIG. 6A may execute the drop strategy. The drop strategy may follow strategy steps for isolation strategy, pickup strategy, and drop strategy 3300 illustrated in FIG. 33. The drop strategy may be a reinforcement learning based strategy or a rules based strategy. Once the drop strategy has been executed at block 3226, the method may proceed to determining the next target object(s) at block 3228. For example, the robotic control system 1100 illustrated in FIG. 11 may determine next target object(s). Once new target object(s) have been determined, the process may be repeated for the new target object(s).

Strategies such as the isolation strategy, pickup strategy, and drop strategy referenced above may be simple strategies, or may incorporate rewards and collision avoidance elements. These strategies may follow general approaches such as the strategy steps for isolation strategy, pickup strategy, and drop strategy 3300 illustrated in FIG. 33.

In some embodiments, object isolation strategies may include:

- Using pusher pad arms and pusher pads on the floor in a V-shape to surround object(s) and backing up
- Precisely grasping the object(s) and backing up with pusher pad arms and pusher pads in a V-shape
- Loosely rolling a large object away with pusher pad arms and pusher pads elevated
- Spreading out dense clutter by loosely grabbing a pile and backing up
- Placing a single pusher pad arm/pusher pad on the floor between target object(s) and clutter, then turning
- Putting small toys in the scoop, then dropping them to separate them
- Using a single pusher pad arm/pusher pad to move object(s) away from a wall In some embodiments, pickup strategies may include:

- Closing the pusher pad arms/pusher pads on the floor to pick up a simple object
- Picking up piles of small objects like small plastic building blocks by closing pusher pad arms/pusher pads on the ground
- Picking up small, rollable objects like balls by batting them lightly on their tops with pusher pad arms/pusher pads, thus rolling them into the scoop
- Picking up deformable objects like clothing using pusher pad arms/pusher pads to repeatedly compress the object(s) into the scoop
- Grabbing an oversized, soft object like a large stuffed animal by grabbing and compressing it with the pusher pad arms/pusher pads
- Grabbing a large ball by rolling it and holding it against the scoop with raised pusher pad arms/pusher pads
- Picking up flat objects like puzzle pieces by passing the pusher pads over them sideways to cause instability
- Grasping books and other large flat objects
- Picking up clothes with pusher pad arms/pusher pads, lifting them above the scoop, and then dropping them into the scoop Rolling balls by starting a first pusher pad arm movement and immediately starting a second pusher pad arm movement In some embodiments, drop strategies may include:

Back dropping into a bin

Front dropping into a bin

Forward releasing onto the floor

Forward releasing against a wall

Stacking books or other flat objects

Figure 33:
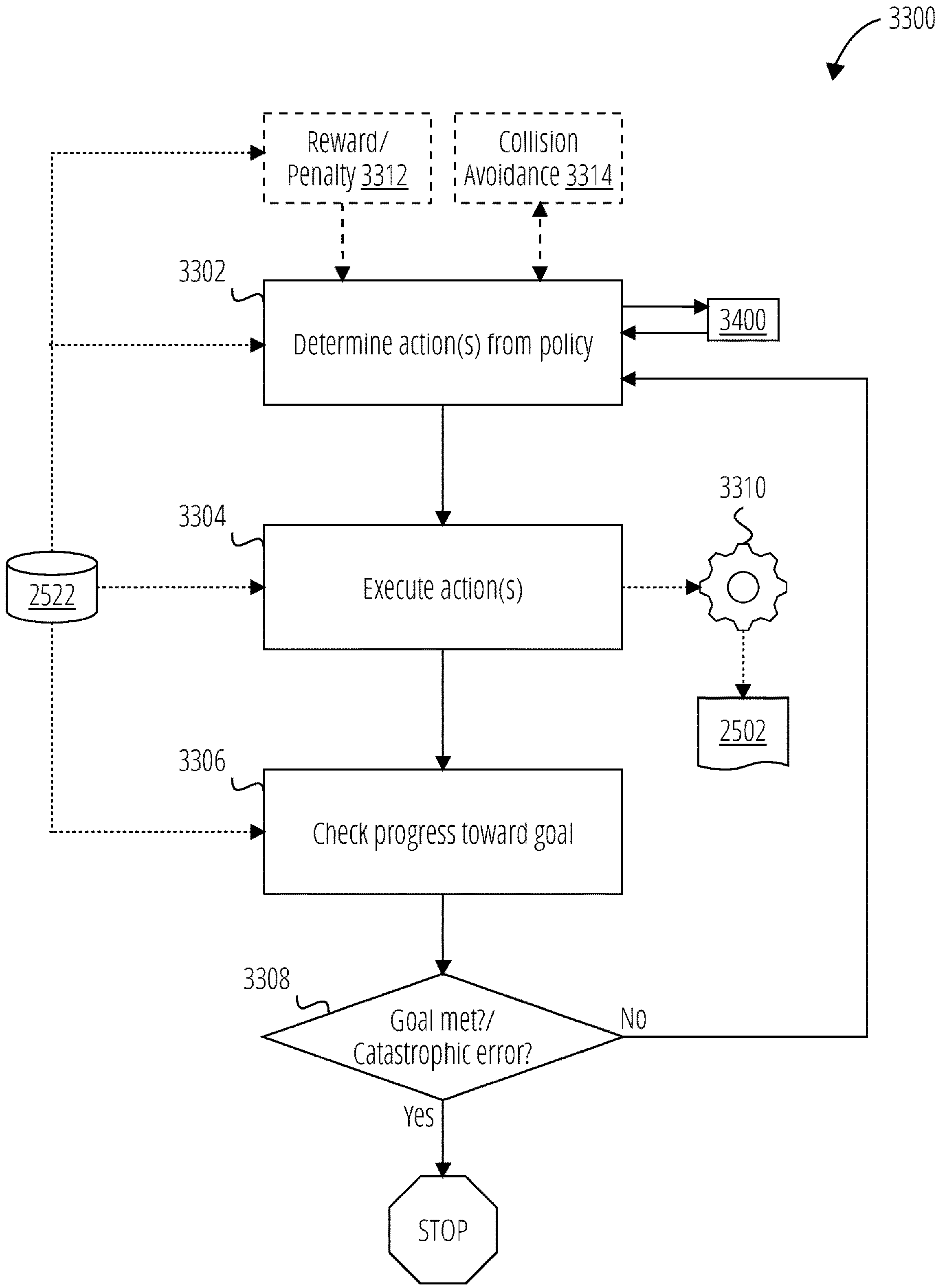
FIG. 33 illustrates strategy steps for isolation strategy, pickup strategy, and drop strategy 3300 in accordance with one embodiment.

Directly dropping a large object using pusher pad arms/pusher pads instead of relying on the scoop FIG. 33 illustrates strategy steps for isolation strategy, pickup strategy, and drop strategy 3300 in accordance with one embodiment. According to some examples, the method includes determining action(s) from a policy at block 3302. For example, the robotic control system 1100 illustrated in FIG. 11 may determine action(s) from the policy. The next action(s) may be based on the policy along with observations, current robot state, current object state, and sensor data 2522. The determination may be made through the process for determining an action from a policy 3400 illustrated in FIG. 34.

In one embodiment, strategies may incorporate a reward or penalty 3312 in determining action(s) from a policy at block 3302. These rewards or penalties 3312 may primarily be used for training the reinforcement learning model and, in some embodiments, may not apply to ongoing operation of the robot. Training the reinforcement learning model may be performed using simulations or by recording the model input/output/rewards/penalties during robot operation. Recorded data may be used to train reinforcement learning models to choose actions that maximize rewards and minimize penalties. In some embodiments, rewards or penalties 3312 for object pickup using reinforcement learning may include:

Small penalty added every second

Reward when target object(s) first touches edge of scoop

Reward when target object(s) pushed fully into scoop

Penalty when target object(s) lost from scoop

Penalty for collision with obstacle or wall (exceeding force feedback maximum)

Penalty for picking up non-target object

Penalty if robot gets stuck or drives over object

In some embodiments, rewards or penalties 3312 for object isolation (e.g., moving target object(s) away from a wall to the right) using reinforcement learning may include:

Small penalty added every second

Reward when right pusher pad arm is in-between target object(s) and wall

Reward when target object(s) distance from wall exceeds ten centimeters

Penalty for incorrectly colliding with target object(s)

Penalty for collision with obstacle or wall (exceeding force feedback maximum)

Penalty if robot gets stuck or drives over object

In some embodiments, rewards or penalties 3312 for object dropping using reinforcement learning may include:

Small penalty added every second

Reward when robot correctly docks against bin

Reward when target object(s) is successfully dropped into bin

Penalty for collision that moves bin

Penalty for collision with obstacle or wall (exceeding force feedback maximum)

Penalty if robot gets stuck or drives over object

In at least one embodiment, techniques described herein may use a reinforcement learning approach where the problem is modeled as a Markov decision process (MDP) represented as a tuple (S, O, A, P, r, γ), where S is the set of states in the environment, O is the set of observations, A is the set of actions, P: $S \times A \times S \rightarrow \mathbb{R}$ is the state transition probability function, r: $S \times A \rightarrow \mathbb{R}$ is the reward function, and γ is a discount factor.

In at least one embodiment, the goal of training may be to learn a deterministic policy π: O→A such that taking action $a_t = \pi(o_t)$ at time t maximizes the sum of discounted future rewards from state $s_t$:

$$R_t = \sum_{i=t}^{\infty} \gamma^{i-t} r(s_i, a_i)$$

In at least one embodiment, after taking action $a_t$, the environment transitions from state $s_t$, to state $s_{t+1}$ by sampling from P. In at least one embodiment, the quality of taking action $a_t$ in state $s_t$ is measured by $Q(s_t, a_t) = \mathbb{E}[R_t | s_t, a_t]$, known as the Q-function.

In one embodiment, data from a movement collision avoidance system 3314 may be used in determining action(s) from a policy at block 3302. Each strategy may have an associated list of available actions which it may consider. A strategy may use the movement collision avoidance system to determine the range of motion for each action involved in executing the strategy. For example, the movement collision avoidance system may be used to see if the scoop may be lowered to the ground without hitting the pusher pad arms or pusher pads (if they are closed under the scoop), an obstacle such as a nearby wall, or an object (like a ball) that may have rolled under the scoop.

According to some examples, the method includes executing action(s) at block 3304. For example, the tidying robot 600 such as that introduced with respect to FIG. 6A may execute the action(s) determined from block 3302. The actions may be based on the observations, current robot state, current object state, and sensor data 2522. the actions may be performed through motion of the robot motors and other actuators 3310 of the tidying robot 600. The real world environment 2502 may be affected by the motion of the tidying robot 600. The changes in the environment 2502 may be detected as described with respect to FIG. 25.

According to some examples, the method includes checking progress toward a goal at block 3306. For example, the robotic control system 1100 illustrated in FIG. 11 may check the progress of the tidying robot 600 toward the goal. If this progress check determines that the goal of the strategy has been met, or that a catastrophic error has been encountered at decision block 3308, execution of the strategy will be stopped. If the goal has not been met and no catastrophic error has occurred, the strategy may return to block 3302.

Figure 34:
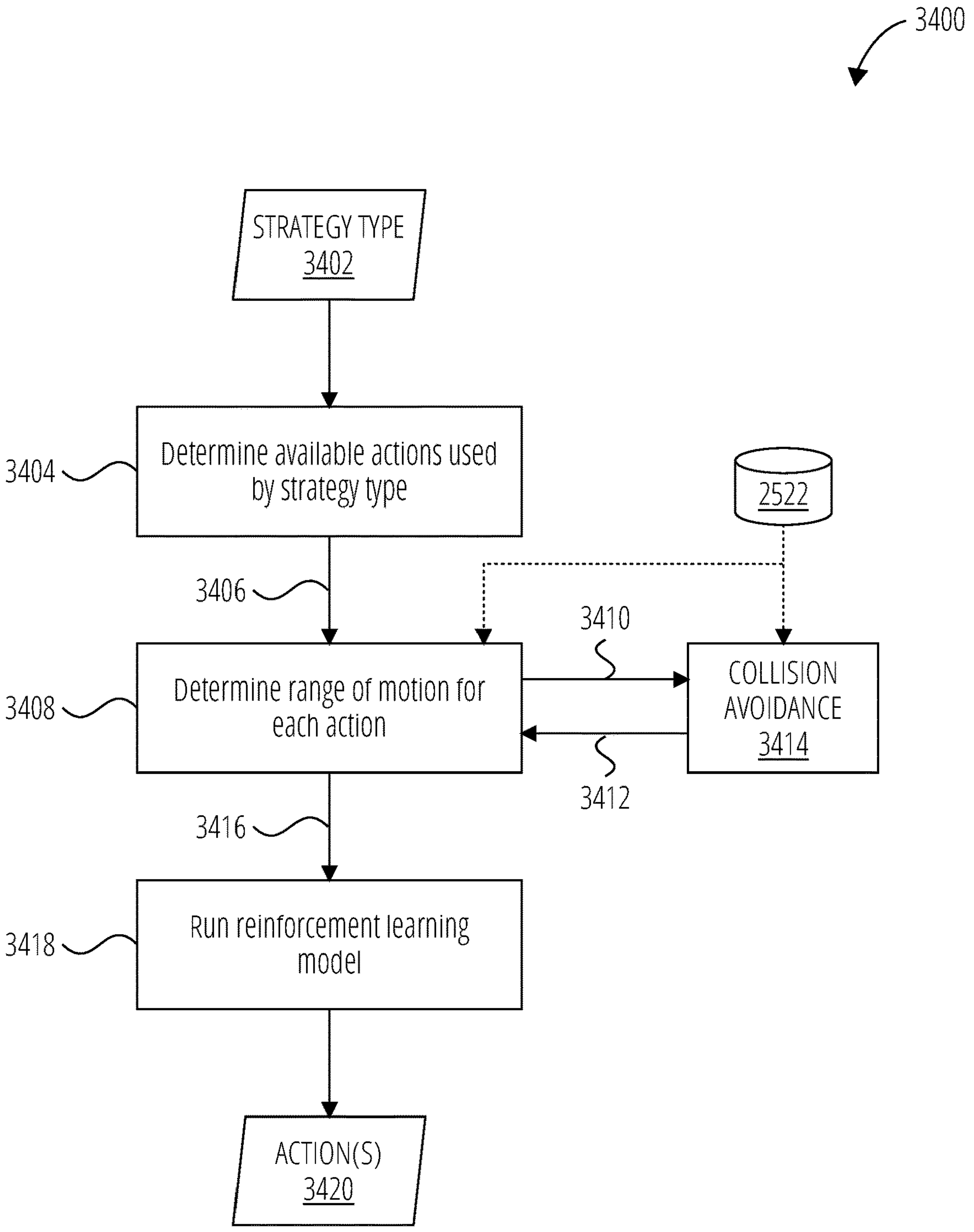
FIG. 34 illustrates process for determining an action from a policy 3400 in accordance with one embodiment.

FIG. 34 illustrates process for determining an action from a policy 3400 in accordance with one embodiment. The process for determining an action from a policy 3400 may take into account a strategy type 3402, and may, at block 3404 determined the available actions to be used based on the strategy type 3402. Reinforcement learning algorithms or rules based algorithms may take advantage of both simple actions and pre-defined composite actions. Examples of simple actions controlling individual actuators may include:

Moving the left pusher pad arm to a new position (rotating up or down)

Moving the left pusher pad wrist to a new position (rotating left or right)

Moving the right pusher pad arm to a new position (rotating up or down)
Moving the right pusher pad wrist to a new position (rotating left or right)
Lifting the scoop to a new position (rotating up or down)
Changing the scoop angle (with a second motor or actuator for front dropping)
Driving a left wheel
Driving a right wheel
Examples of pre-defined composite actions may include:
Driving the robot following a path to a position/waypoint
Turning the robot in place left or right
Centering the robot with respect to object(s)
Aligning pusher pad arms with objects' top/bottom/middle
Driving forward until an object is against the edge of the scoop
Closing both pusher pad arms, pushing object(s) with a smooth motion
Lifting the scoop and pusher pad arms together while grasping object(s)
Closing both pusher pad arms, pushing object(s) with a quick tap and slight release
Setting the scoop lightly against the floor/carpet
Pushing the scoop down against the floor/into the carpet
Closing the pusher pad arms until resistance is encountered/pressure is applied and hold that position
Closing the pusher pad arms with vibration and left/right turning to create instability and slight bouncing of flat objects over scoop edge At block 3408, the process for determining an action from a policy 3400 may take the list of available actions 3406 determined at block 3404, and may determine a range of motion 3412 for each action. The range of motion 3412 may be determined based on the observations, current robot state, current object state, and sensor data 2522 available to the robotic control system 1100. Action types 3410 may also be indicated to the movement collision avoidance system 3414, and the movement collision avoidance system 3414 may determine the range of motion 3412.

Block 3408 of process for determining an action from a policy 3400 may determine an observations list 3416 based on the ranges of motion 3412 determined. An example observations list 3416 may include:
Detected and categorized objects in the environment
Global or local environment map
State 1: Left arm position 20 degrees turned in
State 2: Right arm position 150 degrees turned in
State 3: Target object 15 centimeters from scoop edge
State 4: Target object 5 degrees right of center
Action 1 max range: Drive forward 1 centimeter max
Action 2 max range: Drive backward 10 centimeters max
Action 3 max range: Open left arm 70 degrees max
Action 4 max range: Open right arm 90 degrees max
Action 5 max range: Close left arm 45 degrees max
Action 6 max range: Close right arm 0 degrees max
Action 7 max range: Turn left 45 degrees max
Action 8 max range: Turn right 45 degrees max At block 3418, a reinforcement learning model may be run based on the observations list 3416. The reinforcement learning model may return action(s) 3420 appropriate for the strategy the tidying robot 600 is attempting to complete based on the policy involved.

Figure 35:
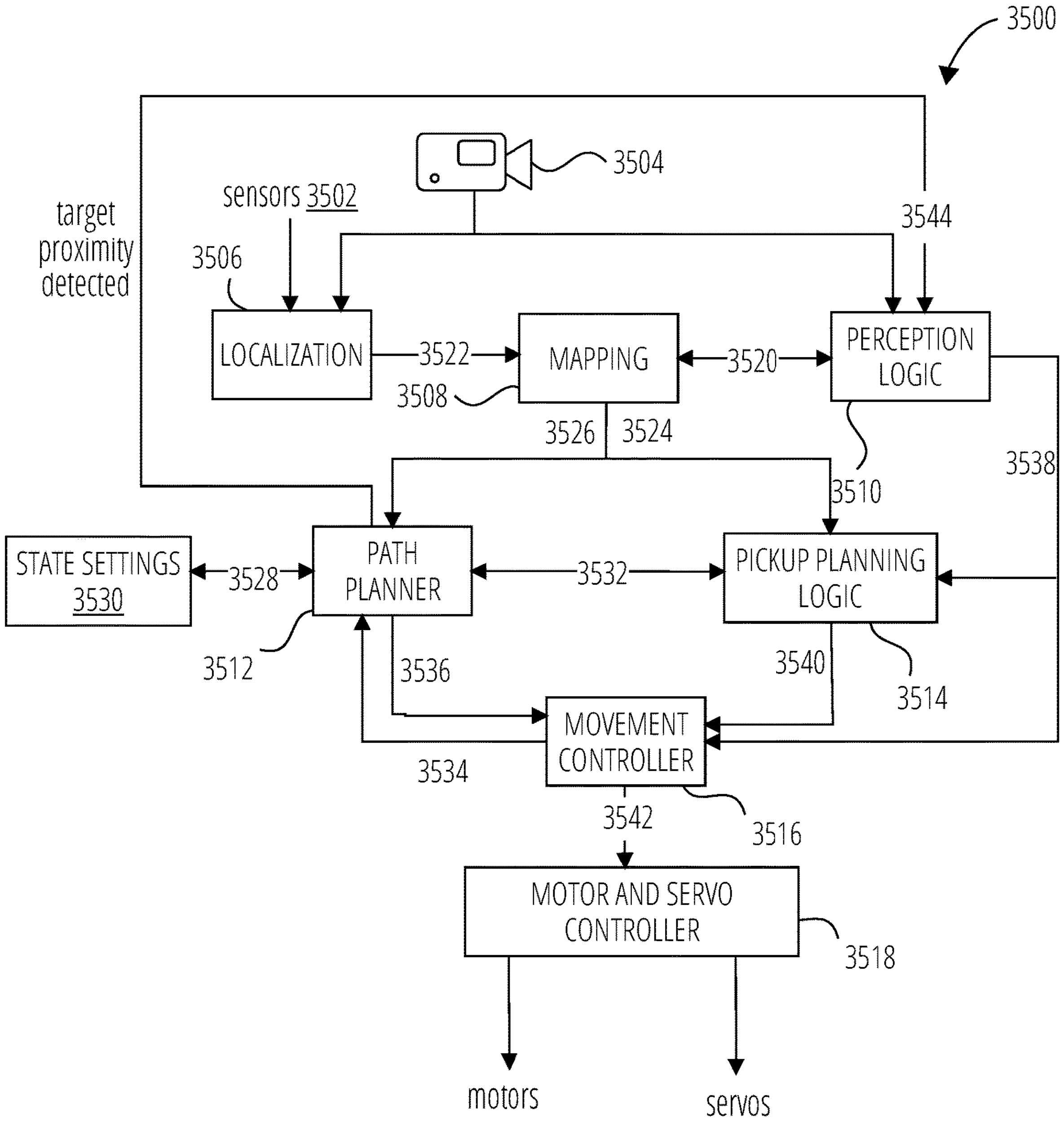
FIG. 35 depicts a robotics system 3500 in accordance with one embodiment.

FIG. 35 depicts a robotics system 3500 in one embodiment. The robotics system 3500 receives inputs from one or more sensors 3502 and one or more cameras 3504 and provides these inputs for processing by localization logic 3506, mapping logic 3508, and perception logic 3510. Outputs of the processing logic are provided to the robotics system 3500 path planner 3512, pick-up planner 3514, and motion controller 3516, which in turn drives the system's motor and servo controller 3518.

The cameras may be disposed in a front-facing stereo arrangement, and may include a rear-facing camera or cameras as well. Alternatively, a single front-facing camera may be utilized, or a single front-facing along with a single rear-facing camera. Other camera arrangements (e.g., one or more side or oblique-facing cameras) may also be utilized in some cases.

One or more of the localization logic 3506, mapping logic 3508, and perception logic 3510 may be located and/or executed on a mobile robot, or may be executed in a computing device that communicates wirelessly with the robot, such as a cell phone, laptop computer, tablet computer, or desktop computer. In some embodiments, one or more of the localization logic 3506, mapping logic 3508, and perception logic 3510 may be located and/or executed in the "cloud", i.e., on computer systems coupled to the robot via the Internet or other network.

The perception logic 3510 is engaged by an image segmentation activation 3544 signal, and utilizes any one or more of well-known image segmentation and objection recognition algorithms to detect objects in the field of view of the camera 3504. The perception logic 3510 may also provide calibration and objects 3520 signals for mapping purposes. The localization logic 3506 uses any one or more of well-known algorithms to localize the mobile robot in its environment. The localization logic 3506 outputs a local to global transform 3522 reference frame transformation and the mapping logic 3508 combines this with the calibration and objects 3520 signals to generate an environment map 3524 for the pick-up planner 3514, and object tracking 3526 signals for the path planner 3512.

In addition to the object tracking 3526 signals from the mapping logic 3508, the path planner 3512 also utilizes a current state 3528 of the system from the system state settings 3530, synchronization signals 3532 from the pick-up planner 3514, and movement feedback 3534 from the motion controller 3516. The path planner 3512 transforms these inputs into navigation waypoints 3536 that drive the motion controller 3516. The pick-up planner 3514 transforms local perception with image segmentation 3538 inputs from the perception logic 3510, the 3524 from the mapping logic 3508, and synchronization signals 3532 from the path planner 3512 into manipulation actions 3540 (e.g., of robotic graspers, scoops) to the motion controller 3516. Embodiments of algorithms utilized by the path planner 3512 and pick-up planner 3514 are described in more detail below.

In one embodiment simultaneous localization and mapping (SLAM) algorithms may be utilized to generate the global map and localize the robot on the map simultaneously. A number of SLAM algorithms are known in the art and commercially available.

The motion controller 3516 transforms the navigation waypoints 3536, manipulation actions 3540, and local perception with image segmentation 3538 signals to target movement 3542 signals to the motor and servo controller 3518.

Figure 36:
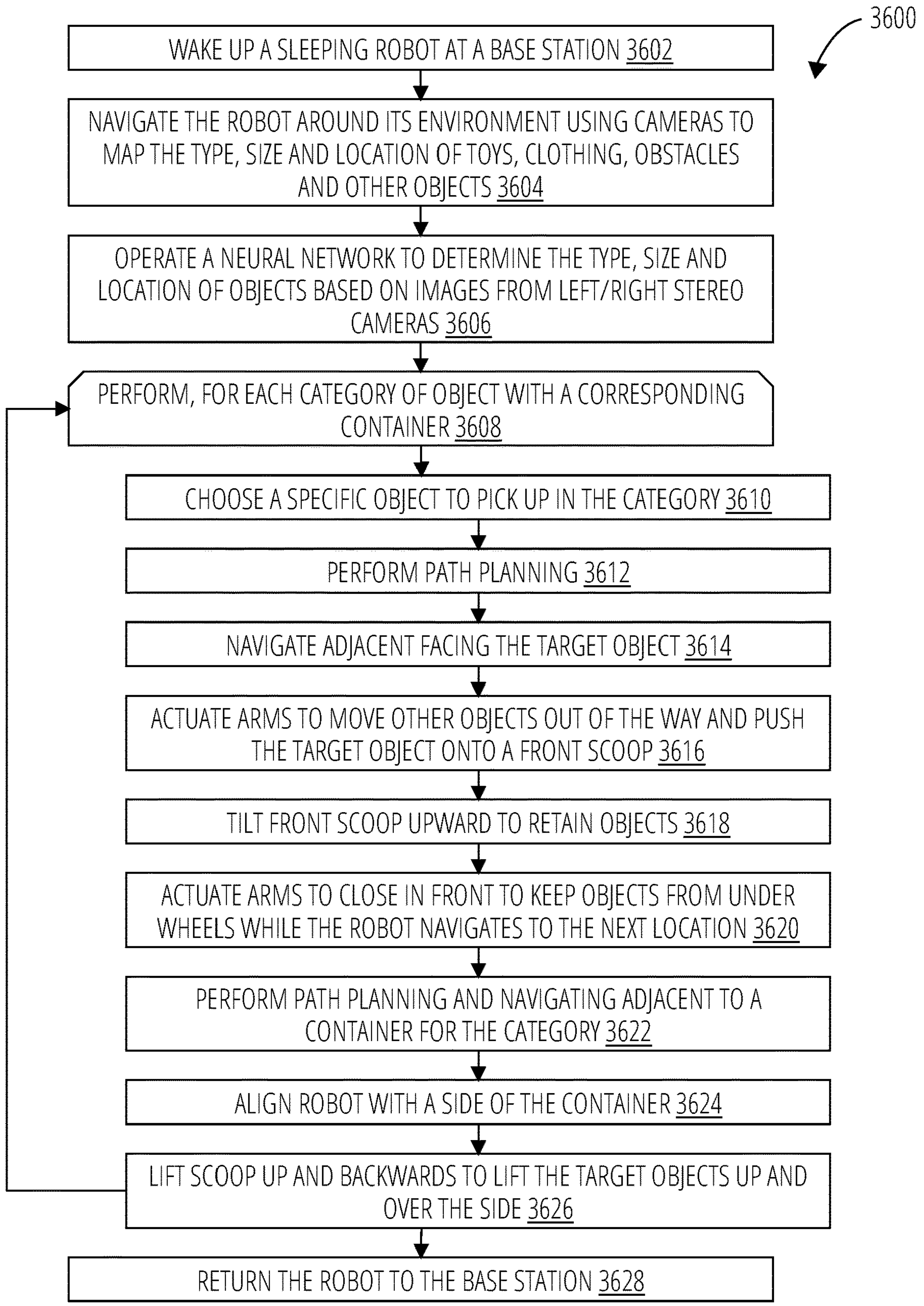
FIG. 36 depicts a robotic process 3600 in accordance with one embodiment.

FIG. 36 depicts a robotic process 3600 in one embodiment. In block 3602, the robotic process 3600 wakes up a sleeping robot at a base station. In block 3604, the robotic process 3600 navigates the robot around its environment using cameras to map the type, size and location of toys, clothing, obstacles and other objects. In block 3606, the robotic process 3600 operates a neural network to determine the type, size and location of objects based on images from left/right stereo cameras. In opening loop block 3608, the robotic process 3600 performs, for each category of object with a corresponding container. In block 3610, the robotic process 3600 chooses a specific object to pick up in the category. In block 3612, the robotic process 3600 performs path planning. In block 3614, the robotic process 3600 navigates adjacent to and facing the target object. In block 3616, the robotic process 3600 actuates arms to move other objects out of the way and push the target object onto a front scoop. In block 3618, the robotic process 3600 tilts the front scoop upward to retain them on the scoop (creating a "bowl" configuration of the scoop). In block 3620, the robotic process 3600 actuates the arms to close in front to keep objects from under the wheels while the robot navigates to the next location. In block 3622, the robotic process 3600 performs path planning and navigating adjacent to a container for the current object category for collection. In block 3624, the robotic process 3600 aligns the robot with a side of the container. In block 3626, the robotic process 3600 lifts the scoop up and backwards to lift the target objects up and over the side of the container. In block 3628, the robotic process 3600 returns the robot to the base station.

In a less sophisticated operating mode, the robot may opportunistically picks up objects in its field of view and drop them into containers, without first creating a global map of the environment. For example, the robot may simply explore until it finds an object to pick up and then explore again until it finds the matching container. This approach may work effectively in single-room environments where there is a limited area to explore.

Figure 37:
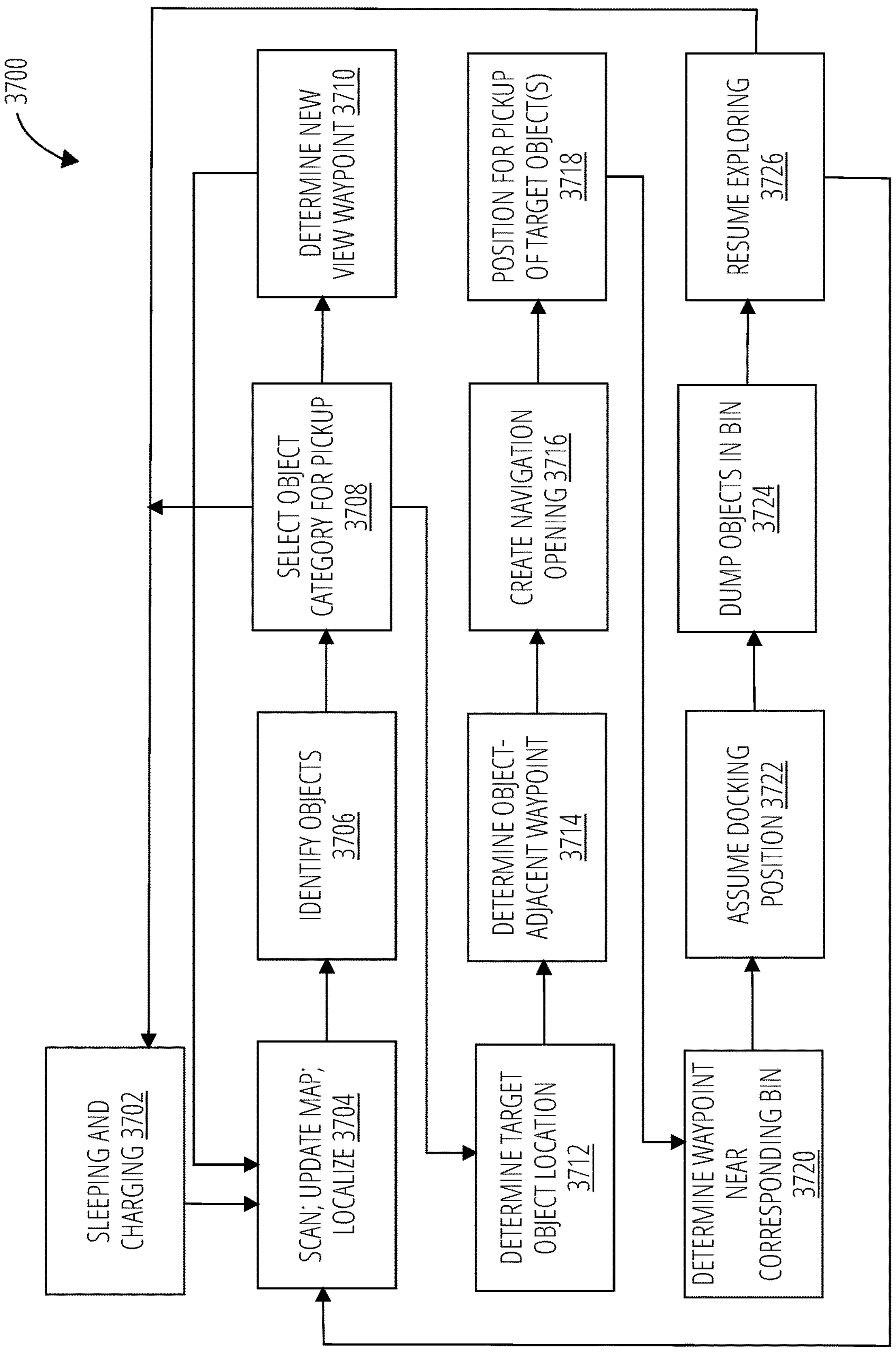
FIG. 37 depicts another robotic process 3700 in accordance with one embodiment.
Figure 38:
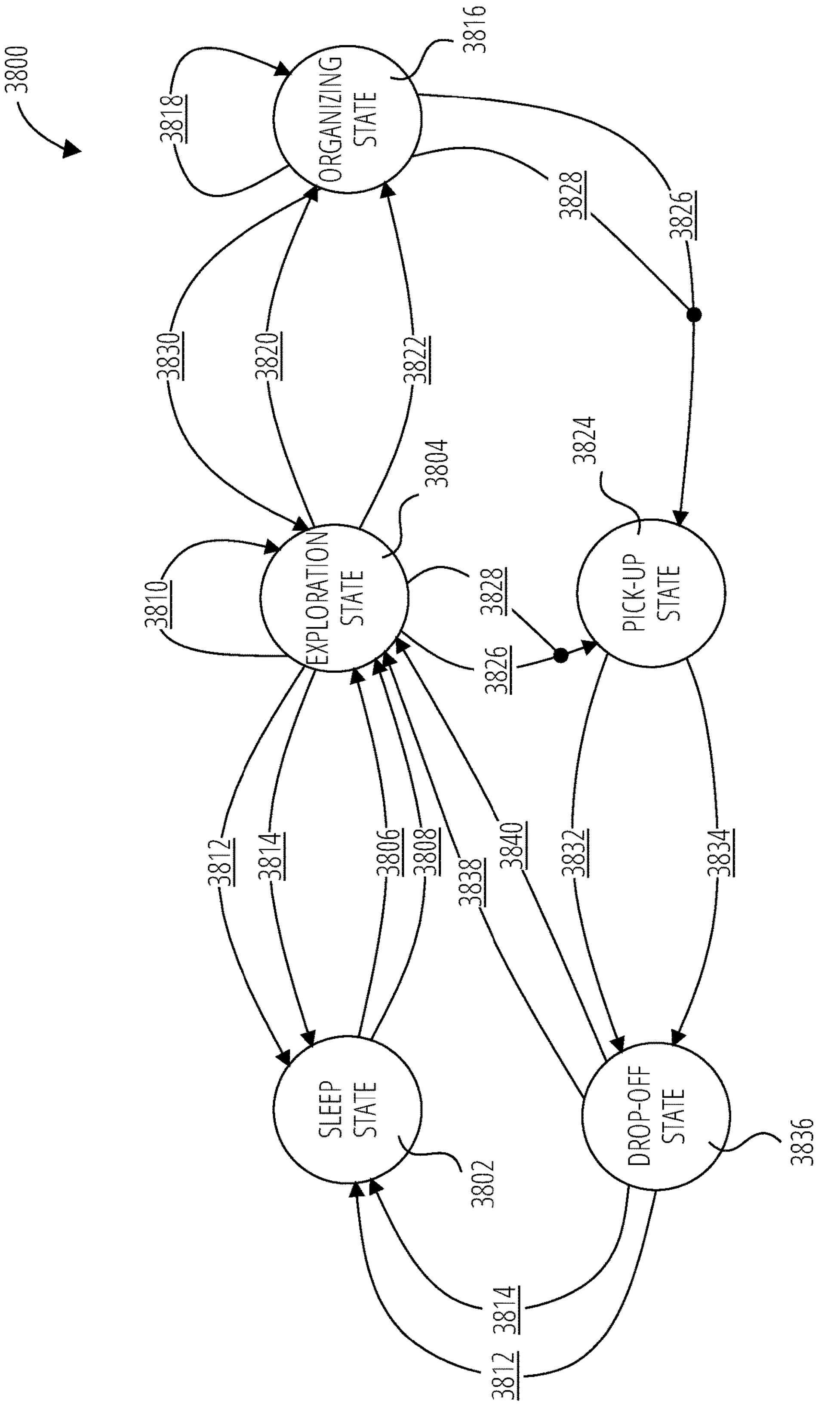
FIG. 38 depicts a state space map 3800 for a robotic system in accordance with one embodiment.

FIG. 37 also depicts a robotic process 3700 in one embodiment, in which the robotic system sequences through an embodiment of a state space map 3800 as depicted in FIG. 38.

The sequence begins with the robot sleeping (sleep state 3802) and charging at the base station (block 3702). The robot is activated, e.g., on a schedule, and enters an exploration mode (environment exploration state 3804, activation action 3806, and schedule start time 3808). In the environment exploration state 3804, the robot scans the environment using cameras (and other sensors) to update its environmental map and localize its own position on the map (block 3704, explore for configured interval 3810). The robot may transition from the environment exploration state 3804 back to the sleep state 3802 on condition that there are no more objects to pick up 3812, or the battery is low 3814.

From the environment exploration state 3804, the robot may transition to the object organization state 3816, in which it operates to move the items on the floor to organize them by category 3818. This transition may be triggered by the robot determining that objects are too close together on the floor 3820, or determining that the path to one or more objects is obstructed 3822. If none of these triggering conditions is satisfied, the robot may transition from the environment exploration state 3804 directly to the object pick-up state 3824 on condition that the environment map comprises at least one drop-off container for a category of objects 3826, and there are unobstructed items for pickup in the category of the container 3828. Likewise the robot may transition from the object organization state 3816 to the object pick-up state 3824 under these latter conditions. The robot may transition back to the environment exploration state 3804 from the object organization state 3816 on condition that no objects are ready for pick-up 3830.

In the environment exploration state 3804 and/or the object organization state 3816, image data from cameras is processed to identify different objects (block 3706). The robot selects a specific object type/category to pick up, determines a next waypoint to navigate to, and determines a target object and location of type to pick up based on the map of environment (block 3708, block 3710, and block 3712).

In the object pick-up state 3824, the robot selects a goal location that is adjacent to the target object(s) (block 3714). It uses a path planning algorithm to navigate itself to that new location while avoiding obstacles. The robot actuates left and right pusher arms to create an opening large enough that the target object may fit through, but not so large that other unwanted objects are collected when the robot drives forwards (block 3716). The robot drives forwards so that the target object is between the left and right pusher arms, and the left and right pusher arms work together to push the target object onto the collection scoop (block 3718).

The robot may continue in the object pick-up state 3824 to identify other target objects of the selected type to pick up based on the map of environment. If other such objects are detected, the robot selects a new goal location that is adjacent to the target object. It uses a path planning algorithm to navigate itself to that new location while avoiding obstacles, while carrying the target object(s) that were previously collected. The robot actuates left and right pusher arms to create an opening large enough that the target object may fit through, but not so large that other unwanted objects are collected when the robot drives forwards. The robot drives forwards so that the next target object(s) are between the left and right pusher arms. Again, the left and right pusher arms work together to push the target object onto the collection scoop.

On condition that all identified objects in category are picked up 3832, or if the scoop is at capacity 3834, the robot transitions to the object drop-off state 3836 and uses the map of the environment to select goal location that is adjacent to bin for the type of objects collected and uses a path planning algorithm to navigate itself to that new location while avoiding obstacles (block 3720). The robot backs up towards the bin into a docking position where back of the robot is aligned with the back of the bin (block 3722). The robot lifts the scoop up and backwards rotating over a rigid arm at the back of the robot (block 3724). This lifts the target objects up above the top of the bin and dumps them into the bin.

From the object drop-off state 3836, the robot may transition back to the environment exploration state 3804 on condition that there are more items to pick up 3838, or it has an incomplete map of the environment 3840. the robot resumes exploring and the process may be repeated (block 3726) for each other type of object in the environment having an associated collection bin.

The robot may alternatively transition from the object drop-off state 3836 to the sleep state 3802 on condition that there are no more objects to pick up 3812 or the battery is low 3814. Once the battery recharges sufficiently, or at the next activation or scheduled pick-up interval, the robot resumes exploring and the process may be repeated (block 3726) for each other type of object in the environment having an associated collection bin.

Figure 39:
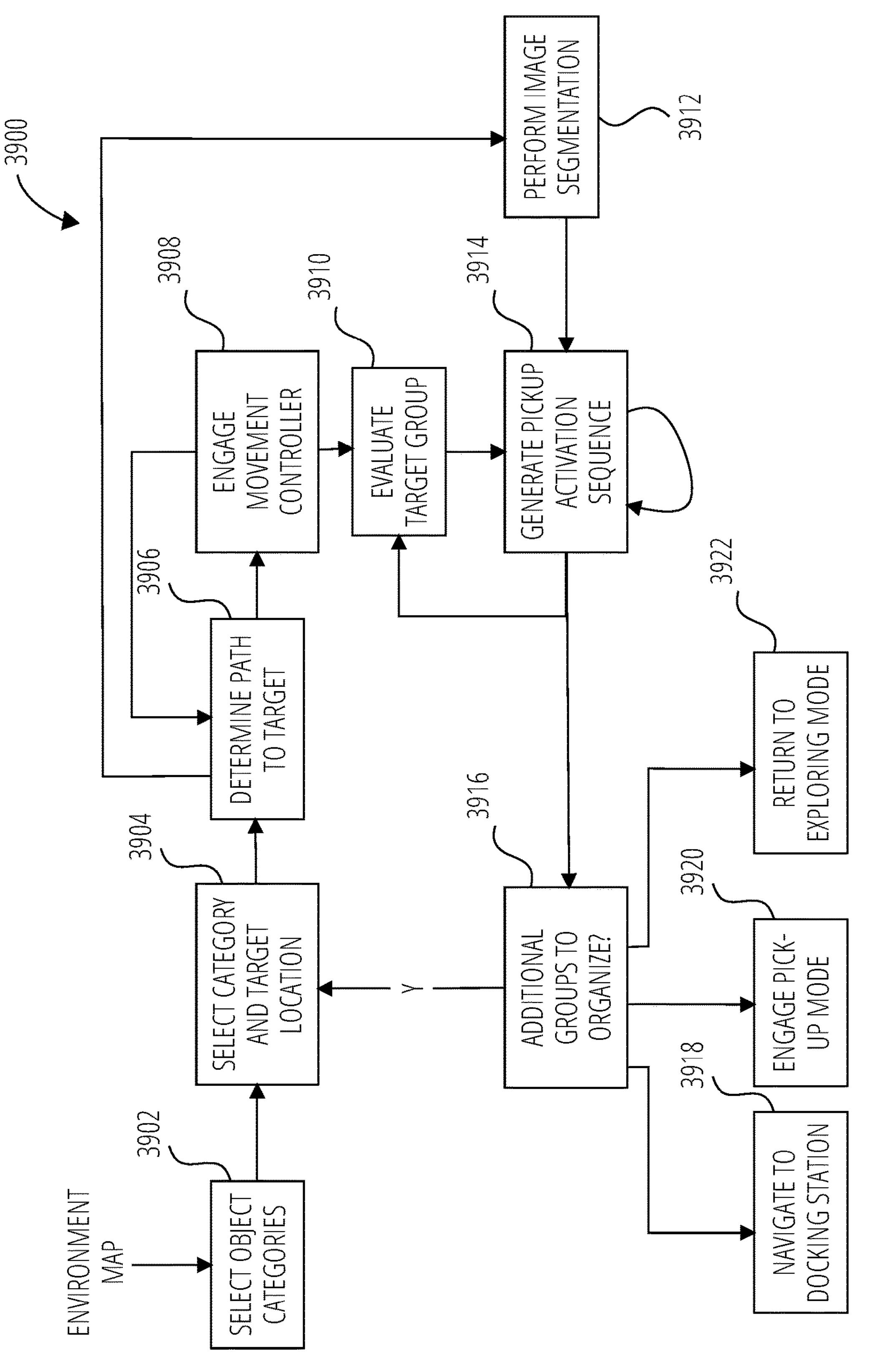
FIG. 39 depicts a robotic control algorithm 3900 for a robotic system in accordance with one embodiment.

FIG. 39 depicts a robotic control algorithm 3900 for a robotic system in one embodiment. The robotic control algorithm 3900 begins by selecting one or more category of objects to organize (block 3902). Within the selected category or categories, a grouping is identified that determines a target category and starting location for the path (block 3904). Any of a number of well-known clustering algorithms may be utilized to identify object groupings within the category or categories.

A path is formed to the starting goal location, the path comprising zero or more waypoints (block 3906). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 3908). The target group is evaluated upon achieving the goal location, including additional qualifications to determine if it may be safely organized (block 3910).

The robot's perception system is engaged (block 3912) to provide image segmentation for determination of a sequence of activations generated for the robot's manipulators (e.g., arms) and positioning system (e.g., wheels) to organize the group (block 3914). The sequencing of activations is repeated until the target group is organized, or fails to organize (failure causing regression to block 3910). Engagement of the perception system may be triggered by proximity to the target group. Once the target group is organized, and on condition that there is sufficient battery life left for the robot and there are more groups in the category or categories to organize, these actions are repeated (block 3916).

In response to low battery life the robot navigates back to the docking station to charge (block 3918). However, if there is adequate battery life, and on condition that the category or categories are organized, the robot enters object pick-up mode (block 3920), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 3922).

Figure 40:
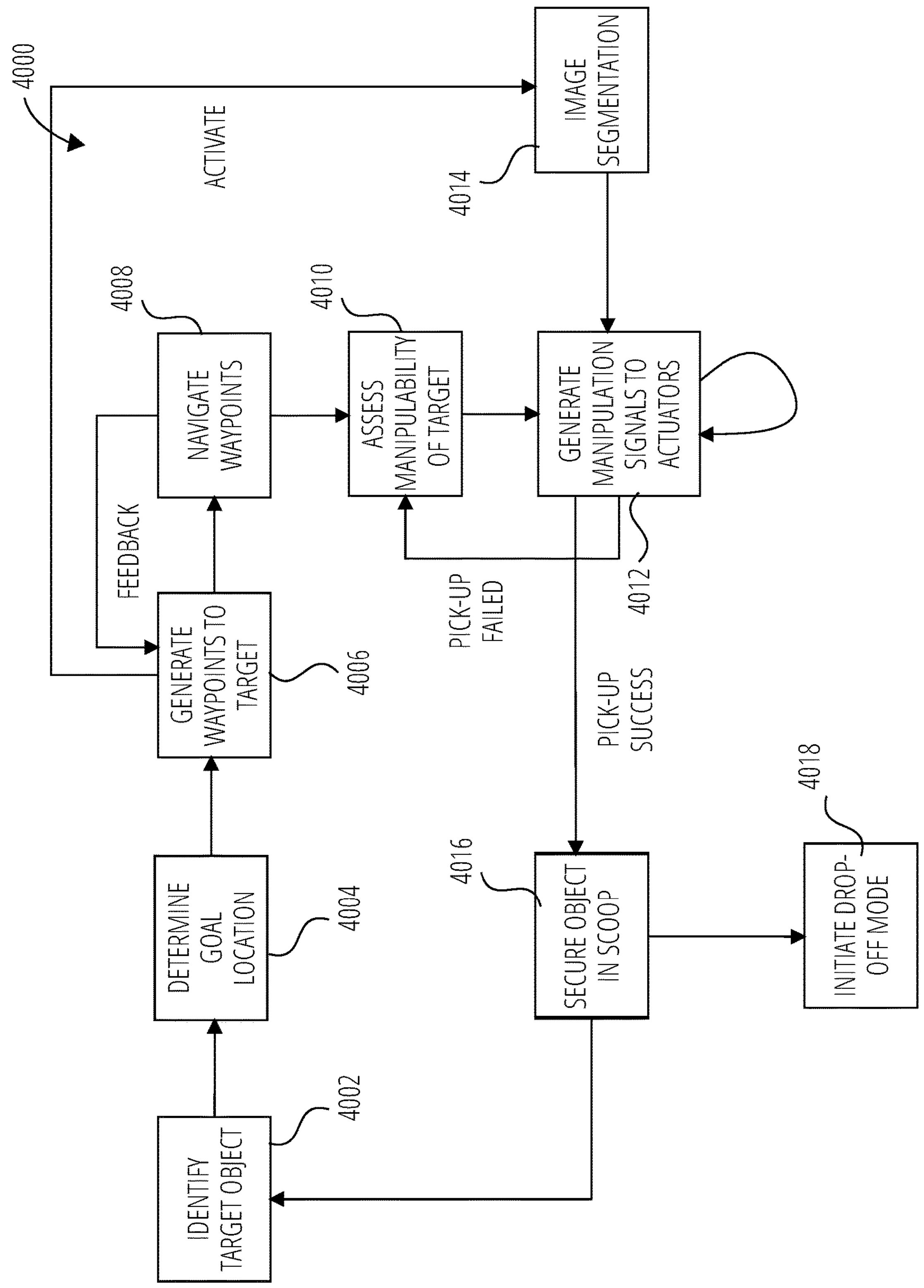
FIG. 40 depicts a robotic control algorithm 4000 for a robotic system in accordance with one embodiment.

FIG. 40 depicts a robotic control algorithm 4000 for a robotic system in one embodiment. A target object in the chosen object category is identified (block 4002) and a goal location for the robot is determined as an adjacent location of the target object (block 4004). A path to the target object is determined as a series of waypoints (block 4006) and the robot is navigated along the path while avoiding obstacles (block 4008).

Once the adjacent location is reached, as assessment of the target object is made to determine if may be safely manipulated (block 4010). On condition that the target object may be safely manipulated, the robot is operated to lift the object using the robot's manipulator arm, e.g., scoop (block 4012). The robot's perception module may by utilized at this time to analyze the target object and nearby objects to better control the manipulation (block 4014).

The target object, once on the scoop or other manipulator arm, is secured (block 4016). On condition that the robot does not have capacity for more objects, or it's the last object of the selected category(ies), object drop-off mode is initiated (block 4018). Otherwise the robot may begin the process again (4002).

Figure 41:
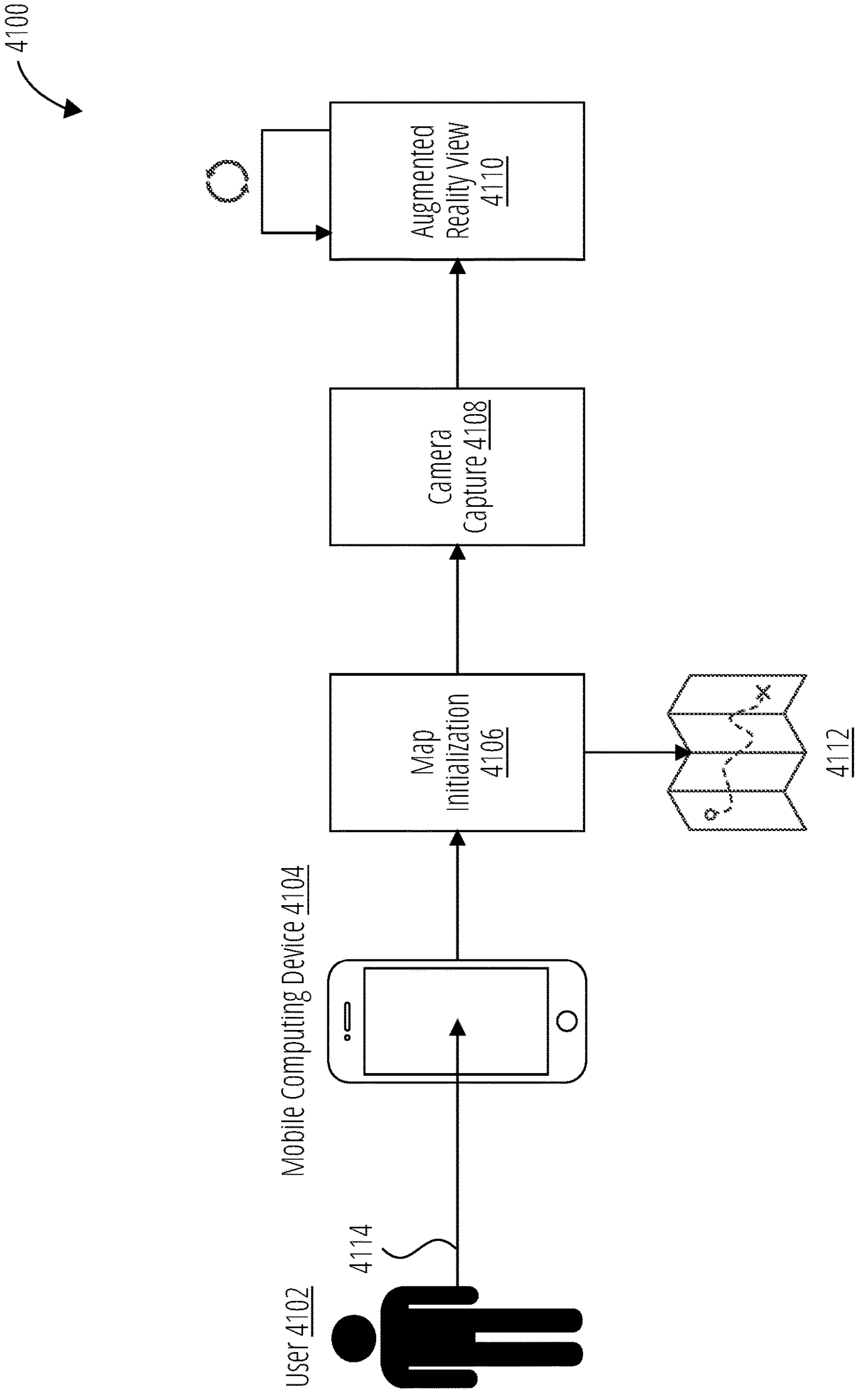
FIG. 41 illustrates a map configuration routine 4100 in accordance with one embodiment.

FIG. 41 illustrates a map configuration routine 4100 in accordance with one embodiment. User 4102 may use a mobile computing device 4104 to perform map initialization at block 4106. In this manner, the environment to be tidied may be mapped either starting from a blank map or from a previously saved map to generate a new or updated global map 4112.

A camera on the mobile computing device 4104 may be used to perform the camera capture at block 4108, providing a live video feed. The live video feed from the mobile device's camera may be processed to create an augmented reality interface that user 4102 may interact with. The augmented reality display may show users 4102 existing operational task rules such as:

- Push objects to side: Selects group of objects (e.g., based on object type or an area on map) to be pushed or placed along the wall, into an open closet, or otherwise to an area out of the way of future operations.
- Sweep Pattern: Marks an area on the map for the robot to sweep using pusher pads and scoop.
- Vacuum pattern: Marks an area on the map for the robot to vacuum.
- Mop pattern: Marks an area on the map for the robot to mop.
- Tidy cluster of objects: Selects groups of objects (e.g., based on object type or an area on the map) to be tidied and dropped at a home location.
- Sort on floor: Selects groups of objects (e.g., based on object type or an area on the map) to be organized on the floor based on a sorting rule.
- Tidy specific object: Selects a specific object to be tidied and dropped at a home location.

The augmented reality view may be displayed to the user 4102 on their mobile computing device 4104 as they map the environment and at block 4110. Using an augmented reality view, along with a top-down, two-dimensional map, the user 4102 may configure different operational task rules through user input signals 4114.

| Task | Target | Home |
|---|---|---|
| High-level information describing the task to be completed.<br>Task Type<br>Task Priority<br>Task Schedule | Specifies what objects and locations are to be tidied or cleaned.<br>Target Object Identifier<br>Target Object Type<br>Target Object Pattern<br>Target Area<br>Target Marker Object | Specifies the home location where tidied objects are to be placed.<br>Home Object Label<br>Home Object Identifier<br>Home Object Type<br>Home Area<br>Home Position |

User input signals 4114 may indicate user selection of a tidyable object detected in the environment to be tidied, identification of a home location for the selected tidyable object, custom categorization of the selected tidyable object, identification of a portion of the global map as a bounded area, generation of a label for the bounded area to create a named bounded area, and definition of at least one operational task rule that is an area-based rule using the named bounded area, wherein the area-based rule controls the performance of the robot operation when the tidying robot is located in the named bounded area. Other elements of the disclosed solution may also be configured or modified based on user input signals 4114, as will be well understood by one of ordinary skill in the art.

In one embodiment, the camera may be a camera 124 of a robot such as those previously disclosed, and these steps may be performed similarly based on artificial intelligence analysis of known floor maps of tidying areas and detected objects, rather than an augmented reality view. In one embodiment, rules may be pre-configured within the robotic control system, or may be provided to the tidying robot through voice commands detected through a microphone configured as part of the sensing system 106.

Figure 42:
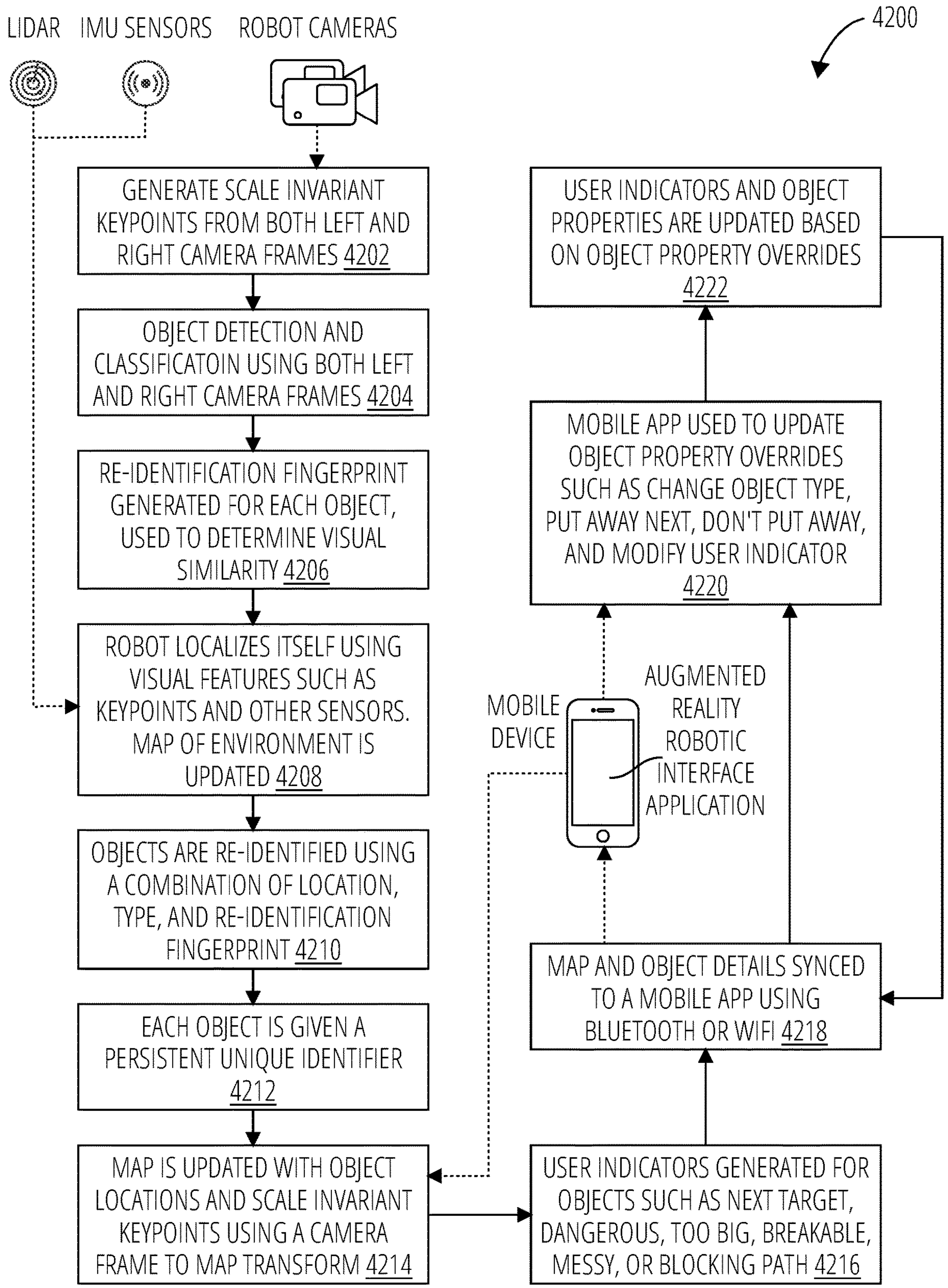
FIG. 42 depicts a robotic control algorithm 4200 in accordance with one embodiment.

FIG. 42 illustrates a robotic control algorithm 4200 in accordance with one embodiment. At block 4202, a left camera and a right camera, or some other configuration of robot cameras, of a robot such as that disclosed herein, may provide input that may be used to generate scale invariant keypoints within a robot's working space.

"Scale invariant keypoint" or "visual keypoint" in this disclosure refers to a distinctive visual feature that may be maintained across different perspectives, such as photos taken from different areas. This may be an aspect within an image captured of a robot's working space that may be used to identify a feature of the area or an object within the area when this feature or object is captured in other images taken from different angles, at different scales, or using different resolutions from the original capture.

Scale invariant keypoints may be detected by a robot or an augmented reality robotic interface installed on a mobile device based on images taken by the robot's cameras or the mobile device's cameras. Scale invariant keypoints may help a robot or an augmented reality robotic interface on a mobile device to determine a geometric transform between camera frames displaying matching content. This may aid in confirming or fine-tuning an estimate of the robot's or mobile device's location within the robot's working space.

Scale invariant keypoints may be detected, transformed, and matched for use through algorithms well understood in the art, such as (but not limited to) Scale-Invariant Feature Transform (SIFT), Speeded-Up Robust Features (SURF), Oriented Robust Binary features (ORB), and SuperPoint.

Objects located in the robot's working space may be detected at block 4204 based on the input from the left camera and the right camera, thereby defining starting locations for the objects and classifying the objects into categories. At block 4206, re-identification fingerprints may be generated for the objects, wherein the re-identification fingerprints are used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 4208, the robot may be localized within the robot's working space. Input from at least one of the left camera, the right camera, light detecting and ranging (LIDAR) sensors, and inertial measurement unit (IMU) sensors may be used to determine a robot location. The robot's working space may be mapped to create a global area map that includes the scale invariant keypoints, the objects, and the starting locations of the objects. The objects within the robot's working space may be re-identified at block 4210 based on at least one of the starting locations, the categories, and the re-identification fingerprints. Each object may be assigned a persistent unique identifier at block 4212.

At block 4214, the robots may receive a camera frame from an augmented reality robotic interface installed as an application on a mobile device operated by a user, and may update the global area map with the starting locations and scale invariant keypoints using a camera frame to global area map transform based on the camera frame. In the camera frame to global area map transform, the global area map may be searched to find a set of scale invariant keypoints that match the those detected in the mobile camera frame by using a specific geometric transform. This transform may maximize the number of matching keypoints and minimize the number of non-matching keypoints while maintaining geometric consistency.

At block 4216, user indicators may be generated for objects, wherein user indicators may include next target, target order, dangerous, too big, breakable, messy, and blocking travel path. The global area map and object details may be transmitted to the mobile device at block 4218, wherein object details may include at least one of visual snapshots, the categories, the starting locations, the persistent unique identifiers, and the user indicators of the objects. This information may be transmitted using wireless signaling such as BlueTooth or Wifi, as supported by the communications 134 module introduced in FIG. 1C and the network interface 1112 introduced in FIG. 11.

The updated global area map, the objects, the starting locations, the scale invariant keypoints, and the object details, may be displayed on the mobile device using the augmented reality robotic interface. The augmented reality robotic interface may accept user inputs to the augmented reality robotic interface, wherein the user inputs indicate object property overrides including change object type, put away next, don't put away, and modify user indicator, at block 4220. The object property overrides may be transmitted from the mobile device to the robot, and may be used at block 4222 to update the global area map, the user indicators, and the object details. Returning to block 4218, the robot may re-transmit its updated global area map to the mobile device to resynchronize this information.

The following figures set forth, without limitation, exemplary cloud-based systems that may be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which may be referred to as "in the cloud," that supports them. In at least one embodiment, cloud computing incorporates infrastructure as a service, platform as a service, software as a service, and other variations that have a common theme of reliance on the Internet for satisfying the computing needs of users. In at least one embodiment, a typical cloud deployment, such as in a private cloud (e.g., enterprise network), or a data center in a public cloud (e.g., Internet) may consist of thousands of servers (or alternatively, virtual machines (VMs)), hundreds of Ethernet, Fiber Channel or Fiber Channel over Ethernet (FCoE) ports, switching and storage infrastructure, etc. In at least one embodiment, cloud may also consist of network services infrastructure like IPsec virtual private network (VPN) hubs, firewalls, load balancers, wide area network (WAN) optimizers etc. In at least one embodiment, remote subscribers may access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that may be rapidly provisioned and released with minimal management effort or service provider interaction.

In at least one embodiment, cloud computing is characterized by on-demand self-service, in which a consumer may unilaterally provision computing capabilities, such as server time and network storage, as needed automatically without requiring human interaction with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and personal digital assistants (PDAs)). In at least one embodiment, cloud computing is characterized by resource pooling, in which a provider's computing resources are pooled to serve multiple consumers using a multi-tenant model, with different physical and virtual resources dynamically assigned and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities may be rapidly and elastically provisioned, in some cases automatically, to quickly scale out and rapidly released to quickly scale in. In at least one embodiment, to a consumer, capabilities available for provisioning often appear to be unlimited and may be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage may be monitored, controlled, and reported providing transparency for both a provider and consumer of a utilized service.

In at least one embodiment, cloud computing may be associated with various services. In at least one embodiment, cloud Software as a Service (SaaS) may refer to a service in which a capability provided to a consumer is to use a provider's applications running on a cloud infrastructure. In at least one embodiment, applications are accessible from various client devices through a thin client interface such as a web browser (e.g., web-based email). In at least one embodiment, the consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which capability is provided to a consumer to deploy onto the cloud infrastructure consumer-created or acquired applications created using programming languages and tools supported by a provider. In at least one embodiment, a consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which may include operating systems and applications. In at least one embodiment, a consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security, policy, and compliance considerations). In at least one embodiment, a community cloud may be managed by organizations or a third party and may exist on-premises or off-premises. In at least one embodiment, a public cloud may refer to a cloud infrastructure that is made available to the general public or a large industry group and is owned by an organization providing cloud services. In at least one embodiment, a hybrid cloud may refer to a cloud infrastructure that is a composition of two or more clouds (private, community, or public) that remain unique entities but are bound together by standardized or proprietary technology that supports data and application portability (e.g., cloud bursting for load-balancing between clouds). In at least one embodiment, a cloud computing environment is service-oriented with a focus on statelessness, low coupling, modularity, and semantic interoperability.

Figure 43:
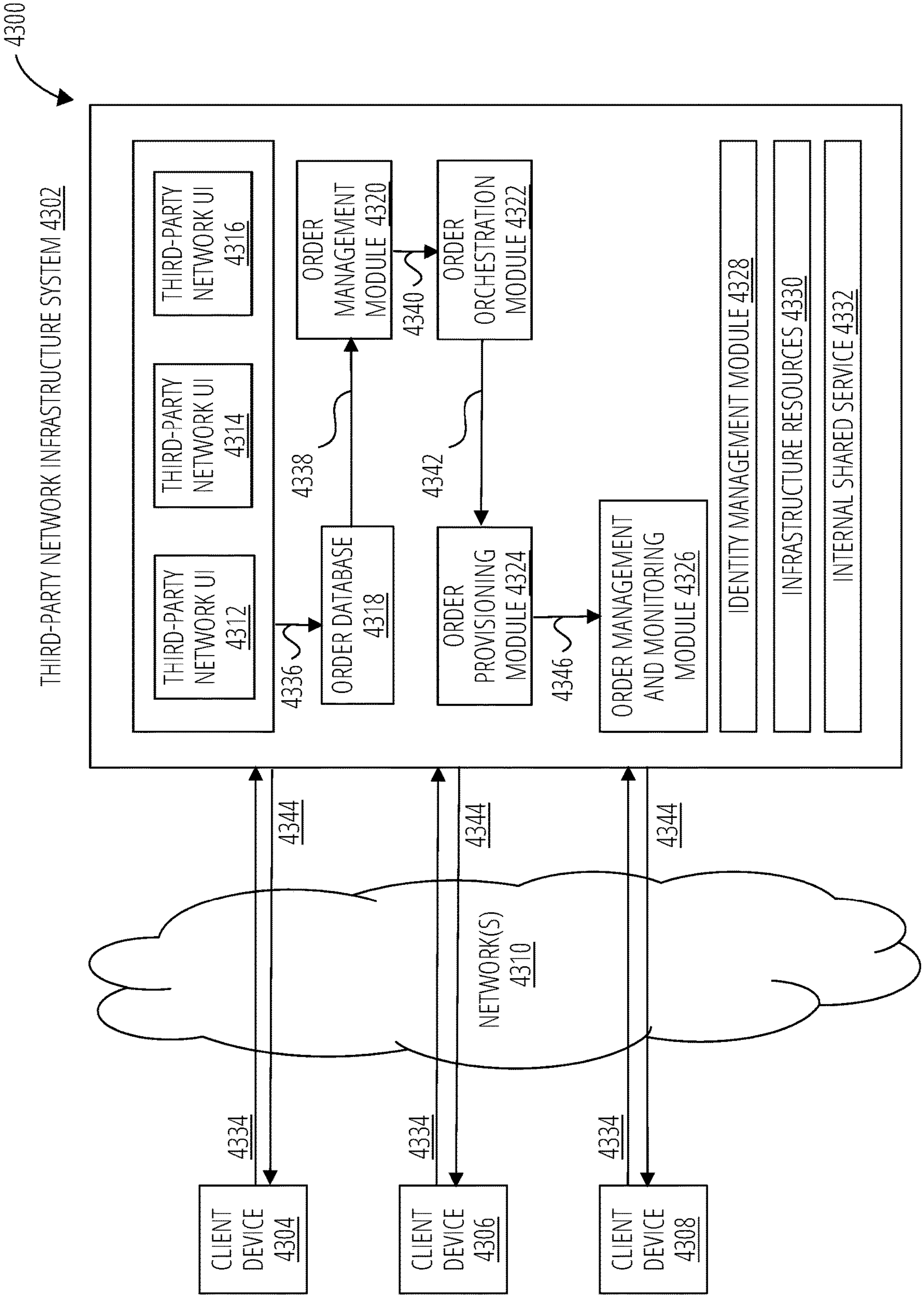
FIG. 43 illustrates a system environment 4300 in accordance with one embodiment.

FIG. 43 illustrates one or more components of a system environment 4300 in which services may be offered as third-party network services, in accordance with at least one embodiment. In at least one embodiment, a third-party network may be referred to as a cloud, cloud network, cloud computing network, and/or variations thereof. In at least one embodiment, system environment 4300 includes one or more client computing devices 4304, 4306, and 4308 that may be used by users to interact with a third-party network infrastructure system 4302 that provides third-party network services, which may be referred to as cloud computing services. In at least one embodiment, third-party network infrastructure system 4302 may comprise one or more computers and/or servers.

It may be appreciated that third-party network infrastructure system 4302 depicted in FIG. 43 may have other components than those depicted. Further, FIG. 43 depicts an embodiment of a third-party network infrastructure system. In at least one embodiment, third-party network infrastructure system 4302 may have more or fewer components than depicted in FIG. 43, may combine two or more components, or may have a different configuration or arrangement of components.

In at least one embodiment, client computing devices 4304, 4306, and 4308 may be configured to operate a client application such as a web browser, a proprietary client application, or some other application, which may be used by a user of a client computing device to interact with third-party network infrastructure system 4302 to use services provided by third-party network infrastructure system 4302. Although exemplary system environment 4300 is shown with three client computing devices, any number of client computing devices may be supported. In at least one embodiment, other devices such as devices with sensors, etc. may interact with third-party network infrastructure system 4302. In at least one embodiment, network 4310 may facilitate communications and exchange of data between client computing devices 4304, 4306, and 4308 and third-party network infrastructure system 4302.

In at least one embodiment, services provided by third-party network infrastructure system 4302 may include a host of services that are made available to users of a third-party network infrastructure system on demand. In at least one embodiment, various services may also be offered including, without limitation, online data storage and backup solutions, Web-based e-mail services, hosted office suites and document collaboration services, database management and processing, managed technical support services, and/or variations thereof. In at least one embodiment, services provided by a third-party network infrastructure system may dynamically scale to meet the needs of its users.

In at least one embodiment, a specific instantiation of a service provided by third-party network infrastructure system 4302 may be referred to as a "service instance." In at least one embodiment, in general, any service made available to a user via a communication network, such as the Internet, from a third-party network service provider's system is referred to as a "third-party network service." In at least one embodiment, in a public third-party network environment, servers and systems that make up a third-party network service provider's system are different from a customer's own on-premises servers and systems. In at least one embodiment, a third-party network service provider's system may host an application, and a user may, via a communication network such as the Internet, on demand, order and use an application.

In at least one embodiment, a service in a computer network third-party network infrastructure may include protected computer network access to storage, a hosted database, a hosted web server, a software application, or other service provided by a third-party network vendor to a user. In at least one embodiment, a service may include password-protected access to remote storage on a third-party network through the Internet. In at least one embodiment, a service may include a web service-based hosted relational database and a script-language middleware engine for private use by a networked developer. In at least one embodiment, a service may include access to an email software application hosted on a third-party network vendor's website.

In at least one embodiment, third-party network infrastructure system 4302 may include a suite of applications, middleware, and database service offerings that are delivered to a customer in a self-service, subscription-based, elastically scalable, reliable, highly available, and secure manner. In at least one embodiment, third-party network infrastructure system 4302 may also provide "big data" related computation and analysis services. In at least one embodiment, the term "big data" is generally used to refer to extremely large data sets that may be stored and manipulated by analysts and researchers to visualize large amounts of data, detect trends, and/or otherwise interact with data. In at least one embodiment, big data and related applications may be hosted and/or manipulated by an infrastructure system on many levels and at different scales. In at least one embodiment, tens, hundreds, or thousands of processors linked in parallel may act upon such data in order to present it or simulate external forces on data or what it represents. In at least one embodiment, these data sets may involve structured data, such as that organized in a database or otherwise according to a structured model, and/or unstructured data (e.g., emails, images, data blobs (binary large objects), web pages, complex event processing). In at least one embodiment, by leveraging the ability of an embodiment to relatively quickly focus more (or fewer) computing resources upon an objective, a third-party network infrastructure system may be better available to carry out tasks on large data sets based on demand from a business, government agency, research organization, private individual, group of like-minded individuals or organizations, or other entity.

In at least one embodiment, third-party network infrastructure system 4302 may be adapted to automatically provision, manage and track a customer's subscription to services offered by third-party network infrastructure system 4302. In at least one embodiment, third-party network infrastructure system 4302 may provide third-party network services via different deployment models. In at least one embodiment, services may be provided under a public third-party network model in which third-party network infrastructure system 4302 is owned by an organization selling third-party network services, and services are made available to the general public or different industry enterprises. In at least one embodiment, services may be provided under a private third-party network model in which third-party network infrastructure system 4302 is operated solely for a single organization and may provide services for one or more entities within an organization. In at least one embodiment, third-party network services may also be provided under a community third-party network model in which third-party network infrastructure system 4302 and services provided by third-party network infrastructure system 4302 are shared by several organizations in a related community. In at least one embodiment, third-party network services may also be provided under a hybrid third-party network model, which is a combination of two or more different models.

In at least one embodiment, services provided by third-party network infrastructure system 4302 may include one or more services provided under Software as a Service (Saas) category, Platform as a Service (PaaS) category, Infrastructure as a Service (IaaS) category, or other categories of services including hybrid services. In at least one embodiment, a customer, via a subscription order, may order one or more services provided by third-party network infrastructure system 4302. In at least one embodiment, third-party network infrastructure system 4302 then performs processing to provide services in a customer's subscription order.

In at least one embodiment, services provided by third-party network infrastructure system 4302 may include, without limitation, application services, platform services, and infrastructure services. In at least one embodiment, application services may be provided by a third-party network infrastructure system via a SaaS platform. In at least one embodiment, the SaaS platform may be configured to provide third-party network services that fall under the SaaS category. In at least one embodiment, the SaaS platform may provide capabilities to build and deliver a suite of on-demand applications on an integrated development and deployment platform. In at least one embodiment, the SaaS platform may manage and control underlying software and infrastructure for providing SaaS services. In at least one embodiment, by utilizing services provided by a SaaS platform, customers may utilize applications executing on a third-party network infrastructure system. In at least one embodiment, customers may acquire application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third-party network infrastructure system 4302 via a PaaS platform. In at least one embodiment, the PaaS platform may be configured to provide third-party network services that fall under the PaaS category. In at least one embodiment, examples of platform services may include without limitation services that allow organizations to consolidate existing applications on a shared, common architecture, as well as an ability to build new applications that leverage shared services provided by a platform. In at least one embodiment, the PaaS platform may manage and control underlying software and infrastructure for providing PaaS services. In at least one embodiment, customers may acquire PaaS services provided by third-party network infrastructure system 4302 without a need for customers to purchase separate licenses and support.

In at least one embodiment, by utilizing services provided by a PaaS platform, customers may employ programming languages and tools supported by a third-party network infrastructure system and also control deployed services. In at least one embodiment, platform services provided by a third-party network infrastructure system may include database third-party network services, middleware third-party network services, and third-party network services. In at least one embodiment, database third-party network services may support shared service deployment models that allow organizations to pool database resources and offer customers a Database as a Service in the form of a database third-party network. In at least one embodiment, middleware third-party network services may provide a platform for customers to develop and deploy various business applications, and third-party network services may provide a platform for customers to deploy applications, in a third-party network infrastructure system.

In at least one embodiment, various different infrastructure services may be provided by an IaaS platform in a third-party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third-party network infrastructure system 4302 may also include infrastructure resources 4330 for providing resources used to provide various services to customers of a third-party network infrastructure system. In at least one embodiment, infrastructure resources 4330 may include pre-integrated and optimized combinations of hardware, such as servers, storage, and networking resources to execute services provided by a Paas platform and a Saas platform, and other resources.

In at least one embodiment, resources in third-party network infrastructure system 4302 may be shared by multiple users and dynamically re-allocated per demand. In at least one embodiment, resources may be allocated to users in different time zones. In at least one embodiment, third-party network infrastructure system 4302 may allow a first set of users in a first time zone to utilize resources of a third-party network infrastructure system for a specified number of hours and then allow a re-allocation of the same resources to another set of users located in a different time zone, thereby maximizing utilization of resources.

In at least one embodiment, a number of internal shared services 4332 may be provided that are shared by different components or modules of third-party network infrastructure system 4302 to support the provision of services by third-party network infrastructure system 4302. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third-party network infrastructure system 4302 may provide comprehensive management of third-party network services (e.g., SaaS, PaaS, and IaaS services) in a third-party network infrastructure system. In at least one embodiment, third-party network management functionality may include capabilities for provisioning, managing, and tracking a customer's subscription received by third-party network infrastructure system 4302, and/or variations thereof.

In at least one embodiment, as depicted in FIG. 43, third-party network management functionality may be provided by one or more modules, such as an order management module 4320, an order orchestration module 4322, an order provisioning module 4324, an order management and monitoring module 4326, and an identity management module 4328. In at least one embodiment, these modules may include or be provided using one or more computers and/or servers, which may be general-purpose computers, specialized server computers, server farms, server clusters, or any other appropriate arrangement and/or combination.

In at least one embodiment, at a service request step 4334, a customer using a client device, such as client computing devices 4304, 4306, or 4308, may interact with third-party network infrastructure system 4302 by requesting one or more services provided by third-party network infrastructure system 4302 and placing an order for a subscription for one or more services offered by third-party network infrastructure system 4302. In at least one embodiment, a customer may access a third-party network User Interface (UI) such as third-party network UI 4312, third-party network UI 4314, and/or third-party network UI 4316 and place a subscription order via these UIs. In at least one embodiment, order information received by third-party network infrastructure system 4302 in response to a customer placing an order may include information identifying a customer and one or more services offered by a third-party network infrastructure system 4302 that a customer intends to subscribe to.

In at least one embodiment, at a storing information step 4336, order information received from a customer may be stored in an order database 4318. In at least one embodiment, if this is a new order, a new record may be created for an order. In at least one embodiment, order database 4318 may be one of several databases operated by third-party network infrastructure system 4302 and operated in conjunction with other system elements.

In at least one embodiment, at a forwarding information step 4338, order information may be forwarded to an order management module 4320 that may be configured to perform billing and accounting functions related to an order, such as verifying an order, and upon verification, booking an order.

In at least one embodiment, at a communicating information step 4340, information regarding an order may be communicated to an order orchestration module 4322 that is configured to orchestrate the provisioning of services and resources for an order placed by a customer. In at least one embodiment, order orchestration module 4322 may use services of order provisioning module 4324 for provisioning. In at least one embodiment, order orchestration module 4322 supports the management of business processes associated with each order and applies business logic to determine whether an order may proceed to provisioning.

In at least one embodiment, at a receiving a new order step 4342, upon receiving an order for a new subscription, order orchestration module 4322 sends a request to order provisioning module 4324 to allocate resources and configure resources needed to fulfill a subscription order. In at least one embodiment, an order provisioning module 4324 supports an allocation of resources for services ordered by a customer. In at least one embodiment, an order provisioning module 4324 provides a level of abstraction between third-party network services provided by third-party network infrastructure system 4302 and a physical implementation layer that is used to provision resources for providing requested services. In at least one embodiment, this allows order orchestration module 4322 to be isolated from implementation details, such as whether or not services and resources are actually provisioned in real-time or pre-provisioned and allocated/assigned upon request.

In at least one embodiment, at a service provided step 4344, once services and resources are provisioned, a notification may be sent to subscribing customers indicating that a requested service is now ready for use. In at least one embodiment, information (e.g., a link) may be sent to a customer that allows a customer to start using the requested services.

In at least one embodiment, at a notification step 4346, a customer's subscription order may be managed and tracked by an order management and monitoring module 4326. In at least one embodiment, order management and monitoring module 4326 may be configured to collect usage statistics regarding a customer's use of subscribed services. In at least one embodiment, statistics may be collected for the amount of storage used, the amount of data transferred, the number of users, the amount of system up time and system down time, and/or variations thereof.

In at least one embodiment, third-party network infrastructure system 4302 may include an identity management module 4328 that is configured to provide identity services, such as access management and authorization services in third-party network infrastructure system 4302. In at least one embodiment, identity management module 4328 may control information about customers who wish to utilize services provided by third-party network infrastructure system 4302. In at least one embodiment, such information may include information that authenticates the identities of such customers and information that describes which actions those customers are authorized to perform relative to various system resources (e.g., files, directories, applications, communication ports, memory segments, etc.). In at least one embodiment, identity management module 4328 may also include management of descriptive information about each customer and about how and by whom that descriptive information may be accessed and modified.

Figure 44:
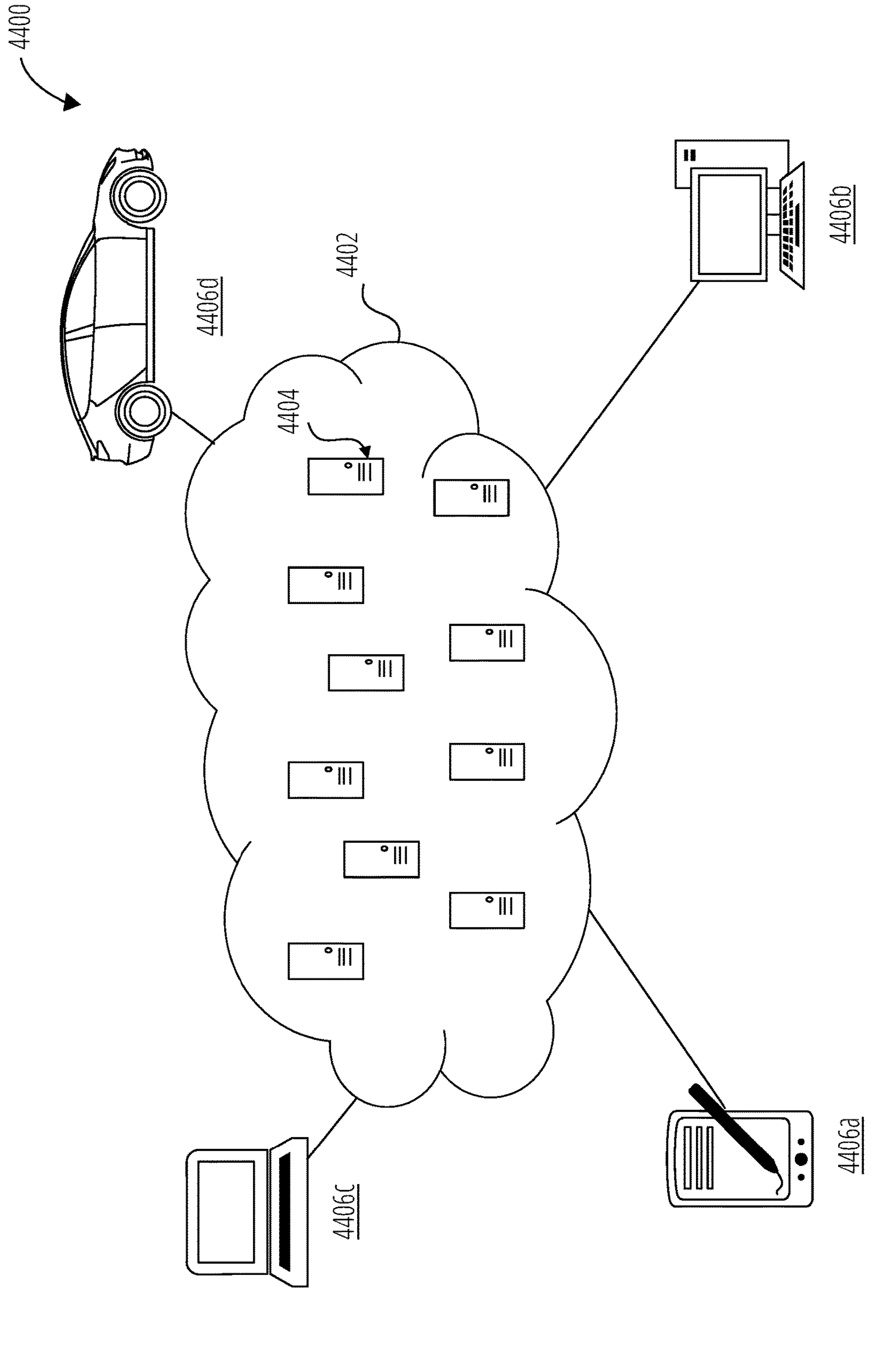
FIG. 44 illustrates a computing environment 4400 in accordance with one embodiment.

FIG. 44 illustrates a computing environment 4400 including cloud computing environment 4402, in accordance with at least one embodiment. In at least one embodiment, cloud computing environment 4402 comprises one or more computer systems/servers 4404 with which computing devices such as, personal digital assistant (PDA) or computing device 4406*a*, computing device 4406*b*, computing device 4406*c*, and/or computing device 4406*d* communicate. In at least one embodiment, this allows for infrastructure, platforms, and/or software to be offered as services from cloud computing environment 4402, so as to not require each client to separately maintain such resources. It is understood that the types of computing devices 4406*a*-4406*d* shown in FIG. 44 (a mobile or handheld device, a desktop computer, a laptop computer, and an automobile computer system) are intended to be illustrative, and that cloud computing environment 4402 may communicate with any type of computerized device over any type of network and/or network/addressable connection (e.g., using a web browser).

In at least one embodiment, a computer system/server 4404, which may be denoted as a cloud computing node, is operational with numerous other general purpose or special purpose computing system environments or configurations. In at least one embodiment, examples of computing systems, environments, and/or configurations that may be suitable for use with computer system/server 4404 include, but are not limited to, personal computer systems, server computer systems, thin clients, thick clients, hand-held or laptop devices, multiprocessor systems, microprocessor-based systems, set-top boxes, programmable consumer electronics, network personal computers (PCs), minicomputer systems, mainframe computer systems, and distributed cloud computing environments that include any of the above systems or devices, and/or variations thereof.

In at least one embodiment, computer system/server 4404 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, an exemplary computer system/server 4404 may be practiced in distributed cloud computing environments where tasks are performed by remote processing devices that are linked through a communications network. In at least one embodiment, in a distributed cloud computing environment, program modules may be located in both local and remote computer system storage media including memory storage devices.

Figure 45:
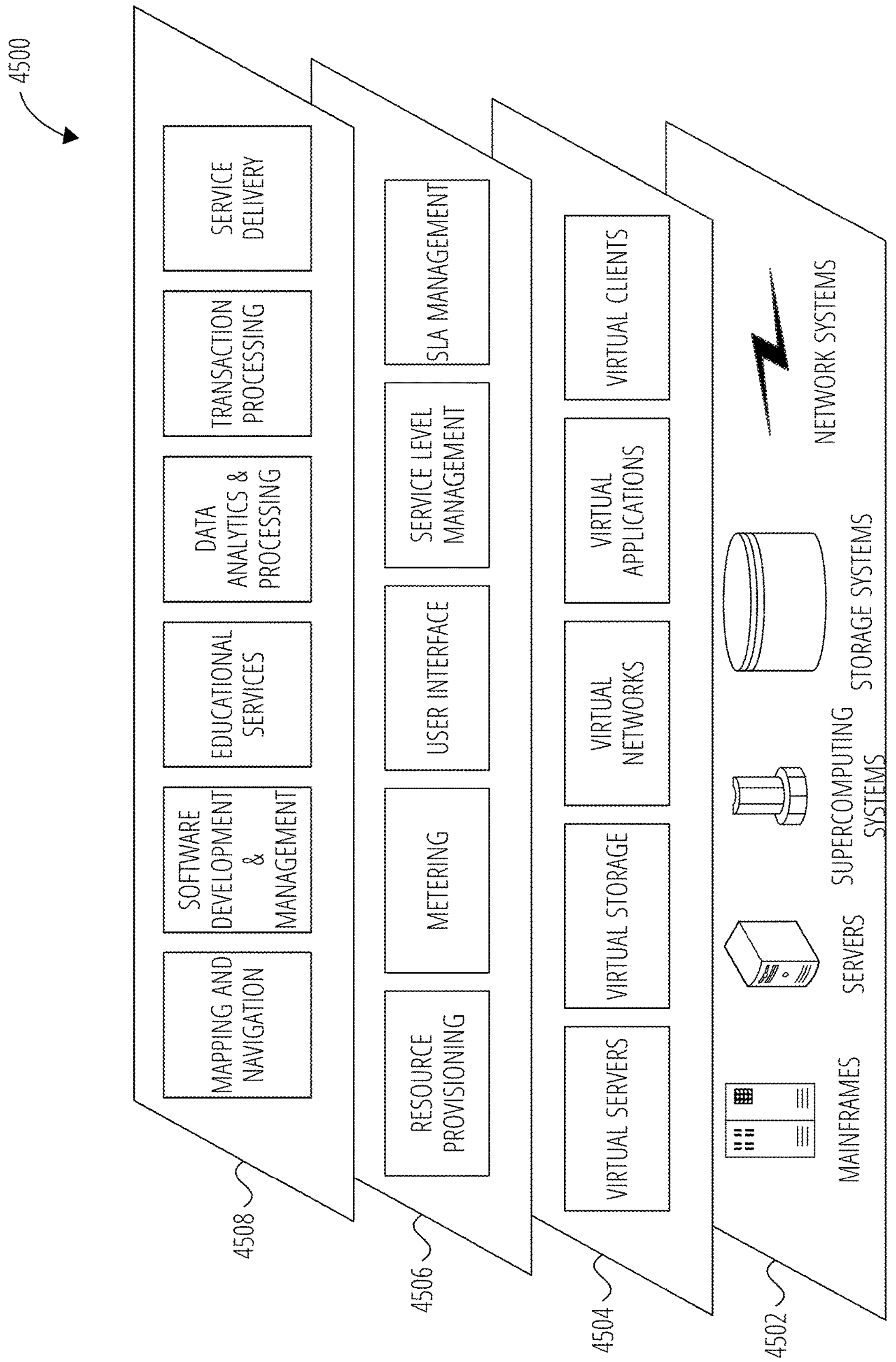
FIG. 45 illustrates a set of functional abstraction layers 4500 in accordance with one embodiment.

FIG. 45 illustrates a set of functional abstraction layers 4500 provided by cloud computing environment 4402 (FIG. 44), in accordance with at least one embodiment. It may be understood in advance that the components, layers, and functions shown in FIG. 45 are intended to be illustrative, and components, layers, and functions may vary.

In at least one embodiment, hardware and software layer 4502 includes hardware and software components. In at least one embodiment, examples of hardware components include mainframes, various RISC (Reduced Instruction Set Computer) architecture-based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 4504 provides an abstraction layer from which the following exemplary virtual entities may be provided: virtual servers, virtual storage, virtual networks, including virtual private networks, virtual applications, virtual clients, and/or variations thereof.

In at least one embodiment, management layer 4506 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, a user interface provides access to a cloud computing environment for both users and system administrators. In at least one embodiment, service level management provides cloud computing resource allocation and management such that the needed service levels are met. In at least one embodiment, Service Level Agreement (SLA) management provides pre-arrangement for, and procurement of, cloud computing resources for which a future need is anticipated in accordance with an SLA.

In at least one embodiment, workloads layer 4508 provides functionality for which a cloud computing environment is utilized. In at least one embodiment, examples of workloads and functions which may be provided from this layer include mapping and navigation, software development and management, educational services, data analytics and processing, transaction processing, and service delivery.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of inventive subject matter is not limited to the depicted embodiments but is rather set forth in the following Claims.

What is claimed is:

1. A tidying robot system comprising:
a robot including:
a chassis;
a robot vacuum system including a vacuum generating assembly and a dirt collector;
a scoop;
pusher pad arms with pusher pads;
a robot charge connector;
at least one wheel or one track for mobility of the robot;
a battery;
a processor; and
a memory storing instructions that, when executed by the processor, allow operation and control of the robot;
a base station with a base station charge connector configured to couple with the robot charge connector;
a robotic control system in at least one of the robot and a cloud server; and
logic to:
receive, from the robotic control system, a starting location, a target cleaning area, attributes of the target cleaning area, a path of the robot navigating in the target cleaning area, and obstructions in the path of the robot;
determine a tidying strategy including at least one of a vacuuming strategy and an obstruction handling strategy;
execute the tidying strategy to at least one of vacuum the target cleaning area, move an obstruction, and avoid the obstruction, wherein the obstruction includes at least one of a tidyable object and a moveable object;
on condition the robotic control system determines the obstruction can be picked up:
determine a pickup strategy and execute the pickup strategy;
capture the obstruction with the pusher pads; and
place the obstruction in the scoop;
on condition the robotic control system determines the obstruction can be relocated but cannot be picked up:
push the obstruction to a different location using at least one of the pusher pads, the scoop, and the chassis; and
on condition the robotic control system determines the obstruction cannot be relocated and cannot be picked up:
avoid the obstruction by altering the path of the robot to go around the obstruction; and
on condition the robotic control system determines the dirt collector is full:
navigate to the base station; and
on condition the robotic control system determines the dirt collector is not full:
continue executing the tidying strategy.

2. The tidying robot system of claim 1, wherein the vacuum generating assembly comprises:
a vacuum compartment including:
a vacuum compartment intake port configured to allow a cleaning airflow into the vacuum compartment;
a rotating brush configured to impel dirt and dust into the vacuum compartment;
the dirt collector in fluid communication with the vacuum compartment intake port;
a dirt release latch configured to selectively allow access to the dirt collector from outside of the chassis;
a vacuum compartment filter in fluid communication with the dirt collector;
a vacuum compartment fan in fluid communication with the vacuum compartment filter;
a vacuum compartment motor driving the vacuum compartment fan; and
a vacuum compartment exhaust port in fluid communication with the vacuum compartment fan and configured to allow the cleaning airflow out of the vacuum compartment.

3. The tidying robot system of claim 1, the base station further comprising:
a vacuum emptying system, including:
a vacuum emptying system intake port configured to allow a vacuum emptying airflow into the vacuum emptying system;
a vacuum emptying system filter bag in fluid communication with the vacuum emptying system intake port;
a vacuum emptying system fan in fluid communication with the vacuum emptying system filter bag;
a vacuum emptying system motor driving the vacuum emptying system fan; and
a vacuum emptying system exhaust port in fluid communication with the vacuum emptying system fan and configured to allow the vacuum emptying airflow out of the vacuum emptying system.

4. The tidying robot system of claim 3, the base station further comprising an object collection bin configured to accept obstructions deposited by the scoop into the object collection bin; and
the logic further comprising:
execute a drop strategy including transferring the obstructions in the scoop into the object collection bin.

5. The tidying robot system of claim 3, further comprising an object collection bin located on top of the base station.

6. The tidying robot system of claim 1, further comprising:
an object collection bin configured to accept obstructions deposited by the scoop into the object collection bin; and
the logic further comprising:
on condition the robotic control system determines the scoop is full:
navigate to the object collection bin;
execute a drop strategy including transferring the obstructions in the scoop into the object collection bin; and
continue executing the tidying strategy.

7. The tidying robot system of claim 1, wherein the vacuuming strategy includes at least one of:
choose a vacuum cleaning pattern for the target cleaning area;
identify the obstructions in the target cleaning area;

determine how to handle the obstruction in the path of the robot, including at least one of:
move the obstruction; and
avoid the obstruction;
vacuum the target cleaning area if the robot has adequate battery power; and
return to the base station if at least one of the robot does not have adequate battery power and the vacuuming of the target cleaning area is completed.

8. The tidying robot system of claim 7, wherein the vacuuming strategy further includes at least one of:
move the obstruction to a portion of the target cleaning area that has been vacuumed; and
move the obstruction aside, in close proximity to the path of the robot, so that the obstruction will not obstruct the robot continuing along the path of the robot.

9. The tidying robot system of claim 7, wherein the vacuuming strategy further includes:
execute an immediate removal strategy, including:
execute the pickup strategy to place the obstruction in the scoop;
navigate, immediately, to a target storage bin;
place the obstruction into the target storage bin;
navigate to the position the obstruction was placed into the scoop; and
resume vacuuming the target cleaning area;
execute an in-situ removal strategy, including:
execute the pickup strategy to place the obstruction in the scoop;
continue vacuuming the target cleaning area;
on condition a location of the robot is near the target storage bin:
navigate to the target storage bin;
place the obstruction in the target storage bin; and
continue vacuuming, from a location of the target storage bin, the target cleaning area.

10. The tidying robot system of claim 1, wherein the pickup strategy includes:
an approach path for the robot to the obstruction;
a grabbing height for initial contact with the obstruction;
a grabbing pattern for movement of the pusher pads while capturing the obstruction; and
a carrying position of the pusher pads and the scoop that secures the obstruction in a containment area on the robot for transport, the containment area including at least two of the pusher pad arms, the pusher pads, and the scoop;
execute the pickup strategy, including:
extend the pusher pads out and forward with respect to the pusher pad arms and raising the pusher pads to the grabbing height;
approach the obstruction via the approach path, coming to a stop when the obstruction is positioned between the pusher pads;
execute the grabbing pattern to allow capture of the obstruction within the containment area; and
confirm the obstruction is within the containment area;
on condition that the obstruction is within the containment area:
exert pressure on the obstruction with the pusher pads to hold the obstruction stationary in the containment area; and
raise at least one of the scoop and the pusher pads, holding the obstruction, to the carrying position;
on condition that the obstruction is not within the containment area:
alter the pickup strategy with at least one of a different reinforcement learning based strategy, a different rules based strategy, and relying upon different observations, current object state, and sensor data; and
execute the altered pickup strategy.

11. A method comprising:
receiving, at a robot of a tidying robot system, from a robotic control system, a starting location, a target cleaning area, attributes of the target cleaning area, a path of the robot navigating in the target cleaning area, and obstructions in the path of the robot,
wherein the robot is configured with a chassis, a scoop, pusher pad arms with pusher pads, a robot charge connector, at least one wheel or one track for mobility of the robot, a battery, a robot vacuum system including a vacuum generating assembly and a dirt collector, a processor, and a memory storing instructions that, when executed by the processor, allow operation and control of the robot, and
wherein the robot is in communication with the robotic control system in at least one of the robot and a cloud server;
determining a tidying strategy including at least one of a vacuuming strategy and an obstruction handling strategy;
determining, by the robotic control system, at least one of whether the obstruction:
can be picked up;
can be relocated but cannot be picked up; and
cannot be relocated and cannot be picked up;
executing, by the robot, the tidying strategy by at least one of:
vacuuming the target cleaning area;
moving an obstruction; and
avoiding the obstruction, wherein the obstruction includes at least one of a tidyable object and a moveable object;
on condition the robotic control system determines the obstruction can be picked up:
determining a pickup strategy and execute the pickup strategy;
capturing the obstruction with the pusher pads; and
placing the obstruction in the scoop;
on condition the robotic control system determines the obstruction can be relocated but cannot be picked up:
pushing the obstruction to a different location using at least one of the pusher pads, the scoop, and the chassis; and
on condition the robotic control system determines the obstruction cannot be relocated and cannot be picked up:
avoiding the obstruction by altering the path of the robot to go around the obstruction; and
determining, by the robotic control system, if the dirt collector is full;
on condition the dirt collector is full:
navigating to a base station having a base station charge connector configured to couple with the robot charge connector; and
on condition the dirt collector is not full:
continuing to execute the tidying strategy.

12. The method of claim 11, wherein the vacuum generating assembly comprises:
a vacuum compartment including:
a vacuum compartment intake port configured to allow a cleaning airflow into the vacuum compartment;

a rotating brush configured to impel dirt and dust into the vacuum compartment;

the dirt collector in fluid communication with the vacuum compartment intake port;

a dirt release latch configured to selectively allow access to the dirt collector from outside of the chassis;

a vacuum compartment filter in fluid communication with the dirt collector;

a vacuum compartment fan in fluid communication with the vacuum compartment filter;

a vacuum compartment motor driving the vacuum compartment fan; and a vacuum compartment exhaust port in fluid communication with the vacuum compartment fan and configured to allow the cleaning airflow out of the vacuum compartment.

13. The method of claim 11, wherein the base station further includes:

a vacuum emptying system, including:

a vacuum emptying system intake port configured to allow a vacuum emptying airflow into the vacuum emptying system;

a vacuum emptying system filter bag in fluid communication with the vacuum emptying system intake port;

a vacuum emptying system fan in fluid communication with the vacuum emptying system filter bag;

a vacuum emptying system motor driving the vacuum emptying system fan; and a vacuum emptying system exhaust port in fluid communication with the vacuum emptying system fan and configured to allow the vacuum emptying airflow out of the vacuum emptying system.

14. The method of claim 13, wherein the base station further includes an object collection bin configured to accept obstructions deposited by the scoop into the object collection bin; and the method further comprising:

executing a drop strategy including transferring the obstructions in the scoop into the object collection bin.

15. The method of claim 13, further comprising an object collection bin located on top of the base station.

16. The method of claim 11, further comprising:

determining, by the robotic control system, if the scoop is full;

on condition the robotic control system determines the scoop is full:

navigating to an object collection bin configured to accept obstructions deposited by the scoop into the object collection bin;

executing a drop strategy including transferring the obstructions in the scoop into the object collection bin; and continue executing the tidying strategy.

17. The method of claim 11, wherein the vacuuming strategy includes at least one of:

choosing a vacuum cleaning pattern for the target cleaning area;

identifying the obstructions in the target cleaning area;

determining how to handle the obstruction in the path of the robot, including at least one of:

moving the obstruction; and avoiding the obstruction;

vacuuming the target cleaning area if the robot has adequate battery power; and returning to the base station if at least one of the robot does not have adequate battery power and the vacuuming of the target cleaning area is completed.

18. The method of claim 17, wherein the vacuuming strategy further includes at least one of:

moving the obstruction to a portion of the target cleaning area that has been vacuumed; and moving the obstruction aside, in close proximity to the path of the robot, so that the obstruction will not obstruct the robot continuing along the path of the robot.

19. The method of claim 17, wherein the vacuuming strategy further includes:

executing an immediate removal strategy, including:

executing the pickup strategy to place the obstruction in the scoop;

navigating, immediately, to a target storage bin;

placing the obstruction into the target storage bin;

navigating to the position the obstruction was placed into the scoop; and resuming vacuuming the target cleaning area;

executing an in-situ removal strategy, including:

executing the pickup strategy to place the obstruction in the scoop;

continue vacuuming the target cleaning area;

on condition a location of the robot is near the target storage bin:

navigating to the target storage bin;

placing the obstruction in the target storage bin; and continue vacuuming, from a location of the target storage bin, the target cleaning area.

20. The method of claim 11, wherein the pickup strategy includes:

an approach path for the robot to the obstruction;

a grabbing height for initial contact with the obstruction;

a grabbing pattern for movement of the pusher pads while capturing the obstruction; and a carrying position of the pusher pads and the scoop that secures the obstruction in a containment area on the robot for transport, the containment area including at least two of the pusher pad arms, the pusher pads, and the scoop; and executing the pickup strategy, includes:

extending the pusher pads out and forward with respect to the pusher pad arms and raising the pusher pads to the grabbing height;

approaching the obstruction via the approach path, coming to a stop when the obstruction is positioned between the pusher pads;

executing the grabbing pattern to allow capture of the obstruction within the containment area; and confirming the obstruction is within the containment area;

on condition that the obstruction is within the containment area:

exerting pressure on the obstruction with the pusher pads to hold the obstruction stationary in the containment area; and raising at least one of the scoop and the pusher pads, holding the obstruction, to the carrying position;

on condition that the obstruction is not within the containment area:

altering the pickup strategy with at least one of a different reinforcement learning based strategy, a different rules based strategy, and relying upon different observations, current object state, and sensor data; and executing the altered pickup strategy.

* * * * *